(12) United States Patent
Lee et al.

(10) Patent No.: US 10,890,349 B2
(45) Date of Patent: Jan. 12, 2021

(54) COMPOUND CONTROL APPARATUS AND METHOD THEREOF IN AIR CONDITIONING SYSTEM

(71) Applicant: Samsung Electronics Co., Ltd., Gyeonggi-do (KR)

(72) Inventors: Woonsik Lee, Gyeonggi-do (KR); Kyungjae Kim, Gyeonggi-do (KR); Kwanwoo Song, Gyeonggi-do (KR); Hyejung Cho, Gyeonggi-do (KR); Soonheum Ko, Gyeonggi-do (KR); Jaehong Kim, Gyeonggi-do (KR)

(73) Assignee: Samsung Electronics Co., Ltd

( * ) Notice: Subject to any disclaimer, the term of this patent is extended or adjusted under 35 U.S.C. 154(b) by 71 days.

(21) Appl. No.: 16/289,191

(22) Filed: Feb. 28, 2019

(65) Prior Publication Data

US 2019/0264940 A1   Aug. 29, 2019

(30) Foreign Application Priority Data

Feb. 28, 2018   (KR) ................ 10-2018-0024865

(51) Int. Cl.
| | |
|---|---|
| *G05B 13/04* | (2006.01) |
| *F24F 11/58* | (2018.01) |
| *F24F 11/00* | (2018.01) |
| *G05B 13/02* | (2006.01) |

(Continued)

(52) U.S. Cl.
CPC .......... *F24F 11/58* (2018.01); *F24F 11/0001* (2013.01); *G05B 13/027* (2013.01); *G05B 13/048* (2013.01); *F24F 2110/70* (2018.01); *F24F 2120/10* (2018.01)

(58) Field of Classification Search
None
See application file for complete search history.

(56) References Cited

U.S. PATENT DOCUMENTS

| | | |
|---|---|---|
| 5,579,993 A | 12/1996 | Ahmed et al. |
| 2005/0095978 A1 | 5/2005 | Blunn et al. |
| 2006/0287774 A1 | 12/2006 | Yoon et al. |

(Continued)

FOREIGN PATENT DOCUMENTS

| | | |
|---|---|---|
| EP | 3 299 975 | 3/2018 |
| JP | WO 2015/15151363 | 4/2017 |

(Continued)

OTHER PUBLICATIONS

Machine Translation of WO-2015151363-A1 (Oct. 2015).*

(Continued)

*Primary Examiner* — Ryan A Jarrett
(74) *Attorney, Agent, or Firm* — The Farrell Law Firm, P.C.

(57) ABSTRACT

The disclosure relates to a sensor network, machine type communication (MTC), machine-to-machine (M2M) communication, and technology for internet of things (IoT). A method of a server in an air conditioning system and a server are provided. The method includes detecting a schedule duration for a compound control zone in which a compound control operation for controlling a ventilating operation and a cooling/heating operation will be performed; determining a ventilating schedule based on an air state change; and determining a cooling/heating schedule.

20 Claims, 31 Drawing Sheets

(51) Int. Cl.
*F24F 120/10* (2018.01)
*F24F 110/70* (2018.01)

(56) References Cited

U.S. PATENT DOCUMENTS

| | | |
|---|---|---|
| 2007/0130969 A1 | 6/2007 | Peterson et al. |
| 2009/0308941 A1 | 12/2009 | Patch |
| 2011/0090077 A1* | 4/2011 | Meyer .................. F24F 11/0001 340/521 |
| 2014/0316584 A1 | 10/2014 | Matsuoka et al. |
| 2014/0345309 A1 | 11/2014 | Ishikawa et al. |
| 2015/0011154 A1* | 1/2015 | Holm ...................... F24F 7/007 454/258 |
| 2015/0032264 A1* | 1/2015 | Emmons ................. F24F 11/62 700/276 |

FOREIGN PATENT DOCUMENTS

| | | | |
|---|---|---|---|
| KR | 10-0813679 | 3/2008 | |
| KR | 10-2009-0115443 | 11/2009 | |
| KR | 10-2012-0083140 | 7/2012 | |
| KR | 10-1243226 | 3/2013 | |
| KR | 10-1565249 | 11/2015 | |
| WO | WO 2014/051632 | 4/2014 | |
| WO | WO 2014/185013 | 11/2014 | |
| WO | WO-2015151363 A1 * | 10/2015 | .............. F24F 11/30 |

OTHER PUBLICATIONS

International Search Report dated May 28, 2019 issued in counterpart application No. PCT/KR2019/002380, 12 pages.
European Search Report dated Jul. 27, 2020 issued in counterpart application No. 19761641.0-1008, 10 pages.

* cited by examiner

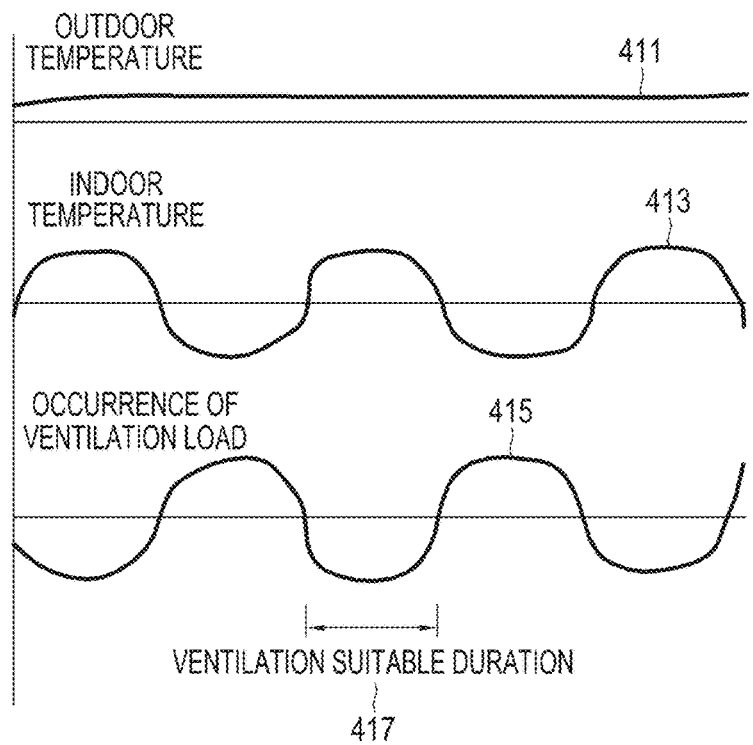
FIG.4
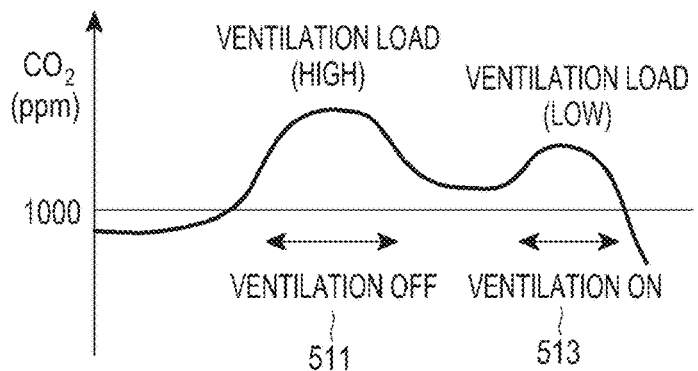
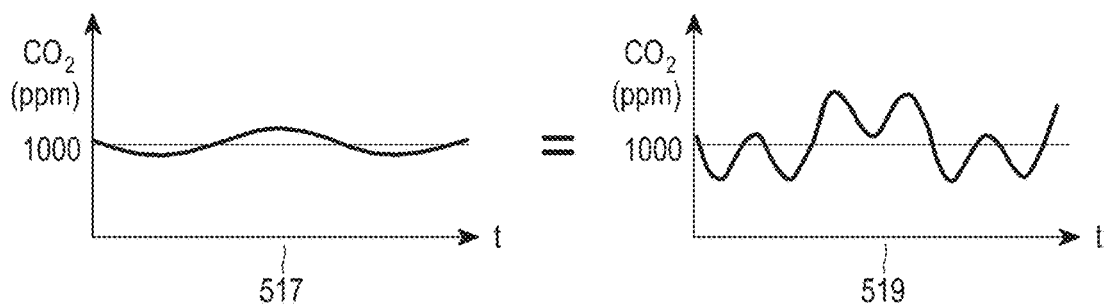
FIG.5

COMPOUND CONTROL APPARATUS AND METHOD THEREOF IN AIR CONDITIONING SYSTEM

CROSS-REFERENCE TO RELATED APPLICATION(S)

This application is based on and claims priority under 35 U.S.C. § 119 to Korean Patent Application No. 10-2018-0024865, filed on Feb. 28, 2018, in the Korean Intellectual Property Office, the disclosure of which is incorporated by reference herein in its entirety.

BACKGROUND

1. Field

The disclosure relates generally to an apparatus and a method for performing a compound control operation in an air conditioning system, and more particularly, to an apparatus and a method for performing a compound control operation for a ventilating apparatus and an air conditioning apparatus.

2. Description of Related Art

The Internet, which is a human centered connectivity network where people generate and consume information, is now evolving into the Internet of things (IoT), where distributed entities, such as things, exchange and process information without human intervention. The Internet of everything (IoE) has also emerged, which is a combination of IoT technology and big data processing technology through connection with a cloud server.

Due to the demand for technology elements such as sensing technology, wired/wireless communication and network infrastructure, service interface technology, and security technology used for IoT implementation, a sensor network, machine-to-machine (M2M) communication, machine type communication (MTC), etc., have been recently researched.

Such an IoT environment may provide intelligent Internet technology services that create new value for human life by collecting and analyzing data generated among connected things. IoT may be applied to a variety of fields including smart homes, smart buildings, smart cities, smart cars or connected cars, smart grids, health care, smart appliances, and advanced medical services through the convergence and combination of existing information technology (IT) and various industrial applications.

Recently, a market for an independent air conditioning system has grown. In this market, a software solution, rather than a hardware solution, is a key element of competitiveness.

In addition, a ventilating apparatus and an air conditioning apparatus are separately implemented in an independent air conditioning system; however, the ventilating apparatus and the air conditioning apparatus are implemented together in a central air conditioning system. In this case, the air conditioning system may be, for example, a system air conditioner (SAC). The SAC includes one or more outdoor units and one or more indoor units connected to each of the one or more outdoor units, where the SAC is connected to a server and operates under the control of the server. The ventilating apparatus may be, for example, an energy recovery ventilation (ERV) apparatus.

The independent air conditioning system may control the ventilating apparatus and the air conditioning apparatus at the same time, or may independently control the ventilating apparatus and the air conditioning apparatus. However, the central air conditioning system may not independently control the ventilating apparatus and the air conditioning apparatus, and controls the ventilating apparatus and the air conditioning apparatus at the same time.

In this case, an operation of the independent air conditioning system is described below.

First, if a ventilating apparatus is turned on or the ventilation amount is increased, air quality becomes better; however, the indoor load which should be removed increases as a result, thus energy consumption for ventilation increases. In this case, load denotes heat which should be removed.

Second, if the ventilating apparatus is turned off or the ventilation amount is decreased, the air quality becomes worse; however, the indoor load which should be removed decreases as a result, thus the energy consumption for ventilation decreases.

Third, if an air conditioning apparatus is turned on or a cooling/heating level is increased, indoor load is removed and comfort at a temperature improves; however, energy consumption for cooling/heating increases. For example, comfort may be expressed with a predicted mean vote (PMV) value. Generally, if a PMV value is within a preset range, e.g., −0.5 to 0.5, a user feels comfortable.

Fourth, if the air conditioning apparatus is turned off or the cooling/heating level is decreased, the indoor load is maintained and the comfort at the temperature becomes worse; however, the energy consumption for cooling/heating decreases.

As described above, a ventilating apparatus and an air conditioning apparatus are closely affected by each other due to the occurrence and removal of indoor load, comfortability of air and comfort at a temperature, energy consumption, etc.

However, in conventional independent air conditioning systems, a ventilating apparatus and an air conditioning apparatus are separately operated, and the independent air conditioning systems have not operated the ventilating apparatus and the air conditioning apparatus by considering operational states of both the ventilating apparatus and the air conditioning apparatus.

SUMMARY

An aspect of the disclosure is to provide an apparatus and a method for performing a compound control operation in an air conditioning system.

Another aspect of the disclosure is to provide an apparatus and a method for controlling a ventilating apparatus and an air conditioning apparatus based on operational states of both of the ventilating apparatus and the air conditioning apparatus in an air conditioning system.

Another aspect of the disclosure is to provide an apparatus and a method for controlling a ventilating apparatus and an air conditioning apparatus based on an air state change and a temperature change in an air conditioning system.

Another aspect of the disclosure is to provide an apparatus and a method for controlling a ventilating apparatus and an air conditioning apparatus, thereby decreasing ventilating load in an air conditioning system.

Another aspect of the disclosure is to provide an apparatus and a method for controlling a ventilating apparatus and an air conditioning apparatus, thereby decreasing consumption of cooling/heating energy in an air conditioning system.

Another aspect of the disclosure is to provide an apparatus and a method for controlling a ventilating apparatus and an air conditioning apparatus thereby decreasing a sum of cooling/heating energy for removing a ventilating load and ventilating energy in an air conditioning system.

According to an embodiment of the disclosure, a method of a server in an air conditioning system is provided. The method includes detecting a schedule duration for a compound control zone in which a compound control operation for controlling a ventilating operation and a cooling/heating operation will be performed, determining a ventilating schedule based on an air state change, and determining a cooling/heating schedule.

According to an embodiment of the disclosure, a method of a server in an air conditioning system is provided. The method includes detecting a schedule duration for a compound control zone in which a compound control operation for controlling a ventilating operation and a cooling/heating operation will be performed, determining a cooling/heating schedule based on a temperature change, and determining a ventilating schedule.

According to an embodiment of the disclosure, a server in an air conditioning system is provided. The server includes a controller configured to detect a schedule duration for a compound control zone in which a compound control operation for controlling a ventilating operation and a cooling/heating operation will be performed, determine a ventilating schedule based on an air state change, and determine a cooling/heating schedule, and a communication unit configured to transmit information which is based on the ventilating schedule to a ventilating apparatus, and transmit information which is based on the cooling/heating schedule to an air conditioning apparatus.

According to an embodiment of the disclosure, a server in an air conditioning system is provided. The server includes a controller configured to detect a schedule duration for a compound control zone in which a compound control operation for controlling a ventilating operation and a cooling/heating operation will be performed, determine a cooling/heating schedule based on a temperature change, and determine a ventilating schedule, and a communication unit configured to transmit information which is based on the ventilating schedule to a ventilating apparatus, and transmit information which is based on the cooling/heating schedule to an air conditioning apparatus.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a chart of a process of determining a ventilating schedule in a server in an air conditioning system according to an embodiment of the disclosure;

FIG. 5 is a series of charts of a process of determining a ventilating schedule in a server in an air conditioning system according to an embodiment of the disclosure;

DETAILED DESCRIPTION

Figure 1:
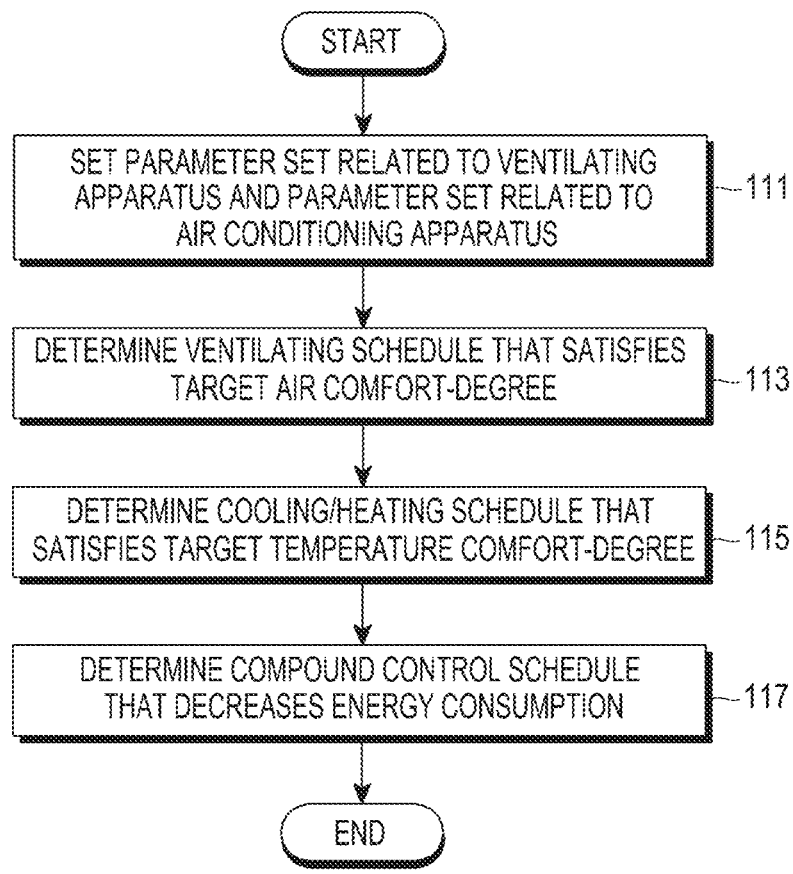
FIG. 1 is a flowchart illustrating a method of performing a compound control operation in a server in an air conditioning system according to an embodiment of the disclosure.

Various embodiments of the disclosure are described below with reference to the accompanying drawings. However, the scope of the disclosure is not intended to be limited to these particular embodiments. Instead, the disclosure covers various modifications, equivalents, and/or alternatives falling within the scope of the disclosure as defined by the appended claims.

In relation to the descriptions of the drawings, like reference numerals may denote the like parts, components, and structures.

Definitions for certain words and phrases are provided throughout the disclosure. Those of ordinary skill in the art should understand that in many, if not most instances, such definitions apply to prior, as well as future, uses of such defined words and phrases.

The terms "include" and "comprise," as well as derivatives thereof, indicate inclusion without limitation. The term "or" is inclusive, indicating "and/or." The phrases "associated with" and "associated therewith," as well as derivatives thereof, may indicate "to include," "be included within," "interconnect with," "contain," "be contained within," "connect to or with," "couple to or with," "be communicable with," "cooperate with," "interleave," "juxtapose," "be proximate to," "be bound to or with," "have," "have a property of," and the like. The term "controller" indicates any device, system or part thereof that controls at least one operation, where such a device may be implemented in hardware, firmware or software, or some combination of at least two of the same. The functionality associated with any particular controller may be centralized or distributed, whether locally or remotely.

The terms "have," "may have," "include," and "may include" signify the presence of a certain feature (for example, a number, a function, an operation, or a component such as a part), without excluding the presence of one or more other features.

The terms "A or B," "at least one of A or/and B," or "one or more of A or/and B" may cover all possible combinations of enumerated items. For example, the terms "A or B," "at least one of A and B," and "at least one of A or B" may represent all of the cases of (1) inclusion of at least one A, (2) inclusion of at least one B, and (3) inclusion of at least one A and at least one B.

The terms "first" and "second" may modify the names of various components irrespective of sequence and/or importance, without limiting the components. These terms are used to distinguish one component from another component. For example, a first user device and a second user device may indicate different user devices irrespective of sequence or importance. For example, a first component may be referred to as a second component and vice versa without departing the scope of the disclosure.

When a component (e.g., a first component) is described as being "operatively or communicatively coupled with/to" or "connected to" another component (e.g., a second component), the first component is connected to the second component directly or through any other component (e.g., a third component). However, when the first component is described as being "directly connected to" or "directly coupled to" the component, no other component may be therebetween.

The term "configured to" as used herein may be replaced with, for example, the terms "suitable for," "having the capacity to," "designed to," "adapted to," "made to," or "capable of" under circumstances. The term "configured to" does not necessarily indicate "specifically designed to" in hardware. Instead, the term "configured to" may indicate that a device is "capable of" with another device or part. For example, "a processor configured to execute A, B, and C" may indicate a dedicated processor (e.g., an embedded processor) for performing the corresponding operations or a general-purpose processor (e.g., a central processing unit (CPU) or an application processor (AP)) for performing the operations.

The terms as used in the disclosure are provided merely to describe certain embodiments, but are not intended to limit the scope of the disclosure. Singular forms include plural referents unless the context clearly dictates otherwise.

Unless otherwise defined, the terms and words used in the disclosure may have the same meanings as generally understood by those skilled in the art. The terms as generally defined in dictionaries may be interpreted as having the same or similar meanings as or to contextual meanings of related technology. Unless otherwise defined, the terms should not be interpreted as ideally or excessively formal meanings. When needed, even the terms as defined in the disclosure may not be interpreted as excluding embodiments of the disclosure.

According to embodiments of the disclosure, an electronic device is a user device equipped with communication functionalities, which should be able to detect its position and generate position information based on the detected position. An electronic device may be classified into, for example, a portable type, a wearable type, a cradle type, an installed type, etc.

The portable electronic device may include at least one of a smart phone, a tablet personal computer (PC), a mobile phone, a video phone, an electronic book (e-Book) reader, a personal digital assistant (PDA), a portable multimedia player (PMP), a moving picture experts group audio layer 3 (MP3) player, a mobile medical equipment, an electronic dictionary, a camcorder, a camera, and an electronic picture frame.

An example of the wearable electronic device is a wearable device. The wearable device may be at least one of an accessory type (e.g., a watch, a ring, a bracelet, an ankle bracelet, a necklace, glasses, contact lenses, swimming goggles, or a head-mounted device (HMD)), a fabric or clothes type (e.g., electronic clothes or sportswear), an attached type (e.g., a skin pad or a tattoo), or an implantable type (e.g., an implantable circuit).

The cradle electronic device may be at least one of a navigator, a laptop PC, or a netbook computer, and the installed electronic device may be at least one of a desktop PC, a workstation, a medical equipment, or a surveillance camera such as a closed circuit television (CCTV).

An electronic device may be at least one of furniture, a part of a building/structure, an electronic board, an electronic signature receiving device, a projector, or various measuring devices (e.g., water, electricity, gas, electromagnetic wave measuring devices, etc.). An electronic device may be a flexible electronic device. An electronic device may also be a combination of two or more of the above-described devices.

In addition, an electronic device according to the disclosure is not limited to the foregoing devices, but may include a new electronic device produced along with technology development.

Embodiments of the disclosure provide an apparatus and a method for performing a compound control operation in an air conditioning system.

Embodiments of the disclosure provide an apparatus and a method for controlling a ventilating apparatus and an air conditioning apparatus based on operational states of both of the ventilating apparatus and the air conditioning apparatus in an air conditioning system.

Embodiments of the disclosure provide an apparatus and a method for controlling a ventilating apparatus and an air conditioning apparatus based on an air state change and a temperature change in an air conditioning system.

Embodiments of the disclosure provide an apparatus and a method for controlling a ventilating apparatus and an air conditioning apparatus, thereby decreasing ventilating load in an air conditioning system.

Embodiments of the disclosure provide an apparatus and a method for controlling a ventilating apparatus and an air conditioning apparatus, thereby decreasing consumption of cooling/heating energy in an air conditioning system.

Embodiments of the disclosure provide an apparatus and a method for controlling a ventilating apparatus and an air conditioning apparatus, thereby decreasing a sum of cooling/heating energy for removing the ventilating load and ventilating energy in an air conditioning system.

In embodiments of the disclosure, an air conditioning system includes a ventilating apparatus and an air conditioning apparatus.

In embodiments of the disclosure, an air conditioning system is an independent air conditioning system. The independent air conditioning system denotes an air conditioning system in which a ventilating apparatus and an air conditioning apparatus are separately implemented.

In embodiments of the disclosure, the air conditioning system is, for example, a SAC. The SAC includes one or more outdoor units and one or more indoor units connected to each of the one or more outdoor units, where the SAC is connected to a server and operates under the control of the server.

In embodiments of the disclosure, the ventilating apparatus is, e.g., an ERV apparatus. The ERV apparatus is a two-way ventilating apparatus which discharges polluted air from the inside to the outside, and supplies fresh outside air to the inside at the same time. In addition, the ERV apparatus is a heat recovery ventilator which is based on an electric heat exchange scheme which recovers heat energy lost to the outside during ventilation and supplies the recovered heat energy to the inside. The ERV apparatus provides a user, who is inside, with comfort by considering the temperature and humidity through a high-moisture transmission element.

As indicated above, the disclosure describes a compound control operation for considering operational states of both a ventilating apparatus and an air conditioning apparatus such that air-comfort requirement and temperature-comfort requirement may be satisfied and energy consumption may be decreased, for example, energy consumption may be minimized in an air conditioning system.

FIG. 1 is a flowchart of a method of performing a compound control operation in a server in an air conditioning system according to an embodiment of the disclosure.

Referring to FIG. 1, a server sets values of parameters included in a parameter set related to a ventilating apparatus and a parameter set related to an air conditioning apparatus in step 111. The parameter set related to the ventilating apparatus includes parameters related to the ventilating apparatus, and the parameter set related to the air conditioning apparatus includes parameters related to the air conditioning apparatus. The parameters related to the ventilating apparatus and the parameters related to the air conditioning apparatus may include information about a time during which a compound control operation will be performed.

The server determines a ventilating schedule which satisfies an air comfort-degree criterion, that is, a ventilating schedule which may satisfy a target air comfort-degree in step 113. In this case, the air comfort-degree criterion may be, for example, that the average $CO_2$ concentration of a compound control zone is less than or equal to 1000 parts per million (ppm), etc. Although $CO_2$ concentration is used as a parameter indicating air quality, parameters other than $CO_2$ concentration may be used to indicate air quality.

For example, the average $CO_2$ concentration of the compound control zone may be the average $CO_2$ concentration of the compound control zone for which unit time is considered, or the average $CO_2$ concentration for time during which a compound control operation is performed, i.e., compound control time, and the air comfort-degree criterion may be implemented with various forms according to a situation of the air conditioning system.

In FIG. 1, the air comfort-degree criterion is set based on $CO_2$ concentration; however, the air comfort-degree criterion may be set based on other parameters as well as the $CO_2$ concentration. When determining a ventilating schedule that satisfies the air comfort-degree criterion, the server may determine the ventilating schedule such that ventilation load may be decreased. Here, load denotes heat that should be removed, and ventilation load denotes a load which occurs due to ventilation.

A zone may refer to an independent space that may be affected by a comfort-degree of air and a comfort-degree of temperature according to an installed ventilating apparatus and air conditioning apparatus, such as an office, a meeting room, a living room, a bedroom, a bathroom, a dining room, a swimming pool, a patient room, a lecture room, etc. A default zone may refer to a space including a plurality of zones. For example, a building may be a default zone, where the building may include a plurality of zones, where each zone is one of an office space, a lounge, a meeting room, etc.

As another example, a house may be a default zone, where the house may include a plurality of zones, where each zone is one of a room, a living room, a kitchen, a dining room, a bathroom, etc.

As yet another example, a hotel may be a default zone, where the hotel may include a plurality of zones, where each zone is one of a room, a lobby, a restaurant, a bar, a swimming pool, a fitness center, and/or the like. For example, a school may be a default zone, where the school may include a plurality of zones, where each zone is one of a classroom, a library, a cafeteria, etc.

As yet another example, a retailer/mall may be a default zone, where the retailer/mall may include a plurality of zones, where each zone is one of a showroom, a digital signage, a food court, etc.

As yet another example, a stadium may be a default zone, where the stadium may include a plurality of zones, where each zone is one of a stand, a score board, a stage, etc.

As yet another example, a factory may be a default zone, where the factory may include a plurality of zones, where each zone is one of an automated facility (e.g., a manufacture line), a manual workplace, a warehouse, etc.

As yet another example, a hospital may be a default zone, where the hospital may include a doctor's office, a patient's room, an emergency room, etc.

Herein, a compound control zone refers to a zone in which a compound control operation is performed by a server or a user device in an air conditioning system. The compound control zone may be, e.g., an office zone, and a default zone in which the compound control zone is included may be a building. The default zone may include a plurality of zones, and the plurality of zones may include the compound control zone, one or more zones that are adjacent to the compound control zone, and one or more zones that are not adjacent to the compound control zone. Herein, the term "user device" may be interchangeable with the terms "terminal," "user equipment," "mobile device," "device," "mobile terminal," "mobile station," etc.

The server determines a cooling/heating schedule which satisfies a temperature comfort-degree criterion, i.e., a cooling/heating schedule which satisfies a target temperature comfort-degree in step 115. In this case, the temperature comfort-degree criterion may be, for example, that an average predicted percentage of dissatisfied (PPD) of a compound control zone is less than or equal to a preset threshold PPD. The PPD is an index which provides information about thermal uncomfortableness by predicting the ratio of people who feel too hot or too cold in a given environment, and the PPD may be derived from, e.g., a PMV value. The average PPD of the compound control zone may be an average PPD of the compound control zone for which unit time is considered, or an average PPD during the time for which a compound control operation is performed, i.e., compound control time, and the temperature comfort-degree criterion may be implemented with various forms according to a situation of the air conditioning system.

In FIG. 1, the temperature comfort-degree criterion is set based on an average PPD, however, the temperature comfort-degree criterion may be set based on various parameters as well as the average PPD. The server may determine the cooling/heating schedule such that loss of cooling/heating energy is decreased, e.g., such that the loss of cooling/heating energy is minimized upon determining the cooling/heating schedule which satisfies the temperature comfort-degree criterion.

The server determines a compound control schedule that decreases consumption of ventilation energy and cooling/heating energy, e.g., a compound control schedule that minimizes the consumption of the ventilation energy and the cooling/heating energy based on the determined ventilating schedule and the cooling/heating schedule, and operates the ventilating apparatus and the air conditioning apparatus based on the compound control schedule in step 117. The compound control schedule operates the ventilating apparatus and the air conditioning apparatus by considering operational states of both the ventilating apparatus and the air conditioning apparatus. The ventilation energy refers to energy consumed for ventilation, and the cooling/heating energy denotes energy consumed for cooling/heating.

Although shown as a series of operations, the various operations in FIG. 1 could overlap, occur in parallel, occur in a different order, or occur multiple times.

Figure 2:
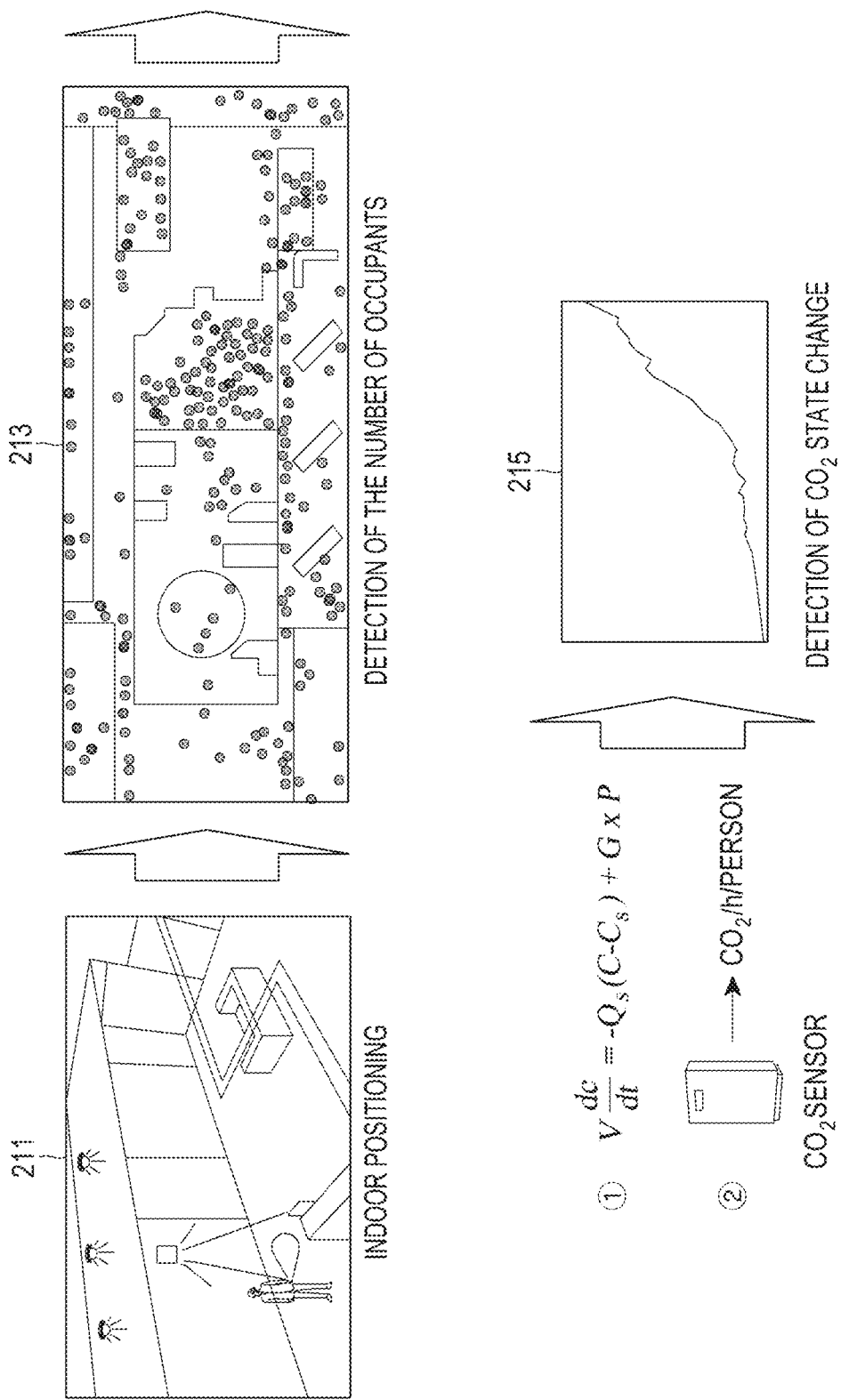
FIG. 2 is an illustration of a process of detecting a carbon dioxide ($CO_2$) state change for determining a ventilating schedule in a server in an air conditioning system according to an embodiment of the disclosure.

FIG. 2 is an illustration of a process of detecting a $CO_2$ state change for determining a ventilating schedule in a server in an air conditioning system according to an embodiment of the disclosure.

Referring to FIG. 2, an air comfort-degree criterion is set based on $CO_2$ concentration, and the server detects a $CO_2$ state change for determining a ventilating schedule.

The server performs inner positioning on a compound control zone 211 to detect the number of users who are in the compound control zone, i.e., the number of occupants 213.

The server may perform an indoor positioning operation based on one of various indoor positioning schemes, and a detailed description of the indoor positioning schemes is omitted herein. The server detects the number of user devices which are located at the compound control zone and detects the average $CO_2$ concentration of the compound control zone through a $CO_2$ sensor installed at the compound control zone. However, the server may detect the average $CO_2$ concentration of the compound control zone based on Equation (1) below without using the $CO_2$ sensor.

$$V\frac{dC}{dt} = -Q_S(C - C_S) + G \times P \tag{1}$$

In Equation (1) above, V denotes an inner volume of the compound control zone, t denotes a time used for detecting the average $CO_2$ concentration of the compound control zone, C denotes an inner $CO_2$ concentration, $C_S$ denotes an outer $CO_2$ concentration, $Q_S$ denotes an amount of air supply, P denotes a number of occupants, i.e., the number of user devices which are located at the compound control zone, and G denotes an amount of $CO_2$ emission per person. Herein, it is assumed that a user's location is identical to the location of the user's device, thus if the location of the user device is detected, the user's location is also detected. Herein, "an inner $CO_2$ concentration" denotes a $CO_2$ concentration within the compound control zone, and "an outer $CO_2$ concentration" denotes a $CO_2$ concentration of the outside of the compound control zone.

The server may detect a $CO_2$ state change based on the average $CO_2$ concentration 215.

Figure 3:
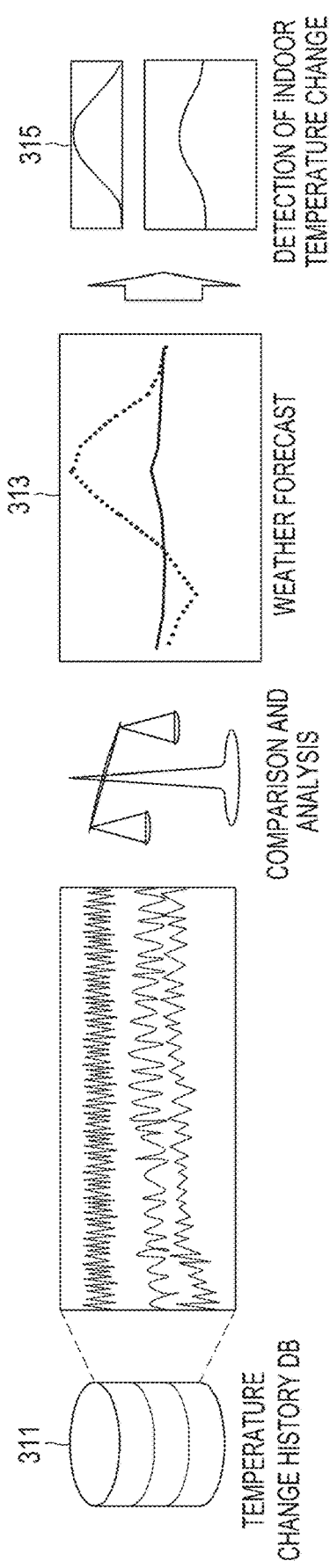
FIG. 3 is an illustration of a process of detecting an indoor temperature change for determining a ventilating schedule in a server in an air conditioning system according to an embodiment of the disclosure.

FIG. 3 is an illustration of a process of detecting an indoor temperature change for determining a ventilating schedule in a server in an air conditioning system according to an embodiment of the disclosure.

Referring to FIG. 3, a server detects a history of temperature change of each of an indoor temperature and an outdoor temperature 311, compares the detected temperature change of each of the indoor temperature and the outdoor temperature with a weather forecast 313, and detects an indoor temperature change 315.

FIG. 4 is a chart of a process of determining a ventilating schedule in a server in an air conditioning system according to an embodiment of the disclosure.

Referring to FIG. 4, the ventilation load of a compound control zone is proportional to ΔT as the difference between the indoor temperature, i.e., a temperature within the compound control zone, and the outdoor temperature, i.e., a temperature of the outside of the compound control zone, thus, a server may determine a ventilating schedule for decreasing ventilation load, e.g., a ventilating schedule for minimizing the ventilation load. In FIG. 4, a reference numeral 411 shows a graph indicating the outdoor temperature according to time, a reference numeral 413 shows a graph indicating an indoor temperature according to time, and a reference numeral 415 shows a graph indicating ventilation load according to time. In this case, the ventilation load occurs if a ventilating apparatus is turned on.

That is, the server may determine a ventilating schedule that makes a ventilating apparatus turn on in a ventilation suitable duration 417 where ventilation load is relatively low and cooling/heating loss is low. In this case, the ventilation load may be expressed as shown in Equation (2) below.

$$W_{load} = PC_p Q(T - T_0) \qquad (2)$$

In Equation (2) above, $W_{load}$ denotes ventilation load, Q denotes ventilation amount, T denotes an indoor temperature, $T_0$ denotes an outdoor temperature, and P denotes a number of occupants.

In FIG. 4, the ventilation load is proportional to the ventilation amount Q and the difference ΔT between the indoor temperature and the outdoor temperature, however, the ventilation load may be proportional to the enthalpy difference (ΔH) if enthalpy is considered.

In a general ventilating apparatus, $CO_2$ concentration is measured in real time, and an operation of the ventilating apparatus is controlled based on the measured $CO_2$ concentration, thus, it is impossible to control the operation of the ventilating apparatus by considering ventilation load as illustrated in FIG. 4.

FIG. 5 is a series of charts of a process of determining a ventilating schedule in a server in an air conditioning system according to an embodiment of the disclosure.

Referring to FIG. 5, a server may determine a ventilating schedule for a compound control zone which satisfies target $CO_2$ concentration during a preset time duration and when a ventilation load is considered.

As illustrated in FIG. 5, target $CO_2$ concentration is, e.g., 1000 ppm, and a preset time duration is, e.g., 8 hours, the server makes a ventilating apparatus turn off during a time duration for which a ventilation load is relatively large and which corresponds to reference numeral 511, and makes the ventilating apparatus turn on during a time duration for which a ventilation load is relatively small and which corresponds to reference numeral 513 by satisfying the target $CO_2$ concentration and considering the ventilation load.

As illustrated in FIG. 5, if the ventilating apparatus is turned off during the time duration which corresponds to reference numeral 511 and turned on during the time duration which corresponds to reference numeral 513 for 8 hours for the compound control zone, the actual $CO_2$ concentration of the compound control zone may be maintained at relatively constant $CO_2$ concentration for 8 hours as marked with reference numeral 517 as shown in a graph as marked with reference numeral 519.

In a general ventilating apparatus, an indoor temperature is measured in real time, and an operation of the ventilating apparatus is controlled based on the measured indoor temperature, thus it will be understood that it is impossible to control the operation of the ventilating apparatus by considering ventilation load as illustrated in FIG. 5.

In the disclosure, a ventilating schedule is determined based on an indoor temperature change and a $CO_2$ state change of a compound control zone as illustrated in FIGS. 4 and 5, thus, consumption of cooling/heating energy due to ventilation may be decreased.

Figure 6:
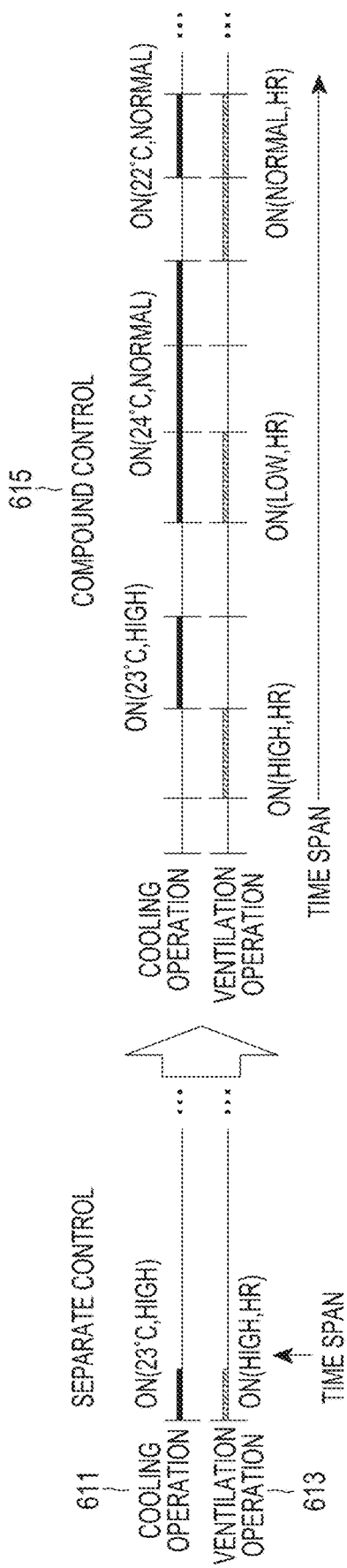
FIG. 6 is an illustration of a process of generating a compound control command in an air conditioning system according to an embodiment of the disclosure.

FIG. 6 is an illustration of a process of generating a compound control command in an air conditioning system according to an embodiment.

Referring to FIG. 6, a ventilating operation and an air conditioning operation are separately controlled in an independent air conditioning system. In FIG. 6, the air conditioning apparatus is an SAC, and the ventilating apparatus is an ERV apparatus. That is, as illustrated in FIG. 6, in a conventional independent air conditioning system, the SAC operation 611 and the ERV operation 613 are separately operated based on values which are measured in real time, i.e., $CO_2$ concentration and an indoor temperature. Like this, the SAC and the ERV apparatus are separately operated, thus, a remote control of the SAC and a remote control of the ERV apparatus also separately exist.

That is, in the general independent air conditioning system, the SAC and the ERV apparatus are separately operated based on the values which are measured in real time, thus, compound control that satisfies a target air comfort-degree and a target temperature comfort-degree, and decreases energy consumption is impossible.

However, in accordance with an embodiment of the disclosure, an independent air conditioning system may use compound control 615 to control an SAC and an ERV apparatus together without independently controlling the SAC and the ERV apparatus, thus, a cooling/heating operation of the SAC and a ventilating operation of the ERV apparatus are performed together. That is, in accordance with an embodiment of the disclosure, compound control may be implemented, which considers a target temperature comfort-degree and a target air comfort-degree together and decreases consumption of ventilation energy and consumption of cooling/heating energy.

In FIG. 6, the SAC performs a cooling operation 611, thus, a server generates a compound control command such that the SAC and the ERV apparatus operate in an order, such as ERV-on, SAC-on, EVR-on and SAC-on, ERV-on, SAC-on, during the compound control 615. The SAC and the ERV apparatus operate together, thus, an integrated remote control which may control both the SAC and the ERV apparatus is implemented, and the integrated remote control includes a compound control command button for controlling the SAC and the ERV apparatus together. The compound control command button may be physically implemented or may be implemented with software, and there is no limitation to a scheme of implementing the compound control command. Further, a UI, which may input various parameters, such as a threshold PPD related to a target temperature comfort-degree, $CO_2$ concentration related to a target air comfort-degree, a set temperature, etc., may be implemented in the integrated remote control.

Figure 7:
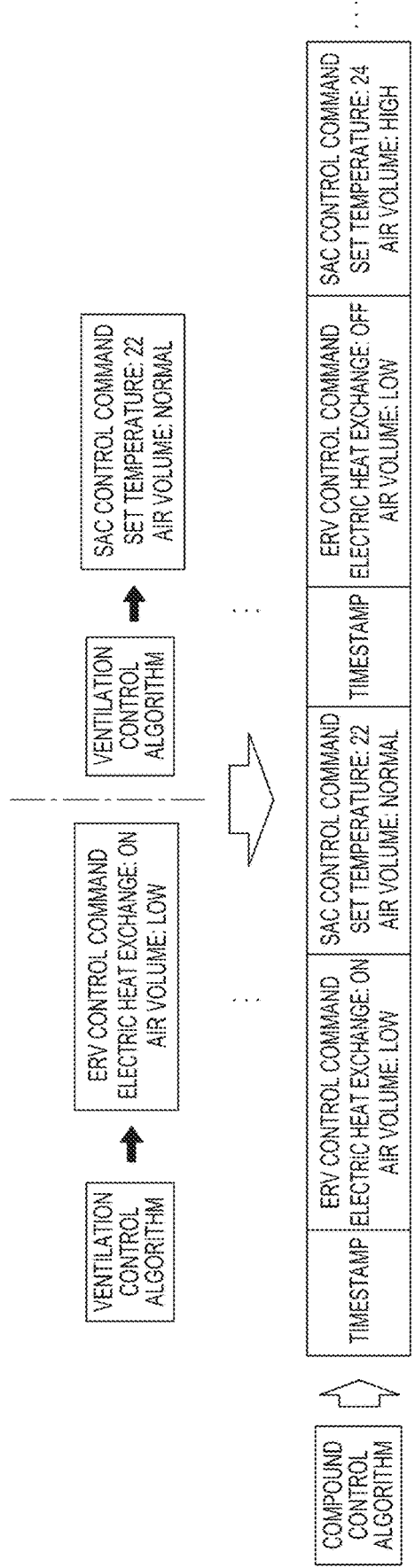
FIG. 7 is an illustration of a process of generating a compound control command in an air conditioning system according to an embodiment of the disclosure.

FIG. 7 is an illustration of a process of generating a compound control command in an air conditioning system according to an embodiment of the disclosure.

Referring to FIG. 7, an air conditioning apparatus is an SAC, and a ventilating apparatus is an ERV apparatus. In a general independent air conditioning system, an SAC and an ERV apparatus are separately controlled, thus a control command is also generated for each of the SAC and the ERV apparatus. For example, in FIG. 7, a control command indicating that a set temperature is 22° C., and air volume is normal is generated for the SAC, and a control command indicating that electric heat exchange is on, and air volume is low is generated for the ERV apparatus. In this case, air volume may be classified into low, normal, and high based on given thresholds. Air volume of the first threshold value may be "low" air volume, air volume of the second threshold value may be "normal" air volume, and air volume of the third threshold value may be "high".

In accordance with an embodiment of the disclosure, an SAC and an ERV apparatus are controlled together, thus, a control command is implemented with a compound control command for both the SAC and the ERV apparatus, and the compound control command includes a time stamp, a control command for the ERV apparatus, and a control command for the SAC. For example, in FIG. 7, a compound control command indicating a time stamp, a control command indicating electric heat exchange-on and air volume-low for an ERV apparatus, a control command indicating a set temperature 22° C. and air volume-normal for an SAC, a time stamp, a control command indicating electric heat exchange-off and air volume-low for the ERV apparatus, a control command indicating a set temperature 24° C. and air volume-high for the SAC, etc. is generated.

Figure 8:
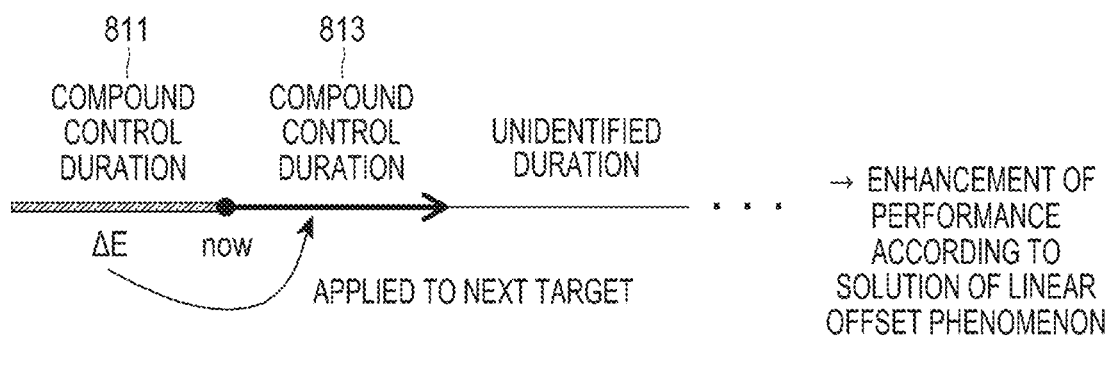
FIG. 8 is an illustration of a process of performing a compound control operation based on error feedback in a server in an air conditioning system according to an embodiment of the disclosure.

FIG. 8 is an illustration of a process of performing a compound control operation based on error feedback in a server in an air conditioning system according to an embodiment of the disclosure.

Referring to FIG. 8, a server generates a compound control command for a compound control duration 811 by considering both a ventilating apparatus and an air conditioning apparatus. The server generates the compound control command based on target $CO_2$ concentration and a target indoor temperature. The server performs a compound control operation corresponding to the compound control command in the compound control duration 811. That is, the server operates the ventilating apparatus and the air conditioning apparatus corresponding to the compound control command in the compound control duration 811.

The server detects a difference $\Delta E$ between the target $CO_2$ concentration and the target indoor temperature and $CO_2$ concentration and an indoor temperature which are actually measured in the compound control duration 811. The server generates a compound control command such that the detected $\Delta E$ may be applied to a next compound control duration 813, and performs a compound control operation corresponding to the generated compound control command such that the $\Delta E$ may be applied to the next compound control duration 813.

In this way, a compound control operation may be performed by reflecting error feedback for the compound control operation if the compound control operation is performed for each compound control duration. That is, the server may enhance compound control performance by solving a linear offset phenomenon.

Figure 9:
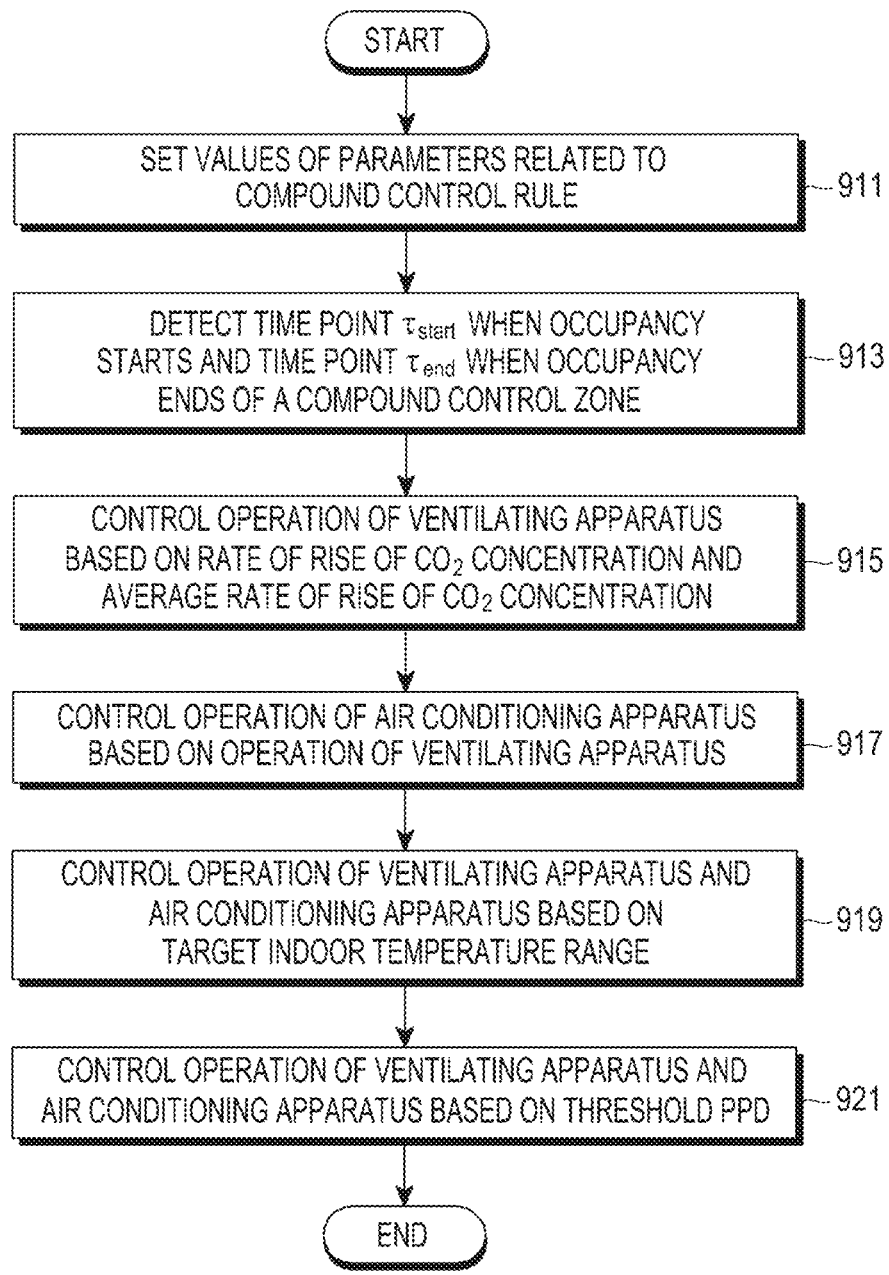
FIG. 9 is a flowchart illustrating a method of performing a compound control operation based on a compound control rule in a server in an air conditioning system according to an embodiment of the disclosure.

FIG. 9 is a flowchart of a method of performing a compound control operation based on a compound control rule in a server in an air conditioning system according to an embodiment of the disclosure.

A server performs a compound control operation based on a compound control rule including the following rules.

(1) A ventilating apparatus is turned on preferentially from a time duration during which the rate of rise of $CO_2$ per unit time is high.

(2) A schedule of a ventilating apparatus and an air conditioning apparatus is determined by considering a mutually exclusive operation between the ventilating apparatus and the air conditioning apparatus.

(3) A schedule of a ventilating apparatus and an air conditioning apparatus is determined such that a permitted indoor temperature range may be maintained. In this case, the permitted indoor temperature range denotes an indoor temperature range which may be permitted in the air conditioning system. In the disclosure, in a case in which a target indoor temperature range of a compound control zone is determined, for a compound control operation, the target indoor temperature range is not limited when a schedule of the ventilating apparatus and the air conditioning apparatus is controlled if an indoor temperature of the compound control zone is within the permitted indoor temperature range even if the indoor temperature of the compound control zone is out of the target indoor temperature range.

(4) An air conditioning apparatus is turned on in an ascending order of removal load per cooling/heating unit energy.

(5) A schedule of a ventilating apparatus is determined such that the sum of cooling/heating energy for removing the ventilation load and ventilation energy is decreased, for example, such that the sum of the cooling/heating energy for removing the ventilation load and the ventilation energy is minimized.

Referring to FIG. 9, a server sets values of parameters included in each of parameter sets for applying a compound control rule in step 911. The parameter sets for applying the compound control rule may include a parameter set related to a ventilating apparatus and a parameter set related to an air conditioning apparatus. The parameter set related to the ventilating apparatus may include target $CO_2$ concentration, air volume for ventilation, an average rate of rise of $CO_2$ concentration, and/or the like, and the parameter set related to the air conditioning apparatus may include a target PPD, air volume for cooling/heating, a set temperature, a target indoor temperature range, a maximum permitted indoor temperature and a minimal permitted indoor temperature, and/or the like.

The server detects a time point $\tau_{start}$ when occupancy starts and a time point $\tau_{end}$ when the occupancy ends of a compound control zone in step 913. In this case, a time duration from the time point $\tau_{start}$ to the time point $\tau_{end}$ is a schedule duration during which a compound control operation is performed. The time point $\tau_{start}$ and the time point $\tau_{end}$ of the compound control zone may be detected based on a $CO_2$ concentration change of the compound control zone.

In this case, the $CO_2$ concentration change of the compound control zone may be detected through a $CO_2$ sensor installed at the compound control zone.

The server controls the ventilating apparatus to be turned on during a time duration during which the rate of rise of $CO_2$ concentration is greater than an average rate of rise of $CO_2$ concentration of the schedule duration during the schedule duration in step 915. That is, the server allocates ventilating operation-on to the time duration of which the rate of rise of $CO_2$ concentration is greater than the average rate of rise of $CO_2$ concentration. In this case, allocation of ventilating operation-on to a certain time duration indicates that the server controls the ventilating apparatus to be turned on during the certain time duration. The server controls the ventilating apparatus to be turned off during a time duration of which the rate of rise of $CO_2$ concentration is less than or equal to the average rate of rise of $CO_2$ concentration during the schedule duration. That is, the server allocates ventilating operation-off to the time duration of which the rate of rise of $CO_2$ concentration is less than or equal to the average rate of rise of $CO_2$ concentration. In this case, allocation of ventilating operation-off to a certain time duration indicates that the server controls the ventilating apparatus to be turned off during the certain time duration. The server may control the ventilating apparatus to be turned on or turned off based on a preset rule or randomly during a time duration except for the time duration of which the rate of rise of $CO_2$ concentration is greater than the average rate of rise of $CO_2$ concentration and the time duration of which the rate of rise of $CO_2$ concentration is less than or equal to the average rate of rise of $CO_2$ concentration. The server controls an operation of the air conditioning apparatus based on an operation of the ventilating apparatus in step 917. That is, the server controls the operation of the air conditioning apparatus such that a cooling/heating operation of the air conditioning apparatus is turned off during a duration for which the ventilating apparatus is turned on. Alternatively, the server controls the operation of the air conditioning apparatus such that the cooling/heating operation of the air conditioning apparatus is turned on during a duration for which the ventilating apparatus is turned off.

The server detects an indoor temperature of the compound control zone during each duration for which the ventilating apparatus is turned on or off, and determines whether the indoor temperature during each duration is within a target indoor temperature range in step 919. If an indoor temperature of at least one duration is not within the target indoor temperature range, the server controls an operation of the air conditioning apparatus such that a cooling/heating operation for the at least one duration is turned on. In this case, the cooling/heating operation for the at least one duration is turned on, thus, the server controls the ventilating apparatus to be turned off during the at least one duration.

The server detects a PPD of the compound control zone during each duration for which the ventilating apparatus is turned on or off, and determines whether the PPD during each duration is greater than the threshold PPD in step 921. If the PPD during at least one duration is greater than a threshold PPD, the server controls an operation of the air conditioning apparatus such that a cooling/heating operation is turned on during one of at least one duration of which a PPD is greater than the threshold PPD. In this case, the cooling/heating operation during the at least one duration is turned on, thus, the server controls the ventilating apparatus to be turned off during the at least one duration.

In FIG. 9, the server controls the ERV apparatus turn on or off, and controls the SAC turn on or off.

Alternatively, the server may control the operation of the ERV apparatus by controlling an operation mode, e.g., an electric heat exchange mode and an operation mode, which are based on air volume as well as an on-operation or an off-operation, and may control the operation of the SAC by controlling an operation mode, e.g., an operation mode based on a set temperature and air volume as well as an on-operation or an off-operation.

Thus, when the server performs a compound control operation, the server may consider a change in the operation mode of the ERV apparatus and the operation mode of the SAC or may predetermine the operation mode of the ERV apparatus and the operation mode of the SAC upon considering all cases in which the ventilating operation and the cooling/heating operation of the air conditioning system are possible. If a duration for which a $CO_2$ concentration change and a temperature change may be detected is greater than a preset threshold duration, the server may consider all cases in which the ventilating operation and the cooling/heating operation of the air conditioning system are possible by considering the change in the operation mode of the ERV apparatus and the operation mode of the SAC as described above.

As described above, the server may predetermine the operation mode of the ERV apparatus and the operation mode of the SAC to consider all cases in which the ventilating operation and the cooling/heating operation of the air conditioning system are possible, which is described below.

The server maximizes energy efficiency by setting each of air volume of the ERV apparatus and air volume of the SAC to strong wind. In this case, consumed power of the ERV apparatus and the consumed power of the SAC are not doubled even if the air volume of the ERV apparatus and the air volume of the SAC are doubled. Thus, if each of the air volume of the ERV apparatus and the air volume of the SAC is set to strong wind, increase of the consumed power of the ERV apparatus and the consumed power of the SAC is relatively low and energy consumed for ventilation and cooling/heating may be decreased, thus, energy efficiency of the ERV apparatus and the SAC may be increased.

The server basically sets an electric heat exchange mode of the ERV apparatus to on. Under an indoor/outdoor enthalpy condition in which a cooling/heating operation may be performed by inputting outdoor air, the server sets the electric heat exchange mode of the ERV apparatus to off. In this case, a compound control operation may not be performed.

The server sets a set temperature of the SAC to a default temperature $T_s$. If the SAC uses a separate cooling/heating algorithm, e.g., an ATOS cooling/heating algorithm, the server may set a set temperature determined in the separate cooling/heating algorithm to the default temperature.

In addition, a schedule duration in which a server performs a compound control operation based on a compound control rule as shown in FIG. 9 may be a predicted duration.

Although FIG. 9 illustrates an example of a process of performing a compound control operation based on a compound control rule in a server in an air conditioning system according to an embodiment of the disclosure, various changes could be made to FIG. 9. For example, although shown as a series of operations, various operations in FIG. 9 could overlap, occur in parallel, occur in a different order, or occur multiple times.

Figure 10:
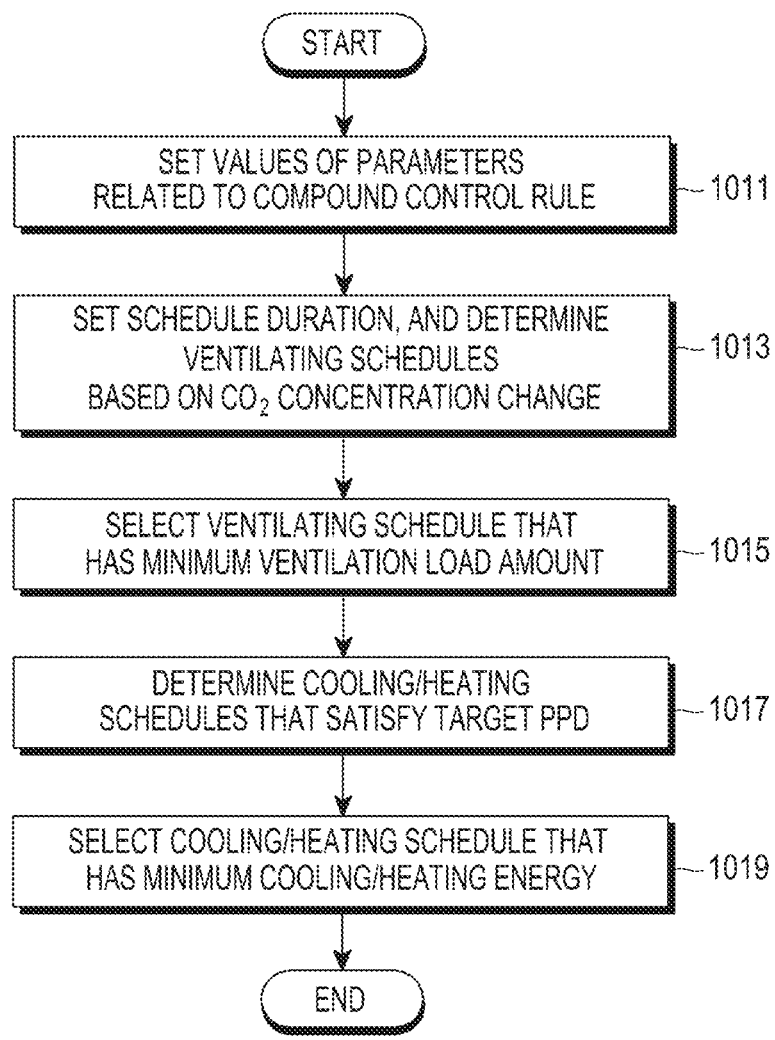
FIG. 10 is a flowchart of a method of performing a compound control operation based on a compound control rule in a server in an air conditioning system according to an embodiment of the disclosure.

FIG. 10 is a flowchart of a method of performing a compound control operation based on a compound control rule in a server in an air conditioning system according to an embodiment of the disclosure.

Referring to FIG. 10, a method of performing a compound control operation is a method of performing a compound control operation in which a priority is given to an air comfort-degree.

In step 1011, a server sets values of parameters included in each of parameter sets for applying a compound control rule. The parameter sets for applying the compound control rule may include a parameter set related to a ventilating apparatus and a parameter set related to an air conditioning apparatus. The parameter set related to the ventilating apparatus may include target $CO_2$ concentration, a preferred ventilating mode, a minimal ventilation duration, and/or the like, and the parameter set related to the air conditioning apparatus may include a target PPD, a maximum permitted-indoor temperature range, and/or the like.

The server sets a schedule duration for a compound control zone, and determines a plurality of ventilating schedules which make the compound control zone maintain target $CO_2$ concentration by predicting a $CO_2$ concentration change of the compound control zone during the schedule duration in step 1013. The server calculates ventilation load amount of each of the determined ventilating schedules, and selects, from the ventilating schedules, a ventilating schedule which has minimal ventilation load amount among the calculated ventilation load amount in step 1015. In FIG. 10, the server selects, from the ventilating schedules, the ventilating schedule which has the minimal ventilation load amount among the calculated ventilation load amount. However, the server may select one of the plurality of ventilating schedules based on another criterion, not the minimal ventilation load amount.

The server predicts a temperature change of the compound control zone during the schedule duration to determine a plurality of cooling/heating schedules which satisfy the target PPD in step 1017. The server calculates cooling/heating energy of each of the determined cooling/heating schedules and selects a cooling/heating schedule which has minimal cooling/heating energy among the calculated cooling/heating energy in step 1019. In FIG. 10, the server selects, from the cooling/heating schedules, the cooling/heating schedule which has the minimal cooling/heating energy among the calculated cooling/heating energy. However, the server may select one of the plurality of cooling/heating schedules based on another criterion, not the minimal cooling/heating energy.

In addition, a schedule duration in which a server performs a compound control operation based on a compound control rule as shown in FIG. 10 may be a predicted duration.

Although FIG. 10 illustrates an example of a method of performing a compound control operation based on a compound control rule in a server in an air conditioning system according to an embodiment of the disclosure, various changes could be made to FIG. 10. For example, although shown as a series of operations, various operations in FIG. 10 could overlap, occur in parallel, occur in a different order, or occur multiple times.

Figure 11:
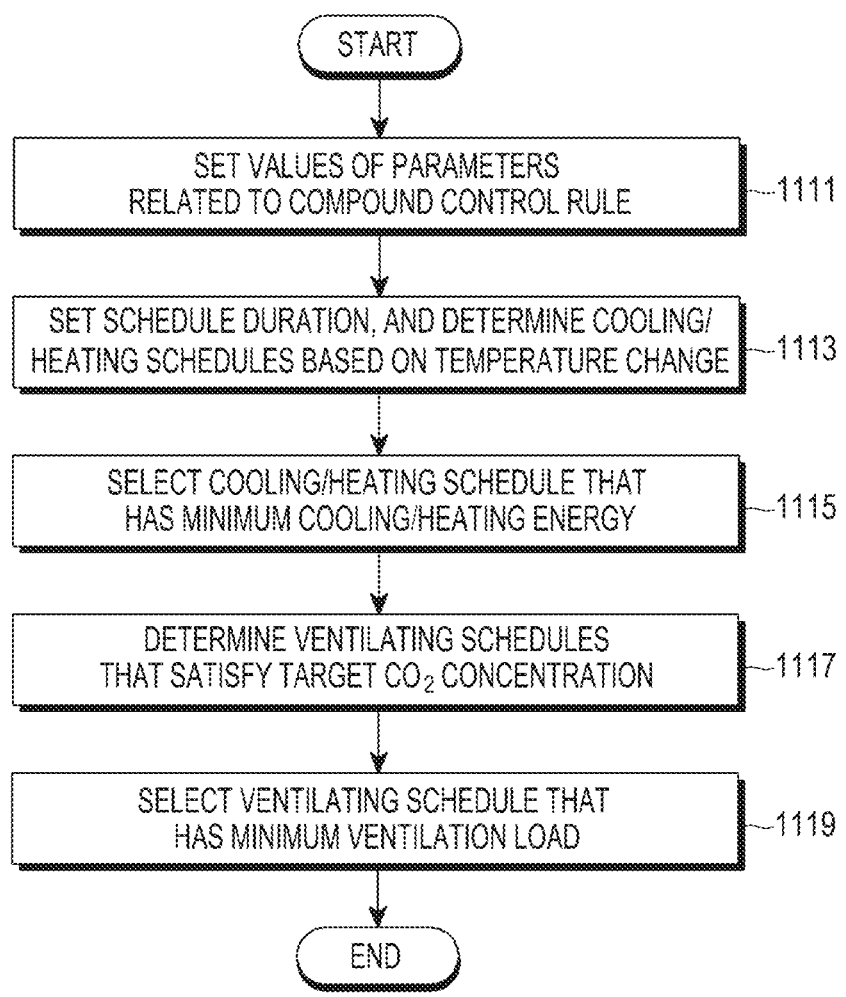
FIG. 11 is a flowchart illustrating a method of performing a compound control operation based on a compound control rule in a server in an air conditioning system according to an embodiment of the disclosure.

FIG. 11 is a flowchart of a method of performing a compound control operation based on a compound control rule in a server in an air conditioning system according to an embodiment of the disclosure.

Referring to FIG. 11, a method of performing a compound control operation in FIG. 11 is a method of performing a compound control operation in which a priority is given to a temperature comfort-degree.

In step 1111, a server sets values of parameters included in each of parameter sets for applying a compound control rule. The parameter sets for applying the compound control rule may include a parameter set related to a ventilating apparatus and a parameter set related to an air conditioning apparatus. The parameter set related to the ventilating apparatus may include target $CO_2$ concentration, and/or the like, and the parameter set related to the air conditioning apparatus may include a target PPD, a maximum permitted-indoor temperature range, a maximum permitted-indoor temperature range per time, etc.

The server sets a schedule duration for a compound control zone, predicts a temperature change of the compound control zone during the schedule duration to determine a plurality of cooling/heating schedules which make the compound control zone maintain a target PPD in step 1113. The server calculates cooling/heating energy of each of the determined cooling/heating schedules and select a cooling/heating schedule which has minimal cooling/heating energy among the calculated cooling/heating energy in step 1115. In FIG. 11, the server selects, from the cooling/heating schedules, the cooling/heating schedule which has the minimal cooling/heating energy among the calculated cooling/heating energy. However, the server may select one of the plurality of cooling/heating schedules based on another criterion, not the minimal cooling/heating energy.

The server predicts $CO_2$ concentration of the compound control zone during the schedule duration to determine a plurality of ventilating schedules which satisfy the target $CO_2$ concentration in step 1117. The server calculates ventilation load of each of the determined ventilating schedules and select a ventilating schedule which has minimal ventilation load among the calculated ventilation load in step 1119. In FIG. 11, the server selects, from the ventilating schedules, the ventilating schedule which has the minimal ventilation load among the calculated ventilation load. However, the server may select one of the plurality of ventilating schedules based on another criterion, not the minimal ventilation load.

In addition, a schedule duration in which a server performs a compound control operation based on a compound control rule as shown in FIG. 11 may be a predicted duration.

Although FIG. 11 illustrates an example of a method of performing a compound control operation based on a compound control rule in a server in an air conditioning system according to an embodiment of the disclosure, various changes could be made to FIG. 11. For example, although shown as a series of operations, various operations in FIG. 11 could overlap, occur in parallel, occur in a different order, or occur multiple times.

Figure 12:
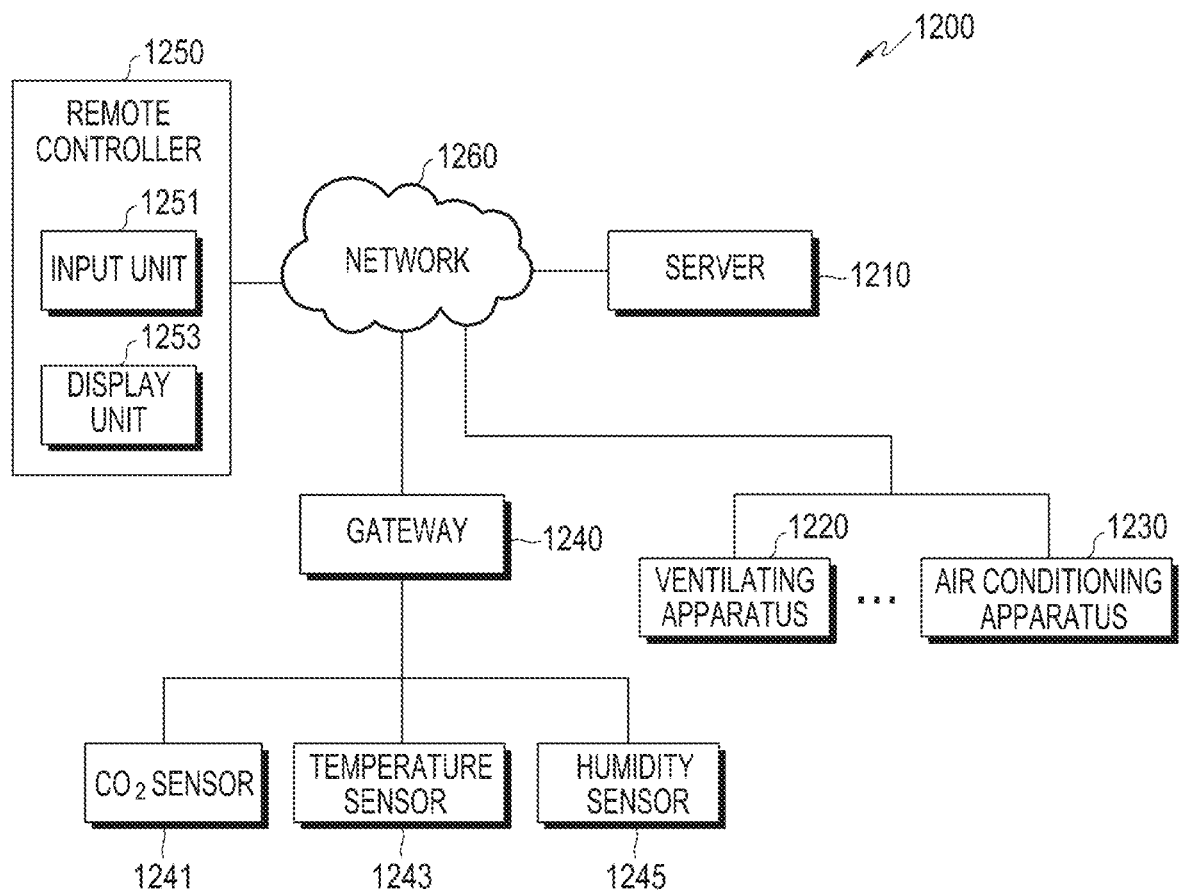
FIG. 12 is a block diagram of an air conditioning system according to an embodiment of the disclosure.

FIG. 12 is a block diagram of an air conditioning system 1200 according to an embodiment of the disclosure.

Referring to FIG. 12, the air conditioning system 1200 includes a server 1210, at least one ventilating apparatus including a ventilating apparatus 1220, at least one air conditioning apparatus including an air conditioning apparatus 1230, a gateway 1240, and a remote controller 1250. The server 1210 may be connected to the at least one ventilating apparatus 1220, the at least one air conditioning apparatus 1230, the gateway 1240, and the remote controller 1250 through a network 1260, where the network 1260 may be implemented based on various schemes. In FIG. 12, the server 1210 is connected to the at least one ventilating apparatus 1220, the at least one air conditioning apparatus 1230, the gateway 1240, the remote controller 1250, and/or the like through the network 1260, however, the server 1210 may be directly connected to the at least one ventilating apparatus 1120, the at least one air conditioning apparatus 1230, the gateway 1240, the remote controller 1250, and/or the like.

The gateway 1240 includes a plurality of sensors, e.g., a $CO_2$ sensor 1241 for sensing $CO_2$ concentration, a temperature sensor 1243, a humidity sensor 1245, and/or the like.

Sensed values sensed through each of the $CO_2$ sensor 1241, the temperature sensor 1243, the humidity sensor 1245, and/or the like may be shared through the network 1260, where the network 1260 may be one of a wireless network, a wire network, and a wire/wireless network.

The server 1210 receives sensed values sensed through each of the $CO_2$ sensor 1241, the temperature sensor 1243, the humidity sensor 1245, and/or the like through the network 1260. The server 1210 generates a compound control command based on stored data, a preset scheme, e.g., an artificial intelligence based-prediction model, etc., and controls at least one ventilating apparatus and at least one air conditioning apparatus based on the generated compound control command. In this case, the artificial intelligence based-prediction model may be, for example, a multi-layer perceptron (MLP) model, an artificial neural network (ANN) model, a recurrent neural network (RNN) model, a long short term memory (LSTM) model, etc., and there is no limitation on the artificial intelligence based-prediction model which may be used in a compound control operation according to an embodiment of the disclosure.

The server 1210 may be implemented with another device such as a manager terminal, a user device, and/or the like, where an inner structure of the server 1210 is described below with reference to FIG. 13, thus a detailed description thereof is omitted here.

The remote controller 1250 includes, for example, an input unit 1251 and a display unit 1253. The display unit 1253 displays an operational state of each of the at least one ventilating apparatus 1220 and the at least one air conditioning apparatus 1230, a screen for changing the settings of the at least one ventilating apparatus 1220 and the at least one air conditioning apparatus 1230, and/or the like. The input unit 1251 inputs a compound control start command for commanding to start a compound control operation, a compound control end command for commanding to end the compound control operation, a set value for changing the settings of the at least one ventilating apparatus and the at least one air conditioning apparatus, and/or the like.

The remote controller 1250 may be implemented with another device such as a user device, and/or the like, and an inner structure of the remote controller 1250 is described with reference to FIG. 14, thus a detailed description thereof is omitted here.

Figure 13:
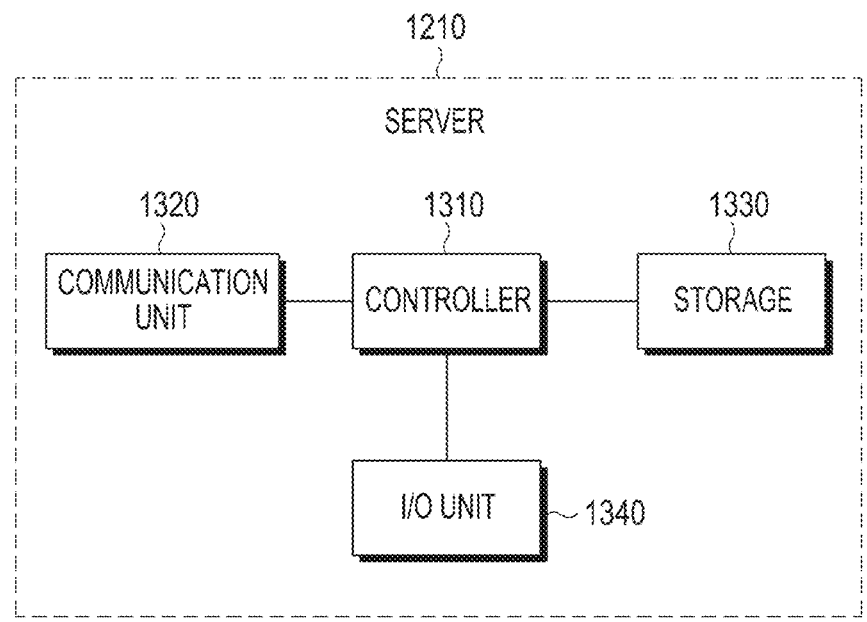
FIG. 13 is a block diagram of a server in an air conditioning system according to an embodiment of the disclosure.

FIG. 13 is a block diagram of an inner structure of the server 1210 in the air conditioning system 1200 according to an embodiment of the disclosure.

Referring to FIG. 13, the server 1210 may include a controller 1310, a communication unit 1320, a storage 1330, and an input/output (I/O) unit 1340.

The communication unit 1320 may communicate with ventilating apparatuses 1220, air conditioning apparatuses 1230, user devices, the remote controller 1250, and the gateway 1240. For example, the communication unit 1320 may receive information related to compound control operations of the ventilating apparatuses 1220 and the air conditioning apparatuses 1230 such as a target air comfort-degree, a target temperature comfort-degree, and/or the like from the user devices and the remote controller 1250, receive information related to a temperature, humidity, $CO_2$ concentration, etc., from a plurality of sensors connected to the gateway 1240, and transmit a compound control command to the ventilating apparatuses 1220 and the air conditioning apparatuses 1230.

The controller 1310 may detect a temperature and $CO_2$ concentration of a compound control zone based on various information gathered through the communication unit 1320, and detect a ventilating schedule for at least one ventilating apparatus 1220 related to the compound control zone and a cooling/heating schedule for at least one air conditioning apparatus 1230 related to the compound control zone.

The controller 1310 performs a compound control operation based on a compound control rule including the following rules.

(1) A ventilating apparatus 1220 is turned on preferentially from a time duration during which the rate of rise of $CO_2$ per unit time is high.

(2) A schedule of a ventilating apparatus 1220 and an air conditioning apparatus 1230 is determined by considering a mutually exclusive operation between the ventilating apparatus 1220 and the air conditioning apparatus 1230.

(3) A schedule of a ventilating apparatus 1220 and an air conditioning apparatus 1230 is determined such that a permitted indoor temperature range may be maintained.

(4) An air conditioning apparatus 1230 is turned on in an ascending order of removal load per cooling/heating unit energy.

(5) A schedule of a ventilating apparatus 1220 is determined such that the sum of cooling/heating energy for removing the ventilation load and ventilation energy is decreased, for example, such that the sum of the cooling/heating energy for removing the ventilation load and the ventilation energy is minimized.

The controller 1310 may transmit, to the at least one air conditioning apparatus 1230, a compound control command which corresponds to the determined cooling/heating schedule through the communication unit 1320. The term "communication unit" may be interchangeable with the term "transceiver", etc.

The controller 1310 may transmit, to the at least one ventilating apparatus 1220, a compound control command which corresponds to the determined ventilating schedule through the communication unit 1320. The controller 1310 may input information about a desired indoor temperature and desired $CO_2$ concentration using a UI such as a keyboard and a mouse, and detect a set temperature which may be actually applied to the at least one air conditioning apparatus 1230 and $CO_2$ concentration which may be actually applied to the at least one ventilating apparatus 1220 based on the desired indoor temperature and desired $CO_2$ concentration.

The storage 1330 may store various information which may be used for the controller 1310 to determine a ventilating schedule and a cooling/heating schedule, for example, various sensed information received through the communication unit 1320, various information such as a target air comfort-degree and a target temperature comfort-degree, and/or the like. The storage 1330 may store various information which occurs during an operation of the server 1210 under the control of the controller 1310.

The I/O unit 1340 includes a display unit which displays information related to determination of the target air comfort-degree and the target temperature comfort-degree under the control of the controller 1310, and an input unit which may input the desired indoor temperature and desired $CO_2$ concentration to transfer the desired indoor temperature and desired $CO_2$ concentration to the controller 1310. The display unit may display various information such as the ventilating schedule and the cooling/heating schedule detected by the controller 1310, etc.

Although the controller 1310, the communication unit 1320, the storage 1330, and the I/O unit 1340 are described above as separate units in the server 1210 in FIG. 13, it is to be understood that the server 1210 may be implemented with a form into which at least two of the controller 1310, the communication unit 1320, the storage 1330, and the I/O unit 1340 are incorporated.

The server 1210 may be implemented with at least one processor.

Figure 14:
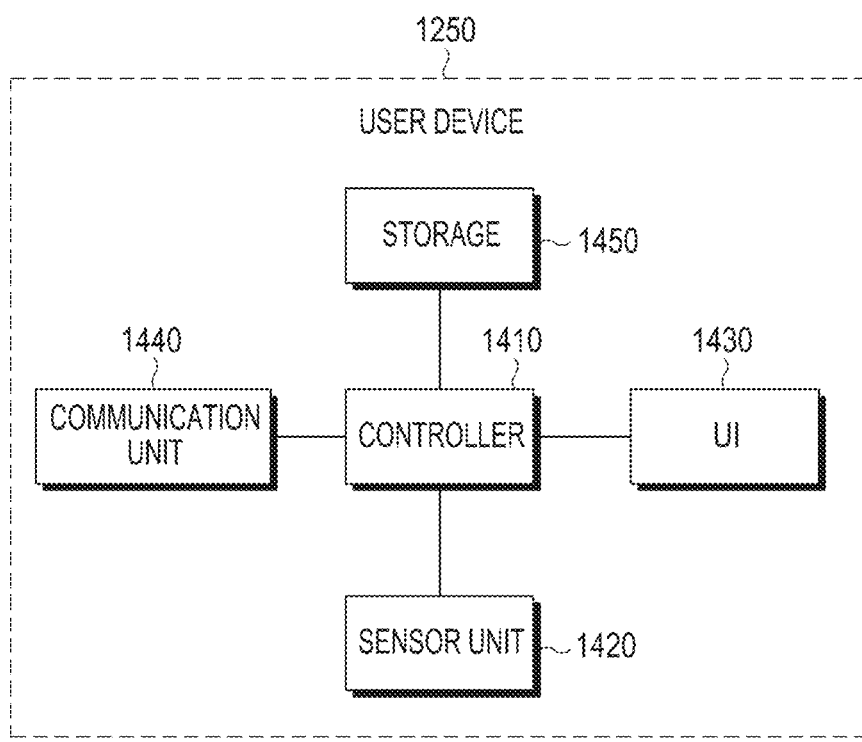
FIG. 14 is a block diagram of a remote controller in an air conditioning system according to an embodiment of the disclosure.

FIG. 14 is a block diagram of an inner structure of the remote controller 1250 in the air conditioning system 1200 according to an embodiment of the disclosure.

Referring to FIG. 14, the remote controller 1250 may be implemented as, for example, a user device, and the user device may include a controller 1410, a sensor unit 1420, a UI 1430, a communication unit 1440, and a storage 1450. The communication unit 1440 may communicate with an external device, e.g., a server based on at least one communication scheme supported by the user device. The communication unit 1440 may receive a signal transmitted from one or more wireless devices under the control of the controller 1410, and estimate the location of the user device based on signal strength of the signal. The communication unit 1440 may provide location information indicating the estimated location of the user device estimated under the control of the controller 1410 or input location information to the server.

The communication unit 1440 may transmit various information to the server 1210 under the control of the controller 1410. The communication unit 1440 may transmit, to the server 1210, a compound control start command for requesting to start a compound control operation and a compound control end command for requesting to end the compound control operation under the control of the controller 1410.

The UI 1430 may output information necessary for a user of the user device, or provide the controller 1410 with information inputted by the user under the control of the controller 1410. For example, the UI 1430 may input a desired temperature and desired $CO_2$ concentration from the user, and provide the controller 1410 with the inputted desired temperature and desired $CO_2$ concentration. The UI 1430 may include a display unit which may be implemented with, for example, a touch screen. The display unit 1253 may display information about a compound control zone where the user device is located, and information related to controlling a ventilating apparatus 1220 and an air conditioning apparatus 1230 under the control of the controller 1410. The display unit 1253 may display the inputted desired temperature and desired $CO_2$ concentration. The display unit 1253 may display zone information, e.g., a layout drawing, of a zone where the user device is located, and display, on the zone information, an indoor temperature and $CO_2$ concentration gathered from the sensor unit 1420 and a set temperature and set $CO_2$ concentration that are determined by the server 1210 under the control of the controller 1410. The display unit 1253 may display zone information of a default zone to which the zone where the user device is located belongs, and display, on the displayed zone information, an indoor temperature, $CO_2$ concentration, a set temperature, and set $CO_2$ concentration similar to the zone where the user device is located under the control of the controller 1410. The display unit 1253 may display UI information, e.g., a menu, and/or the like, for requesting to display various information generated by the server 1210, and receive user input, e.g., touch, for requesting to display various information through the UI information to notify the controller 1410 of the user input. The display unit 1252 may display various information received from the server under the control of the controller 1410.

The sensor unit 1420 may include various types of sensors for sensing situation information. The sensor unit 1420 may include various sensors such as a temperature sensor, a $CO_2$ sensor, a humidity sensor, and/or the like and provide the controller 1410 with sensed data sensed from the various sensors. The sensor unit 1420 may further include, for example, a global positioning system (GPS) and/or a gyro sensor, and/or the like for acquiring the current location of the user device and provide the controller 1410 with sensed data received from the GPS and/or gyro sensor, and/or the like. In FIG. 14, the user device includes the sensor unit 1420, however, the user device may not include the sensor unit 1420. If the user device does not include the sensor unit 1420, various sensed data may be acquired through sensors included in the air conditioning system 1200.

The storage 1450 may store the desired temperature and desired $CO_2$ concentration inputted through the UI 1430, sensed data transferred from the sensor unit 1420, and information which the communication unit 1440 receives from the server 1210.

Although the controller 1410, the sensor unit 1420, the UI 1430, the communication unit 1440, and the storage 1450 are described as separate units in the user device in FIG. 14, it is to be understood that the user device may be implemented with a form into which at least two of the controller 1410, the sensor unit 1420, the UI 1430, the communication unit 1440, and the storage 1450 are incorporated.

The user device may be implemented with at least one processor.

An example of a compound control operation in the air conditioning system 1200 according to an embodiment is described below.

(1) A server configures a compound control rule in which a ventilating schedule is determined such that a target air comfort-degree, e.g., time-average $CO_2$ concentration satisfies 1000 ppm during a given time duration, e.g., a schedule duration when a compound control operation is performed.

(2) The server configures a compound control rule in which a ventilating schedule is determined such that the target air comfort-degree, e.g., space-average $CO_2$ concentration satisfies 1000 ppm during the schedule duration when the compound control operation is performed. In this case, the space-average $CO_2$ concentration denotes the average $CO_2$ concentration of a compound control zone during the schedule duration.

(3) The server determines whether a ventilating apparatus will perform outdoor air cooling on enthalpy basis using humidity data of an air conditioning apparatus, e.g., an SAC.

(4) The server determines the schedule duration by detecting a time point when occupancy starts and a time point when the occupancy ends of the compound control zone based on a $CO_2$ concentration change. In this case, the schedule duration denotes a time duration to which a cooling/heating schedule and a ventilating schedule of the compound control zone are applied.

(5) The server predicts a $CO_2$ concentration change of the compound control zone during the schedule duration based on learning, and/or the like. In this case, learning may be performed through, for example, an artificial intelligence based-prediction model, and the artificial intelligence based-prediction model may be, for example, an MLP model, an ANN model, an RNN model, an LSTM model, and/or the like. Further, the server may predict the $CO_2$ concentration change of the compound control zone during the schedule duration using various artificial intelligence based-prediction models as well as the MLP model, the ANN model, the RNN model, the LSTM model, and/or the like. If the $CO_2$ concentration change of the compound control zone during the schedule duration is predicted through the learning, and/or the like, unnecessary ventilating operation for detecting the $CO_2$ concentration change of the compound control zone during the schedule duration may be prevented.

(6) In a time duration in which the difference between the indoor temperature of the compound control zone and the outdoor temperature of the compound control zone is relatively large, e.g., a time duration in which the difference between the indoor temperature of the compound control zone and the outdoor temperature of the compound control zone is greater than the threshold difference, occurred ventilation load amount is relatively great, thus the server decreases loss of cooling/heating energy due to a ventilating operation by turning off the ventilating apparatus and operating only the air conditioning apparatus. That is, the server increase a mutually exclusive operation between ventilation and cooling/heating, for example, the server maximizes the mutually exclusive operation between the ventilation and the cooling/heating, so the loss of the cooling/heating energy due to the ventilating operation may be decreased.

(7) The server determines a ventilating schedule and a cooling/heating schedule such that the average $CO_2$ concentration satisfies a target average $CO_2$ concentration and an indoor temperature satisfies a target indoor temperature during the schedule duration. In this case, the target average $CO_2$ concentration may include the target average $CO_2$ concentration per time and target average $CO_2$ concentration per space.

The server determines a ventilating schedule of a ventilating apparatus and a cooling/heating schedule of an air conditioning apparatus such that a permitted indoor temperature range may be maintained. In the disclosure, in a case in which a target indoor temperature range for a compound control zone is determined, for a compound control operation, the target indoor temperature range does limit control of the schedules of the ventilating apparatus and the air conditioning apparatus if an indoor temperature of the compound control zone within the permitted indoor temperature rage even though the indoor temperature of the compound control zone is out of the target indoor temperature range.

The server generates a compound control command corresponding to the determined ventilating schedule and cooling/heating schedule, and transmits the compound control command to the ventilating apparatus and the air conditioning apparatus. After receiving the compound control command, the ventilating apparatus and the air conditioning apparatus perform an operation which corresponds to the compound control command.

(8) Finally, the server generates, based on an artificial intelligence based-prediction model, a compound control command which specifies a ventilating operation and a cooling/heating operation which may satisfy a target air comfort-degree and a target indoor temperature range and minimize energy consumption during each time duration for the compound control zone, and makes the ventilating apparatus and the air conditioning apparatus operate corresponding to the compound control command.

Various parameters used for performing a compound control operation in a server in an air conditioning system according to an embodiment is described below.

Figure 15:
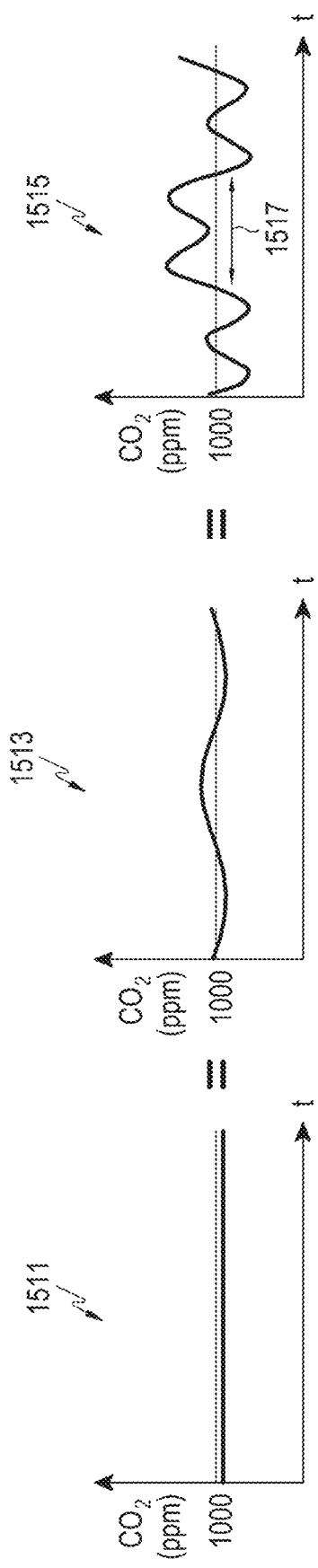
FIG. 15 is a series of charts for describing average $CO_2$ concentration per time used for performing a compound control operation in a server in an air conditioning system according to an embodiment of the disclosure.

FIG. 15 is a series of charts that describes an average $CO_2$ concentration per time used for performing a compound control operation in a server in an air conditioning system according to an embodiment of the disclosure.

Referring to FIG. 15, if a server determines a ventilating schedule such that a target air comfort-degree during a given time duration, e.g., a schedule duration, is maintained at, for example, the average $CO_2$ concentration per time 1000 ppm upon performing a compound control operation, then the average $CO_2$ concentration per time is maintained at 1000 ppm as shown in reference numeral 1511.

This may actually appear that the average $CO_2$ concentration is less than 1000 ppm during certain time durations among the schedule duration, and greater than or equal to 1000 ppm during other time durations among the schedule duration, as shown in reference numeral 1513. That is, the average $CO_2$ concentration per time is also 1000 ppm in a case as shown in reference numeral 1513.

Further, it may appear that the average $CO_2$ concentration is less than 1000 ppm during certain time durations among the schedule duration, and greater than or equal to 1000 ppm during other time durations among the schedule duration, as shown in reference numeral 1515. That is, the average $CO_2$ concentration per time is also 1000 ppm in a case as shown in reference numeral 1515.

The average $CO_2$ concentration per time is 1000 ppm even if the average $CO_2$ concentration of a compound control zone during the schedule duration appears as shown in reference numeral 1515, thus, the server does not need to operate a ventilating apparatus during a time duration marked with reference numeral 1517. That is, the average $CO_2$ concentration of the compound control zone during the schedule duration is maintained at 1000 ppm even if the ventilating apparatus is turned off during the time duration marked with reference numeral 1517.

Finally, the sever may determine a ventilating schedule for a compound control zone based on a characteristic in which the average $CO_2$ concentration becomes smooth according that time is spanned, i.e., a time-span smoothing characteristic.

Figure 16:
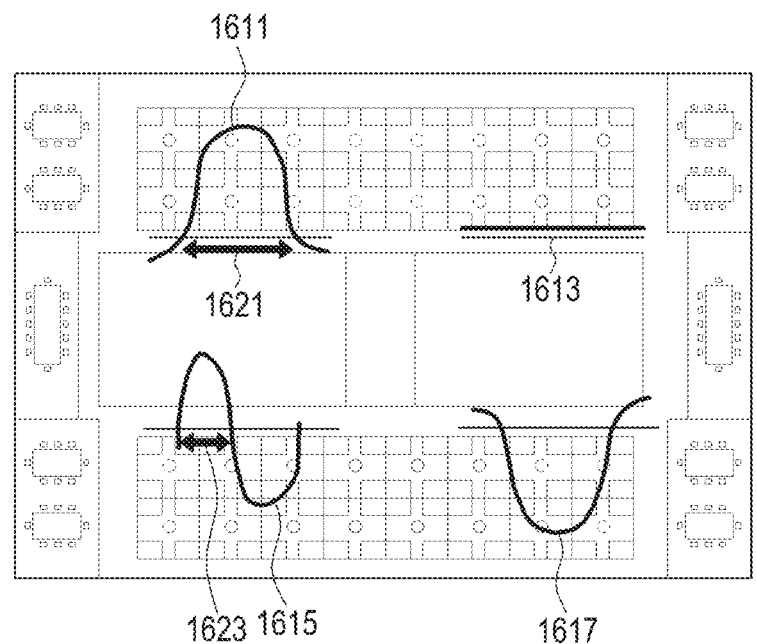
FIG. 16 is an illustration of average $CO_2$ concentration per space used for performing a compound control operation in a server in an air conditioning system according to an embodiment of the disclosure.

FIG. 16 is an illustration for describing an average $CO_2$ concentration per space used for performing a compound control operation in a server in an air conditioning system according to an embodiment of the disclosure.

Referring to FIG. 16, if a server determines a ventilating schedule such that a target air comfort-degree during a given time duration, e.g., a schedule duration is maintained at, for example, the average $CO_2$ concentration per space 1000 ppm upon performing a compound control operation, then the average $CO_2$ concentration per space is maintained at 1000 ppm.

This may actually appear that the average $CO_2$ concentration is less than 1000 ppm on certain spaces during the schedule duration, and greater than or equal to 1000 ppm on other spaces during the schedule duration, as shown in reference numerals 1611, 1613, 1615, and 1617. However, the average $CO_2$ concentration of a compound control zone during the schedule duration is 1000 ppm, thus the server does not need to operate a ventilating apparatus during time durations marked with reference numerals 1621 and 1623. That is, the average $CO_2$ concentration of the compound control zone during the schedule duration is maintained at 1000 ppm even if the ventilating apparatus is turned off during the time duration marked with reference numerals 1621 and 1623.

The sever may determine a ventilating schedule for a compound control zone based on a characteristic in which the average $CO_2$ concentration becomes smooth according that a space is spanned, i.e., a space-span smoothing characteristic.

In addition, a server may perform a compound control operation by applying enthalpy control in an air conditioning system according to an embodiment of the disclosure, where this is described below.

If a ventilating apparatus includes, for example, a temperature sensor, the ventilating apparatus may perform a temperature control operation upon performing a night purge operation or performing an automatic ventilation operation. In this case, the automatic ventilation operation may include an outdoor air cooling operation. Generally, performance of an enthalpy control operation is better than performance of a temperature control operation by about 20% when the outdoor air cooling operation is performed.

Thus, in accordance with an embodiment of the disclosure, a compound control operation may be performed based on humidity data sensed from a humidity sensor included in an air conditioning apparatus or a humidity sensor included in an air conditioning system such that enthalpy control is possible upon an operation of the ventilating apparatus. In this case, the compound control operation which makes the enthalpy control possible may be performed based on a time point when outdoor air is inputted, a time duration during which the outdoor air is inputted, an amount of inputted outdoor air, a target indoor temperature range of a compound control zone, the difference between indoor enthalpy and outdoor enthalpy of the compound control zone, etc., and may be performed based on an artificial intelligence based-prediction model, etc.

Figure 17:
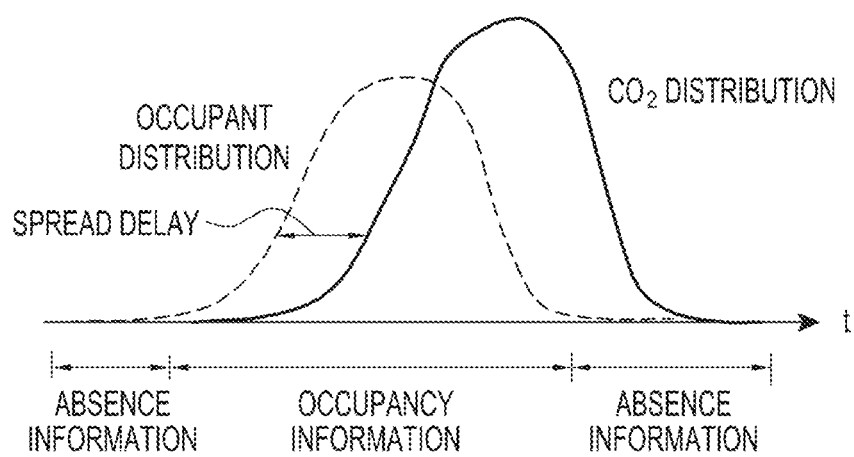
FIG. 17 is a chart illustrating occupancy information and absence information used for performing a compound control operation in a server in an air conditioning system according to an embodiment of the disclosure.

FIG. 17 is a chart for describing occupancy information and absence information used for performing a compound control operation in a server in an air conditioning system according to an embodiment of the disclosure.

Referring to FIG. 17, in an air conditioning system according to an embodiment of the disclosure, a server may predict occupancy information and absence information of a compound control zone based on $CO_2$ concentration of the compound control zone through an artificial intelligence based-prediction model, and/or the like even though the server does not equip a separate service or device such as an indoor positioning service (IPS), an image device, etc. In this case, the occupancy information is information indicating that there is an occupant in the compound control zone, that is, that there is a user device located at the compound control zone, and the absence information is information indicating that there is no occupant in the compound control zone.

The server may enhance accuracy of the occupancy information and the absence information of the compound control zone by considering spread delay time when predicting the occupancy information and the absence information of the compound control zone.

The server may learn a $CO_2$ concentration based on an artificial intelligence based-prediction model, etc., and perform a compound control operation for the compound control zone based on the learned result in a case in which there is no user device such as at night, during a holiday, etc. For example, a relation between the number of occupants of a zone and $CO_2$ concentration of the zone may be implemented with a separate table. In this case, the server may detect the number of occupants which exist on the zone based on $CO_2$ concentration. In this case, the table defining the relation between the number of occupants and the $CO_2$ concentration may be implemented with various forms.

The server may minimize a ventilating operation of a ventilating apparatus and a cooling/heating operation of an air conditioning apparatus to minimize energy consumption due to the ventilating operation and the cooling/heating operation if the absence information of the compound control zone is detected, that is, if there is no user device in the compound control zone.

As illustrated in FIG. 17, the server detects absence information of the compound control zone during a certain time duration if $CO_2$ concentration is not detected during the certain time duration, and detects occupancy information of the compound control zone during the certain time duration if the $CO_2$ concentration is detected during the certain time duration. The server detects the absence information of the compound control zone by considering spread delay.

Figure 18:
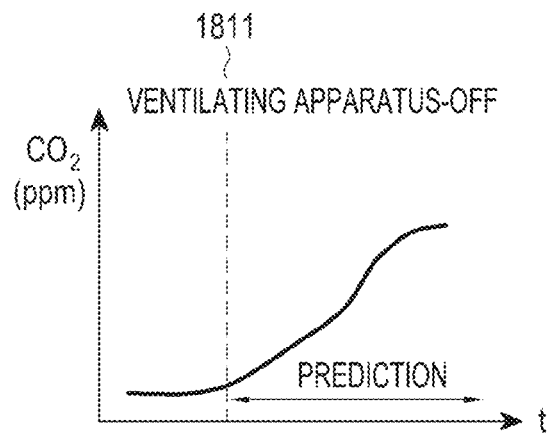
FIG. 18 is a chart of a process of detecting a $CO_2$ concentration change in a server in an air conditioning system according to an embodiment of the disclosure.

FIG. 18 is a chart of a process of detecting a $CO_2$ concentration change in a server in an air conditioning system according to an embodiment of the disclosure.

Referring to FIG. 18, if a ventilating apparatus includes a $CO_2$ sensor, a server may operate the ventilating apparatus in order to detect $CO_2$ concentration of a compound control zone. In this case, cooling/heating energy loss may occur due to an operation of the ventilating apparatus for detecting the $CO_2$ concentration.

Thus, in an embodiment of the disclosure, the server predicts a $CO_2$ concentration change according to a lapse of time for a compound control zone based on an artificial intelligence based-prediction model, e.g., an MLP model, an ANN model, an RNN model, an LSTM model, etc., and performs a compound control operation based on the predicted $CO_2$ concentration change. In this case, the server may predict the $CO_2$ concentration change according to the lapse of time for the compound control zone without operating the ventilating apparatus, and predict the cooling/heating energy loss.

Further, in an embodiment of the disclosure, the artificial intelligence based-prediction model used for predicting the $CO_2$ concentration change according to the lapse of time for the compound control zone may consider information about a default zone included in the compound control zone, e.g., a size of the default zone, a type of the default zone, and infiltration according to the type of the default zone. In this case, consideration of the infiltration according to the type of the default zone in the artificial intelligence based-prediction model used for predicting the $CO_2$ concentration change according to the lapse of time for the compound control zone may indicate prediction of the $CO_2$ concentration change according to the lapse of time for the compound control zone using natural ventilation.

Similarly, if the information about the default zone included in the compound control zone, e.g., the size of the default zone, the type of the default zone, and the infiltration according to the type of the default zone are considered when predicting the $CO_2$ concentration change according to the lapse of time for the compound control zone, accuracy thereof may be increased.

Further, the server may detect a $CO_2$ dilution amount pattern based on the artificial intelligence based-prediction model, and/or the like to estimate infiltration based on the detected $CO_2$ dilution amount pattern in a case in which there is no user device in the compound control zone such as at night, during a holiday, etc. In this case, the $CO_2$ dilution amount pattern may vary according to various parameters such as a season, weather, etc.

As illustrated in FIG. 18, the server may predict the $CO_2$ concentration change for the compound control zone based on the artificial intelligence based-prediction model even though a ventilating apparatus is turned off from a certain time point 1811.

Figure 19:
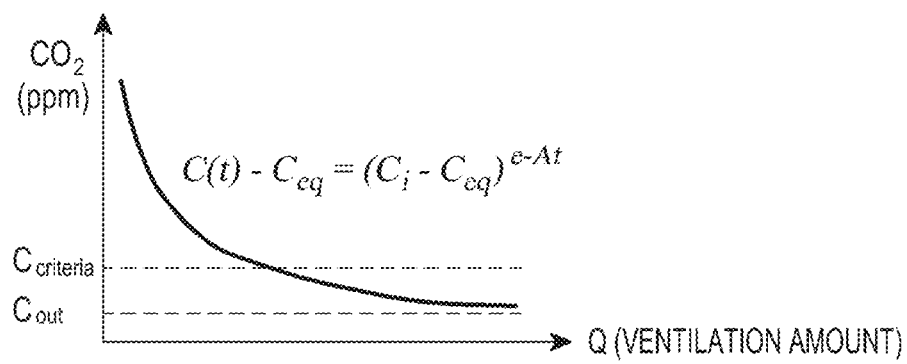
FIG. 19 is a chart of a process of performing a compound control operation for maximizing a mutual exclusive operation in a server in an air conditioning system according to an embodiment of the disclosure.

FIG. 19 is a chart of a process of performing a compound control operation for maximizing a mutually exclusive operation in a server in an air conditioning system according to an embodiment of the disclosure.

Referring to FIG. 19, loss of cooling/heating energy occurs when a ventilating apparatus is turned on, thus a server performs a compound control operation such that a cooling/heating operation is performed during a time duration in which a ventilation operation is not performed as much as possible.

As shown in FIG. 19, if $CO_2$ concentration of a compound control zone is relatively high, $CO_2$ concentration may be easily lowered with a relatively small ventilation amount. Further, as described in Equation (2) above, ventilation load is proportional to the ventilation amount Q and the difference $\Delta T(=T-T_0)$ between the indoor temperature and the outdoor temperature. If enthalpy is considered, the ventilation load may be proportional to the enthalpy difference ($\Delta H$).

Thus, if the server predicts an air state change, e.g., a $CO_2$ concentration change of the compound control zone to detect that the difference $\Delta T$ between the indoor temperature and the outdoor temperature is relatively small, for example, that the difference $\Delta T$ between the indoor temperature and the outdoor temperature is less than a threshold difference, and the $CO_2$ concentration is relatively high, for example, the $CO_2$ concentration is greater than a threshold $CO_2$ concentration, the server performs a control operation such that a ventilating operation is intensively performed and a cooling/heating operation is least performed.

Alternatively, if the difference $\Delta T$ between the indoor temperature and the outdoor temperature is relatively large, for example, that the difference $\Delta T$ between the indoor temperature and the outdoor temperature is greater than or equal to the threshold difference, and the $CO_2$ concentration is relatively low, for example, the $CO_2$ concentration is less than or equal to the threshold $CO_2$ concentration, the server performs a control operation such that cooling/heating operation is intensively performed and a ventilating operation is least performed.

For example, a relation between the ventilation amount of a zone and $CO_2$ concentration of the zone may be implemented with a separate table. In this case, the server may detect the ventilation amount required for the zone based on $CO_2$ concentration. In this case, the table defining the relation between the ventilation amount and the $CO_2$ concentration may be implemented with various forms.

Figure 20:
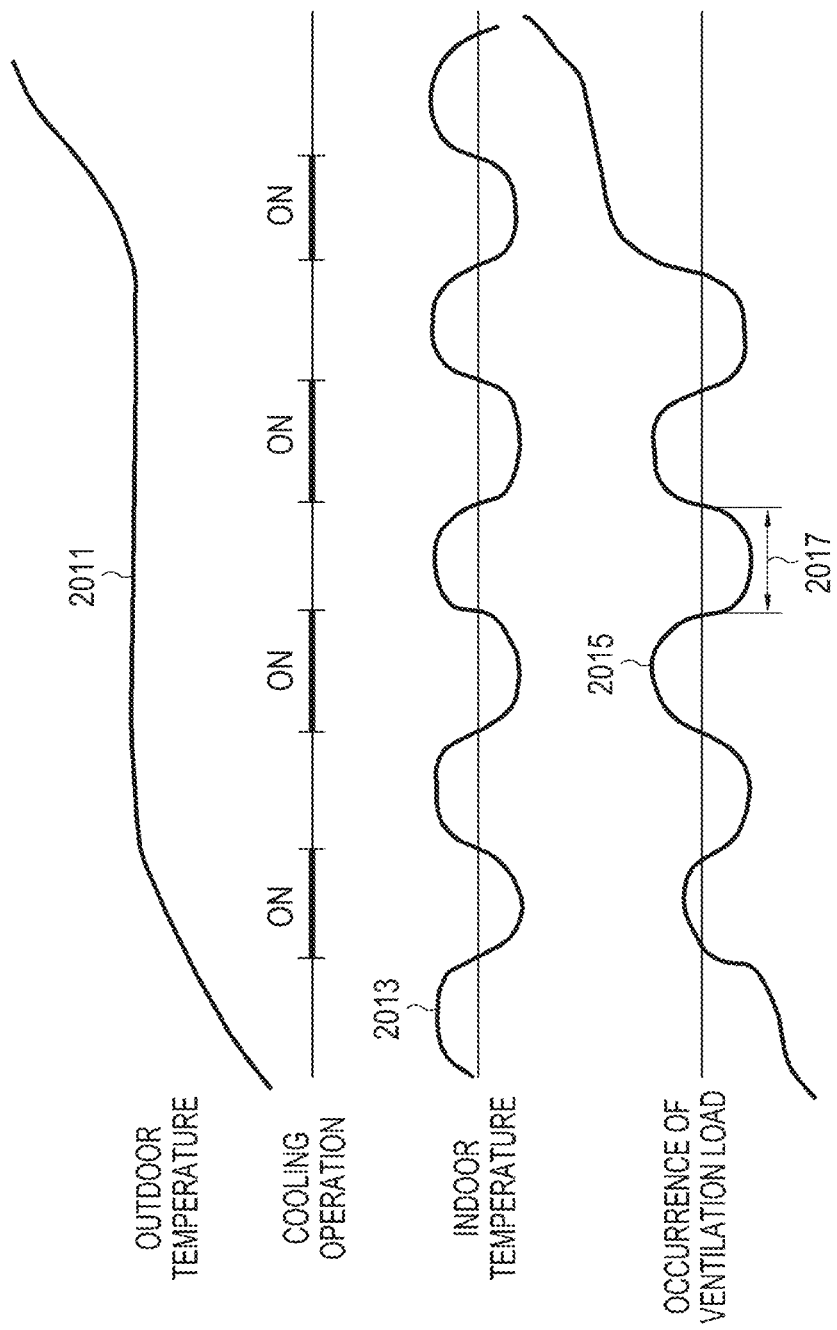
FIG. 20 is a series of charts of a process of performing a compound control operation for maximizing a mutual exclusive operation in a server in an air conditioning system according to an embodiment of the disclosure.

FIG. 20 is a series of charts of a process of performing a compound control operation for maximizing a mutually exclusive operation in a server in an air conditioning system according to an embodiment of the disclosure.

Indoor temperature-spread delay time according to an operation of an air conditioning apparatus is not considered in a process of performing a compound control operation in FIG. 20.

Referring to FIG. 20, a reference numeral 2011 indicates the outdoor temperature according to time, a reference numeral 2013 indicates the indoor temperature according to time, and a reference numeral 2015 indicates ventilation load according to time. If the difference $\Delta T$ between the outdoor temperature and the indoor temperature is relatively large, a server performs a cooling/heating operation. In FIG. 20, a case where a cooling/heating operation is performed is shown as "ON". The server performs a ventilating operation in a duration 2017 in which the cooling/heating operation is not performed and ventilation load amount is relatively small. In this case, the ventilation load amount may be calculated as $W_{load}=PC_pQ(T-T_0)$ as described in Equation (2) above.

Figure 21:
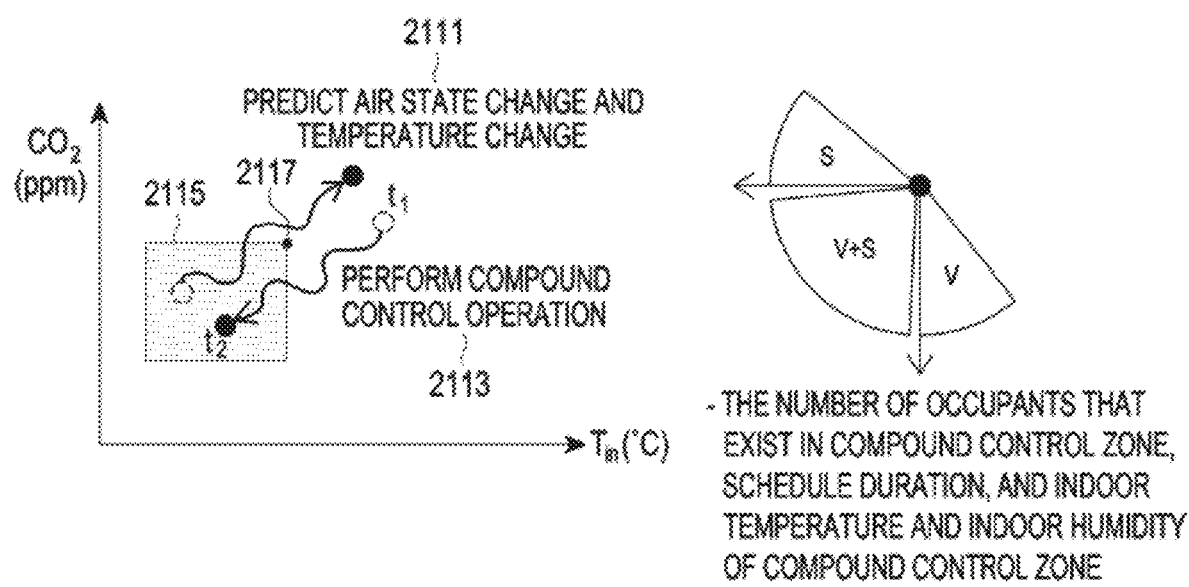
FIG. 21 is an illustration of a process of performing a compound control operation in a server in an air conditioning system according to an embodiment of the disclosure.

FIG. 21 is an illustration of a process of performing a compound control operation in a server in an air conditioning system according to an embodiment of the disclosure.

Referring to FIG. 21, a server predicts an air state change and a temperature change based on $CO_2$ concentration and the indoor temperature $T_{in}$ of a compound control zone 2111, and performs a compound control operation for a ventilating operation and a cooling/heating operation based on the predicted air state change and temperature change 2113. In FIG. 21, $t_1$ denotes time during which the compound control zone is maintained as a comfort zone 2115 among a schedule duration during which a compound control operation for the compound control zone is performed, and $t_2$ denotes time during which the compound control zone is not maintained as the comfort zone 2115 among the schedule duration. In this case, the comfort zone 2115 denotes a zone in which a target air comfort-degree and a target temperature comfort-degree may be satisfied and energy consumption may be decreased.

Thus, the server performs a compound control operation such that the compound control zone may maintain $CO_2$ concentration and the indoor temperature $T_{in}$ which correspond to a vertex 2117 of the comfort zone 2115 for as long as possible. That is, if a ventilating operation (V) and a cooling/heating operation (S) are performed at the same time, the compound control zone may fastest become the comfort zone 2115, however, energy consumption thereof becomes maximum. Thus, the server performs the compound control operation such that the compound control zone may maintain the $CO_2$ concentration and the indoor temperature $T_{in}$ which correspond to the vertex 2117 of the comfort zone 2115 for as long as possible for decreasing energy consumption and providing comfort. Further, the server performs the compound control operation such that the compound control zone may maintain the $CO_2$ concentration and the indoor temperature $T_{in}$ which correspond to the vertex 2117 of the comfort zone 2115 averagely ($t_1=t_2$) on a time axis for as long as possible.

Figure 22:
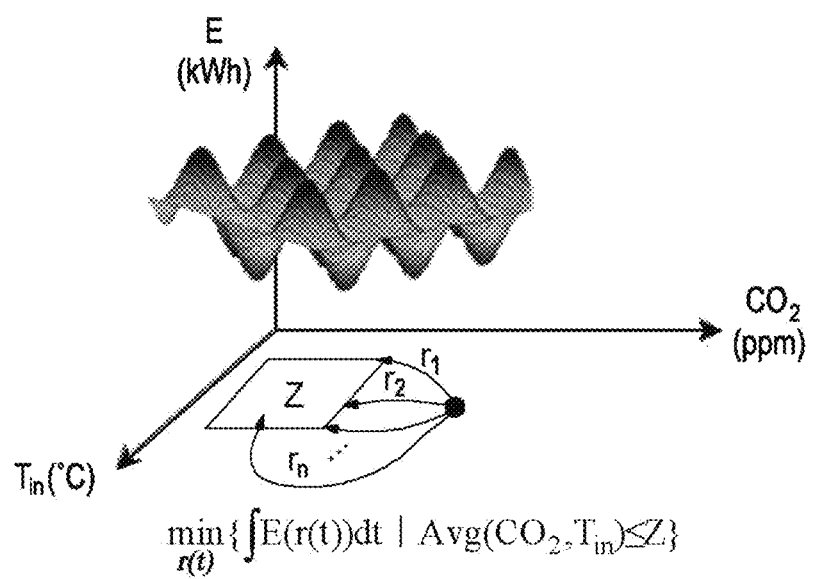
FIG. 22 is a chart of a process of performing a compound control operation in a server in an air conditioning system according to an embodiment of the disclosure.

FIG. 22 is a chart of a process of performing a compound control operation in a server in an air conditioning system according to an embodiment of the disclosure.

Referring to FIG. 22, a server performs a compound control operation for a ventilating operation $V_n$ and a cooling/heating operation $S_n$ during time $\Delta\tau$ on a certain air state $s_0$, and already knows an energy consumption amount $E_n$ and an air state change $s_1$ based on learning, etc., for example, based on learning which is based on an artificial intelligence based-prediction model, etc. In this case, the server may determine a compound control command which corresponds to minimal energy consumption with which a compound control zone may be a comfort zone z, and control a ventilating apparatus and an air conditioning apparatus corresponding to the determined compound control command $r_n$.

That is, the server may predict an air state change, a temperature state change, an enthalpy state change, and energy consumption, and use an artificial intelligence based-prediction model, and/or the like for predicting the air state change, the temperature state change, the enthalpy state change, and the energy consumption. For example, the server may implement the artificial intelligence based-prediction model with a form in which a relation among ventilation amount, $CO_2$ concentration, and a temperature change is modeled, and predict the air state change, the temperature state change, the enthalpy state change, and the energy consumption based on the implemented artificial intelligence based-prediction model.

Further, the server may generate compound control commands by considering a set temperature and wind amount of an air conditioning apparatus and an operation mode of the ventilation amount of the ventilating apparatus, select a compound control command suitable for a corresponding situation from among the compound control commands, and control the ventilating apparatus and the air conditioning apparatus corresponding to the selected compound control command. In this case, a set including the compound control commands is a compound control command set, and the server, the ventilating apparatus, and the air conditioning apparatus previously know the compound control command set. Thus, the compound control command may be implemented with a form of code, and the ventilating apparatus and the air conditioning apparatus may know a compound control command which corresponds to a code upon receiving the code from the server, thus, the ventilating apparatus and the air conditioning apparatus may perform an operation which corresponds to the compound control command.

Another example of a compound control operation in an air conditioning system according to an embodiment will be described below.

(1) A server configures a compound control rule in which all ventilating schedules in which a ventilating operation is possible during a given time duration, e.g., a schedule duration are considered, and a ventilating schedule which satisfies a target $CO_2$ concentration and has minimal energy consumption among ventilating schedules is determined as a final ventilating schedule based on an artificial intelligence based-prediction model, and/or the like.

(2) The server configures the compound control rule such that a ventilating apparatus is turned on during a time duration in which the rate of rise of $CO_2$ concentration is greater than or equal to an average rate of rise of $CO_2$ concentration of the schedule duration and the ventilating apparatus is turned off during a time duration in which the rate of rise of $CO_2$ concentration is less than the average rate of rise of $CO_2$ concentration in a $CO_2$ concentration-prediction model. The server configures the compound control rule such that an on-operation and an off-operation are alternately performed during remaining time durations except for the time duration during which the rate of rise of $CO_2$ concentration is greater than or equal to the average rate of rise of $CO_2$ concentration and the time duration during which the rate of rise of $CO_2$ concentration is less than the average rate of rise of $CO_2$ concentration.

The server predicts a $CO_2$ concentration change, and configures the compound control rule such that the ventilating apparatus is turned on during a time duration in which the rate of rise of $CO_2$ concentration is greater than or equal to a preset threshold rate of rise of $CO_2$ concentration among time durations to which the ventilating apparatus-off operation is allocated if $CO_2$ concentration of a corresponding time duration is greater than or equal to maximum permitted-$CO_2$ concentration. The server predicts the $CO_2$ concentration change, and configures the compound control rule such that the ventilating apparatus is turned off during a time duration of which the rate of rise of $CO_2$ concentration is less than the preset threshold rate of rise of $CO_2$ concentration among time durations to which the ventilating apparatus-on operation is allocated if the $CO_2$ concentration of the corresponding time duration is less than minimal permitted-$CO_2$ concentration.

(3) The server predicts the $CO_2$ concentration change based on the $CO_2$ concentration-prediction model, and configures the compound control rule such that the ventilating apparatus is turned on during a corresponding time duration and the ventilating apparatus is turned off during a time duration of which $CO_2$ concentration of a compound control zone satisfies target $CO_2$ concentration if $CO_2$ concentration of the corresponding time duration is greater than or equal to maximum permitted $CO_2$ concentration.

(4) The server configures the compound control rule in which all ventilating schedules in which a ventilating operation is possible and all cooling/heating schedules in which a cooling/heating operation is possible are considered during the schedule duration, and a ventilating schedule and a cooling/heating schedule which satisfy a target $CO_2$ concentration and a target indoor temperature range, and of which energy consumption is minimal, are determined as a final ventilating schedule and cooling/heating schedule based on an artificial intelligence based-prediction model, and/or the like.

(5) The server configures the compound control rule in which a ventilating schedule and a cooling/heating schedule are determined such that a cooling/heating operation is not performed during a time duration in which a ventilating operation is performed and the cooling/heating operation is performed during a time duration in which the ventilating operation is not performed. The server predicts an indoor temperature change of the compound control zone after allocating cooling/heating operation-on to a time duration in which the indoor temperature of the compound control zone is greater than or equal to a maximum permitted-indoor temperature and allocating cooling/heating operation-off to a time duration in which the indoor temperature of the compound control zone is less than a minimal permitted-indoor temperature. Then, the server allocates cooling/heating operation-off to a time duration in which the indoor temperature is lowest among time durations in which the indoor temperature is less than the minimal permitted-indoor temperature and allocates cooling/heating operation-on to a time duration in which the indoor temperature is highest among time durations in which the indoor temperature is greater than or equal to the maximum permitted-indoor temperature. In this case, the cooling/heating operation-on indicates that the cooling/heating operation is performed, and the cooling/heating operation-off indicates that the cooling/heating operation is not performed. In this case, the cooling/heating operation is, for example, a cooling operation.

(6) The server determines n time durations based on the outdoor air temperature during the schedule duration, and sets the target $CO_2$ concentration and a target PPD for each time duration. The server detects all ventilating schedules which satisfy the target $CO_2$ concentration for each of the n time durations, and calculates ventilation load amount for each of all ventilating schedules. The server selects a ventilating schedule of which the sum of cooling/heating energy for removing the ventilation load and ventilation energy is minimal from among all ventilating schedules.

The server allocates cooling/heating operation-on in ascending order of load/energy to be removed on a unit basis to determine a cooling/heating schedule, and performs a simulation based on the determined cooling/heating schedule. In this case, the unit is a unit with which a compound control operation is performed. In this case, the load/energy to be removed reflected to the determined cooling/heating schedule is less than total removal load/energy requested in the schedule duration in which the compound control operation is performed. After performing the simulation, the server adjusts the cooling/heating schedule such that a ventilation load change may be considered and the target PPD may be satisfied.

The server performs a compound control operation based on the adjusted cooling/heating schedule. After performing the compound control operation, the server calculates the difference between the result value thereof and a predicted value which is predicted according to the adjusted cooling/heating schedule, and reflects the difference to a determination of the next cooling/heating schedule. That is, the server may enhance performance of a compound control operation by making the difference reflected to setting target $CO_2$ concentration and a target PPD for each time duration, and a cooling/heating schedule.

Figure 23:
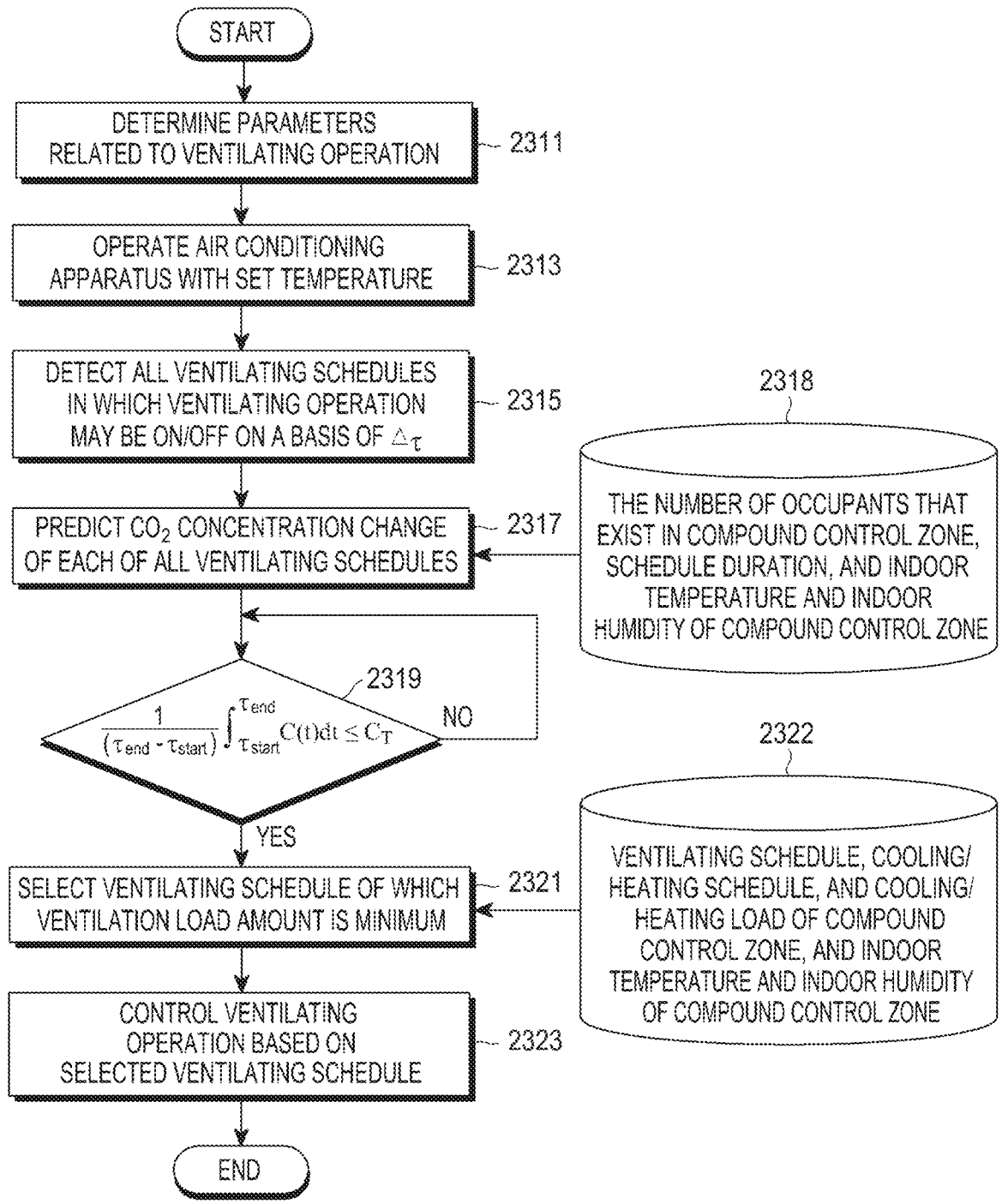
FIG. 23 is a flowchart illustrating a method of performing a compound control operation in a server in an air conditioning system according to an embodiment of the disclosure.

FIG. 23 is a flowchart of a method of performing a compound control operation in a server in an air conditioning system according to an embodiment of the disclosure.

Referring to FIG. 23, a server determines parameters related to a ventilating operation in step 2311. The parameters related to the ventilating operation may include $\tau_{start}$, $\tau_{end}$, $\Delta\tau$, $F_v$, etc. $\tau_{start}$ denotes a time when the ventilating operation initially starts, $\tau_{end}$ denotes a time when the ventilating operation finally ends, $\Delta\tau$ denotes unit a time to which the ventilating operation is applied, and $F_v$ denotes a ventilation-wind speed applied when the ventilating operation is performed. In FIG. 23, the number of compound control zones is one, the number of ventilating apparatuses is one, and the number of air conditioning apparatuses is one.

The server operates an air conditioning apparatus with a set temperature in step 2313. The server sets the set temperature of the air conditioning apparatus to, for example, 24° C. when a heating operation is performed, and sets the set temperature of the air conditioning apparatus to, for example, 22° C. when a cooling operation is performed. The server detects all ventilating schedules on which a ventilating operation may be on/off on a basis of $\Delta\tau$ in step 2315, and proceeds to step 2317. In this case, the number of all ventilating schedules on which the ventilating operation may be on/off on the basis of $\Delta\tau$ is $2^{(\tau_{end}-\tau_{start})/\Delta\tau}$.

The server predicts a $CO_2$ concentration change of each of the $2^{(\tau_{end}-\tau_{start})/\Delta\tau}$ ventilating schedules in step 2317. The server may consider various parameters 2318 such as the number of occupants who are in a compound control zone, a schedule duration for which a compound control operation is performed, the indoor temperature and indoor humidity of the compound control zone, and/or the like upon predicting the $CO_2$ concentration change of each of the $2^{(\tau_{end}-\tau_{start})/\Delta\tau}$ ventilating schedules. Further, the server may predict the $CO_2$ concentration change of each of the $2^{(\tau_{end}-\tau_{start})/\Delta\tau}$ ventilating schedules based on an artificial intelligence based-prediction model, etc.

The server determines whether the $CO_2$ concentration change of each of the $2^{(\tau_{end}-\tau_{start})/\Delta\tau}$ ventilating schedules, i.e., is $$\frac{1}{(\tau_{end} - \tau_{start})} \int_{\tau_{start}}^{\tau_{end}} C(t)\,dt$$

less than or equal to $C_T$ in step 2319. In this case, $C_T$ denotes target $CO_2$ concentration, and $C(t)$ denotes $CO_2$ concentration at time t. If $$\frac{1}{(\tau_{end} - \tau_{start})} \int_{\tau_{start}}^{\tau_{end}} C(t)\,dt$$

is less than or equal to $C_T$, the server proceeds to step 2321. The server selects a ventilating schedule of which the ventilation load amount is minimal among ventilating schedules of which $$\frac{1}{(\tau_{end} - \tau_{start})} \int_{\tau_{start}}^{\tau_{end}} C(t)\,dt$$

is less than or equal to $C_T$ in step 2321. The server may consider a cooling/heating schedule and cooling/heating load for the compound control zone and the indoor temperature and indoor humidity of the compound control zone as well as the ventilation load amount upon selecting the ventilating schedule 2322.

The server controls the ventilating operation of the ventilating apparatus based on the selected ventilating schedule in step 2323. That is, the server transmits, to the ventilating apparatus, a compound control command which corresponds to the selected ventilating schedule thereby the ventilating apparatus performs a ventilating operation corresponding to the compound control command.

Although FIG. 23 illustrates an example of a method of performing a compound control operation in a server in an air conditioning system according to an embodiment of the disclosure, various changes could be made to FIG. 23. For example, although shown as a series of operations, various operations in FIG. 23 could overlap, occur in parallel, occur in a different order, or occur multiple times.

Figure 24:
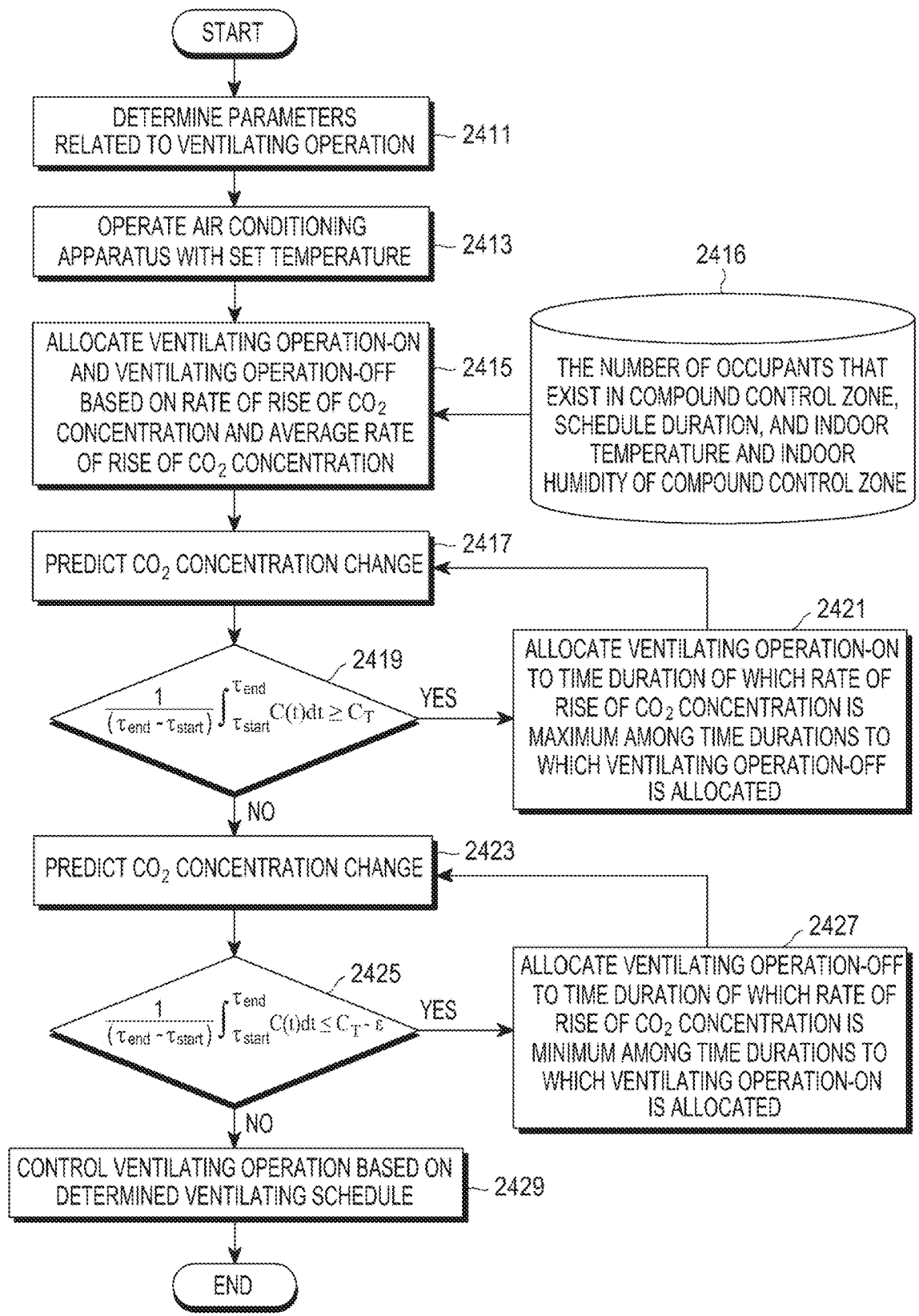
FIG. 24 is a flowchart illustrating a method of performing a compound control operation in a server in an air conditioning system according to an embodiment of the disclosure.

FIG. 24 is a flowchart of a method of performing a compound control operation in a server in an air conditioning system according to an embodiment of the disclosure.

Referring to FIG. 24, a server determines parameters related to a ventilating operation in step 2411, and proceeds to step 2413. The parameters related to the ventilating operation may include $\tau_{start}$, $\tau_{end}$, $\Delta\tau$, $F_v$, etc. In FIG. 24, the number of compound control zones is one, the number of ventilating apparatuses is one, and the number of air conditioning apparatuses is one.

The server operates an air conditioning apparatus with a set temperature in step 2413. The server sets the set temperature of the air conditioning apparatus to, for example, 24° C. when a heating operation is performed, and sets the set temperature of the air conditioning apparatus to, e.g., 22° C. when a cooling operation is performed. The server allocates ventilating operation-on to a time duration during which the rate of rise of $CO_2$ concentration detected in the $CO_2$ concentration prediction model is greater than an average rate of rise of $CO_2$ concentration, and allocates ventilating operation-off to a time duration for which the rate of rise of $CO_2$ concentration detected in the $CO_2$ concentration prediction model is less than or equal to the average rate of rise of $CO_2$ concentration ($\nabla C(t)|\Delta\tau > E\ [\nabla C(t)]$, ON@$\Delta\tau$)) in step 2415. In this case, $\varepsilon$ denotes a degree by which a $CO_2$ concentration change is permitted, and $\nabla C(t)$ denotes the rate of rise of $CO_2$ concentration at time t. The server may allocate ventilating operation-on and ventilating operation-off alternately to time durations except for the time duration for which the rate of rise of $CO_2$ concentration is greater than the average rate of rise of $CO_2$ concentration and the time duration for which the rate of rise of $CO_2$ concentration is less than or equal to the average rate of rise of $CO_2$ concentration. The server may consider the number of occupants who are in the compound control zone, a schedule duration, and the indoor temperature and the outdoor temperature of the compound control zone upon allocating the ventilating operation-on and ventilating operation-off based on the rate of rise of $CO_2$ concentration and the average rate of rise of $CO_2$ concentration 2416.

The server predicts a $CO_2$ concentration change of the compound control zone in step 2417. The $CO_2$ concentration change may be predicted based on an artificial intelligence based-prediction model, and/or the like. The server determines whether $$\frac{1}{(\tau_{end} - \tau_{start})} \int_{\tau_{start}}^{\tau_{end}} C(t)\, dt$$

is greater than or equal to $C_T$ in step 2419. If the $$\frac{1}{(\tau_{end} - \tau_{start})} \int_{\tau_{start}}^{\tau_{end}} C(t)\, dt$$

is greater than or equal to $C_T$, which means that ventilation is insufficient, the server allocates ventilating operation-on to a time duration during which the rate of rise of $CO_2$ concentration is maximum among all time durations to which ventilating operation-off is allocated in step 2421.

If $$\frac{1}{(\tau_{end} - \tau_{start})} \int_{\tau_{start}}^{\tau_{end}} C(t)\, dt$$

is not greater than or equal to $C_T$ in step 2419, that is, if $$\frac{1}{(\tau_{end} - \tau_{start})} \int_{\tau_{start}}^{\tau_{end}} C(t)\, dt$$

is less than $C_T$, the server predicts a $CO_2$ concentration change of the compound control zone in step 2423. The $CO_2$ concentration change may be predicted based on an artificial intelligence based-prediction model, and/or the like. The server determines whether $$\frac{1}{(\tau_{end} - \tau_{start})} \int_{\tau_{start}}^{\tau_{end}} C(t)\, dt$$

is less than or equal to $$C_T - \varepsilon \left( \frac{1}{(\tau_{end} - \tau_{start})} \int_{\tau_{start}}^{\tau_{end}} C(t)\, dt \leq C_T - \varepsilon \right)$$

in step 2425.

If $$\frac{1}{(\tau_{end} - \tau_{start})} \int_{\tau_{start}}^{\tau_{end}} C(t)\, dt$$

less than or equal to $C_T - \varepsilon$, which indicates that ventilation is excessively performed, the server allocates ventilating operation-off to a time duration during which the rate of rise of $CO_2$ concentration is minimal among all time durations to which ventilating operation-on is allocated in step 2427.

If $$\frac{1}{(\tau_{end} - \tau_{start})} \int_{\tau_{start}}^{\tau_{end}} C(t)\, dt$$

is not less than or equal to $C_T - \varepsilon$ in step 2425, i.e., if $$\frac{1}{(\tau_{end} - \tau_{start})} \int_{\tau_{start}}^{\tau_{end}} C(t)\, dt$$

is greater than $C_T - \varepsilon$, the server controls the ventilating operation based on the determined ventilating schedule in step 2429. That is, the server transmits, to the ventilating apparatus, a compound control command which corresponds to the determined ventilating schedule thereby the ventilating apparatus performs a ventilating operation corresponding to the compound control command.

Although FIG. 24 illustrates an example of a method of performing a compound control operation in a server in an air conditioning system according to an embodiment of the disclosure, various changes could be made to FIG. 24. For example, although shown as a series of operations, various operations in FIG. 24 could overlap, occur in parallel, occur in a different order, or occur multiple times.

Figure 25:
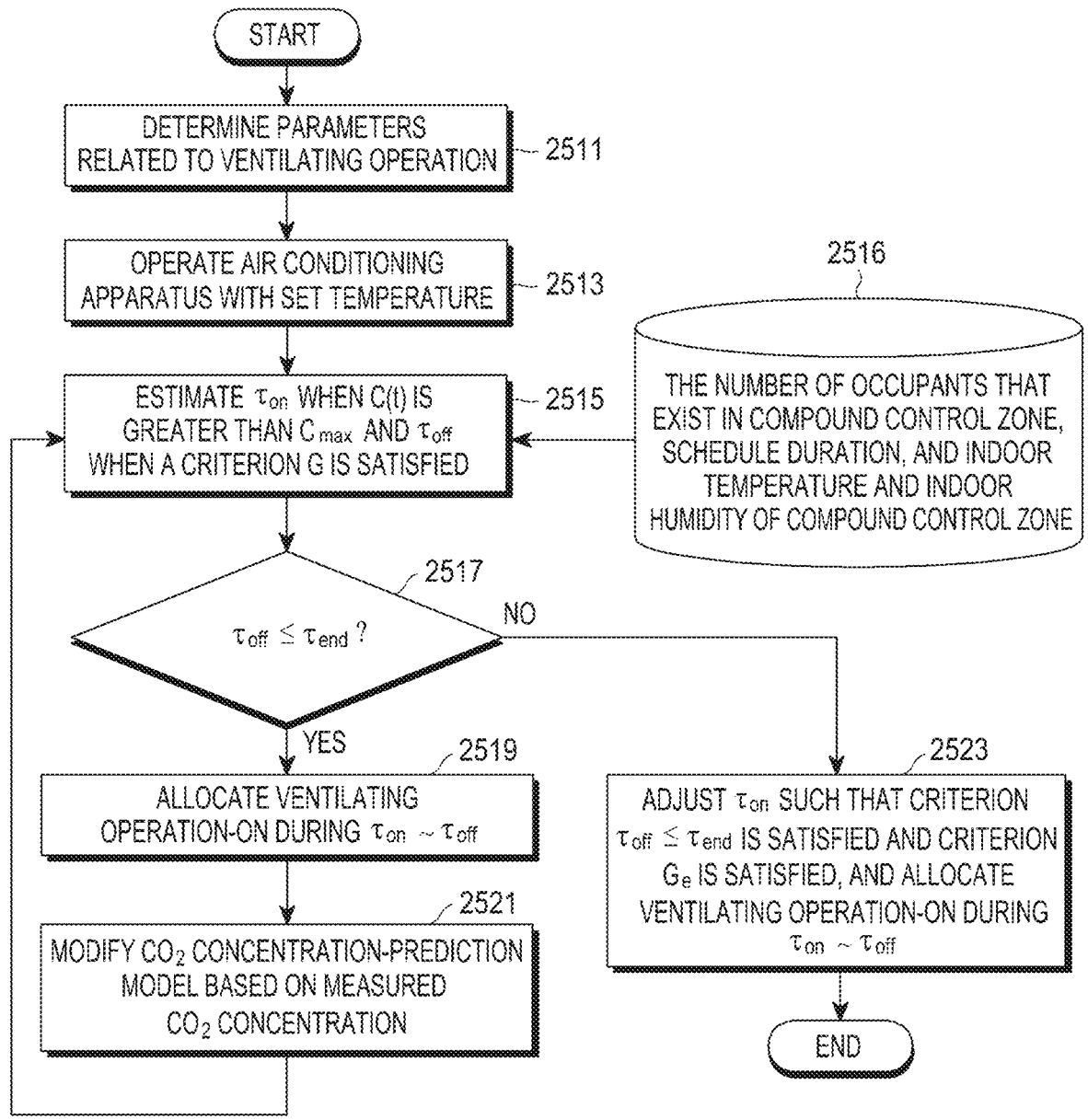
FIG. 25 is a flowchart illustrating a method of performing a compound control operation in a server in an air conditioning system according to an embodiment of the disclosure.

FIG. 25 is a flowchart of a method of performing a compound control operation in a server in an air conditioning system according to an embodiment of the disclosure.

Referring to FIG. 25, a server determines parameters related to a ventilating operation in step 2511. The parameters related to the ventilating operation may include $\tau_{start}$, $\tau_{end}$, $F_v$, $C_{max}$, etc. In this case, $C_{max}$ denotes maximum permitted $CO_2$ concentration. In FIG. 25, the number of compound control zones is one, the number of ventilating apparatuses is one, and the number of air conditioning apparatuses is one.

The server operates an air conditioning apparatus with a set temperature in step 2513. The server sets the set temperature of the air conditioning apparatus to, e.g., 24° C. when a heating operation is performed, and sets the set temperature of the air conditioning apparatus to, e.g., 22° C. when a cooling operation is performed. The server estimates $\tau_{on}$ when $C(t)$ is greater than $C_{max}$ through a $CO_2$ concentration-prediction model and $\tau_{off}$ when a criterion G is satisfied in step 2515. In this case, the criterion G is $$\frac{1}{(\tau_{off} - \tau_{start})} \int_{\tau_{start}}^{\tau_{off}} C(t)\, dt \leq C_T.$$

Further, $\tau_{on}$ denotes time when the next ventilating operation starts, and $\tau_{off}$ denotes time when the next ventilating operation ends. Here, $C_{max}$ denotes maximum permitted $CO_2$ concentration.

The server may consider various parameters such as the number of occupants who are in a compound control zone, a schedule duration for which a compound control operation is performed, the indoor temperature and indoor humidity of the compound control zone, and/or the like upon estimating $\tau_{on}$ when C(t) is greater than $C_{max}$ and $\tau_{off}$ when the criterion G is satisfied. The server may predict the $CO_2$ concentration change based on an artificial intelligence based-prediction model, and/or the like.

The server determines whether $\tau_{off}$ is less than or equal to $\tau_{end}$ ($\tau_{off} \leq \tau_{end}$) in step 2517. If $\tau_{off}$ is less than or equal to $\tau_{end}$ ($\tau_{off} \leq \tau_{end}$), the server allocates ventilating operation-on during $\tau_{on}$–$\tau_{off}$ in step 2519. The server measures the actual $CO_2$ concentration during the schedule duration, and modifies the $CO_2$ concentration-prediction model based on the measured $CO_2$ concentration in step 2521. In this case, if the actual $CO_2$ concentration measured during the schedule duration is equal to $CO_2$ concentration predicted by the $CO_2$ concentration-prediction model, the modification to the $CO_2$ concentration-prediction model may not be performed.

If $\tau_{off}$ is not less than or equal to $\tau_{end}$ ($\tau_{off} \leq \tau_{end}$), i.e., if $\tau_{off} > \tau_{end}$, the server adjusts $\tau_{on}$ such that a criterion $\tau_{off} \leq \tau_{end}$ is satisfied and a criterion $G_e$ is satisfied through the $CO_2$ concentration-prediction model, and allocates ventilating operation-on during $\tau_{on}$–$\tau_{off}$ in step 2523.

Although FIG. 25 illustrates an example of a method of performing a compound control operation in a server in an air conditioning system according to an embodiment of the disclosure, various changes could be made to FIG. 25. For example, although shown as a series of operations, various operations in FIG. 25 could overlap, occur in parallel, occur in a different order, or occur multiple times.

Figure 26A:
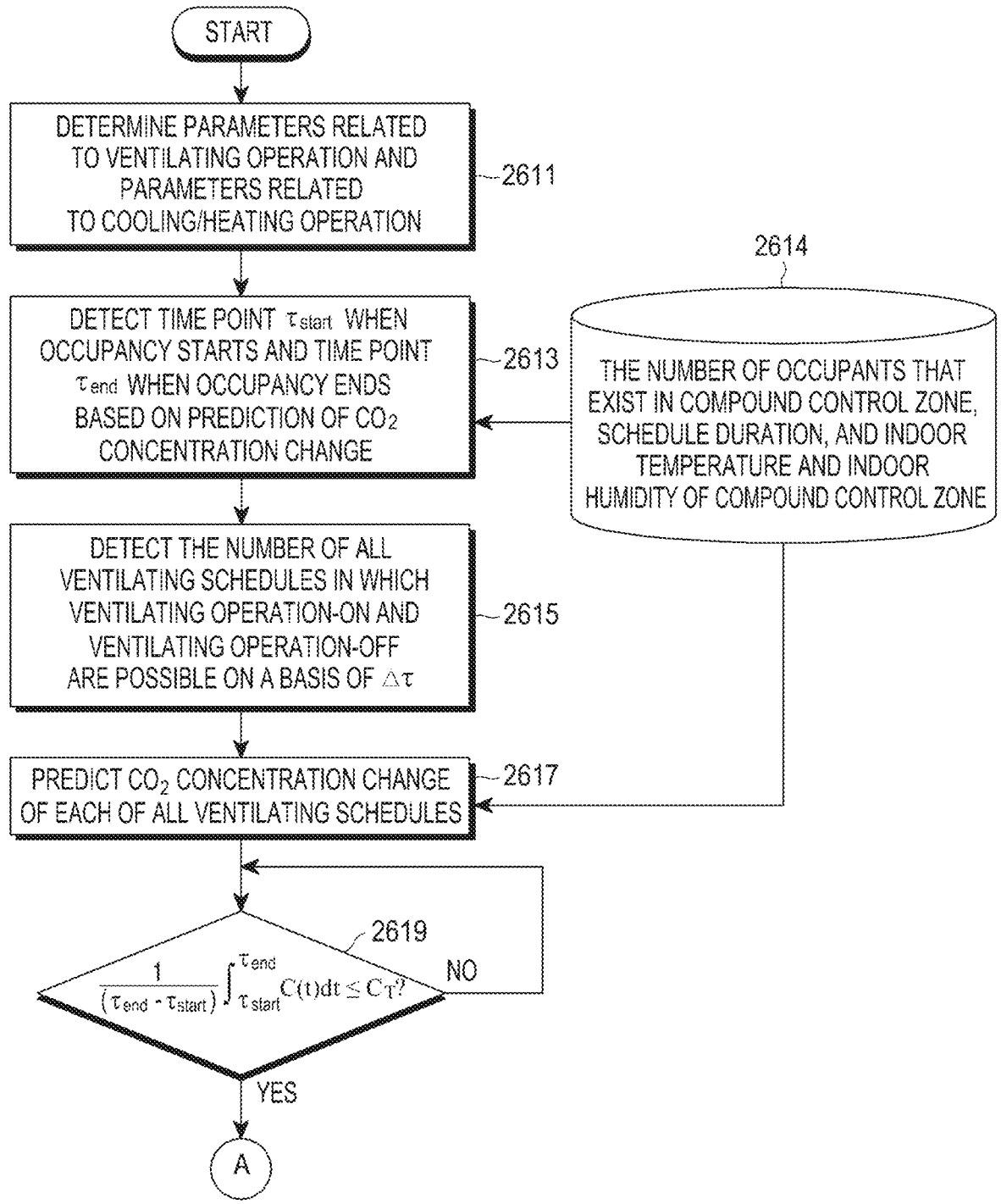
FIGS. 26A and 26B are flowcharts illustrating a method of performing a compound control operation in a server in an air conditioning system according to an embodiment of the disclosure.
Figure 26B:
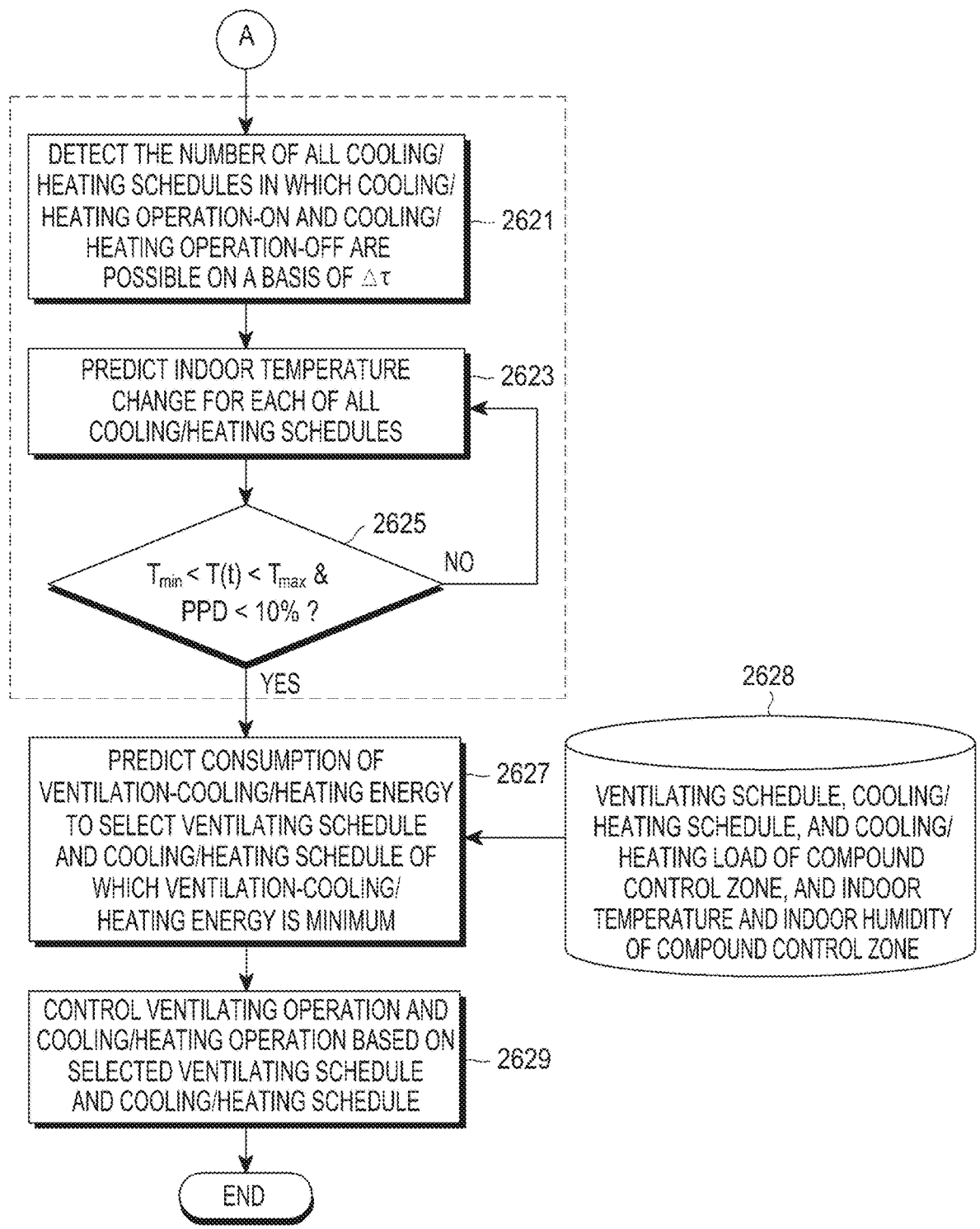

FIGS. 26A and 26B are flowcharts of a method of performing a compound control operation in a server in an air conditioning system according to an embodiment of the disclosure.

Referring to FIGS. 26A and 26B, a server determines parameters related to a ventilating operation and parameters related to a cooling/heating operation in step 2611. The parameters related to the ventilating operation may include $\Delta\tau$, $F_v$, etc., and the parameters related to the cooling/heating operation may include $T_s$, $F_s$, etc. In this case, $T_s$ denotes a set temperature applied to an air conditioning apparatus, and $F_s$ denotes a wind speed applied to the air conditioning apparatus. In FIGS. 26A and 26B, the number of compound control zones is one, the number of ventilating apparatuses is one, and the number of air conditioning apparatuses is one.

The server detects a time point $\tau_{start}$ when occupancy starts and a time point $\tau_{end}$ when occupancy ends based on prediction of a $CO_2$ concentration change in step 2613. The server may consider the number of occupants who are in a compound control zone, schedule duration, and the indoor temperature and indoor humidity of the compound control zone upon detecting the time point $\tau_{start}$ and the time point $\tau_{end}$ 2614. The server detects the number of all ventilating schedules on which a ventilating operation may be on/off on the basis of $\Delta\tau$ in step 2615. In this case, the number of all ventilating schedules on which the ventilating operation may be on/off on the basis of $\Delta\tau$ is $2^{(\tau_{end}-\tau_{start})}/\Delta\tau$.

The server predicts a $CO_2$ concentration change of each of the $2^{(\tau_{end}-\tau_{start})}/\Delta\tau$ ventilating schedules in step 2617. The server may consider various parameters such as the number of occupants who are in a compound control zone, a schedule duration for which a compound control operation is performed, the indoor temperature and indoor humidity of the compound control zone, etc., upon predicting the $CO_2$ concentration change of each of the $2^{(\tau_{end}-\tau_{start})}/\Delta\tau$ ventilating schedules. The server may predict the $CO_2$ concentration change of each of the $2^{(\tau_{end}-\tau_{start})}/\Delta\tau$ ventilating schedules based on an artificial intelligence based-prediction model, and/or the like.

The server determines whether the $CO_2$ concentration change of each of the $2^{(\tau_{end}-\tau_{start})}/\Delta\tau$ ventilating schedules, i.e., $$\frac{1}{(\tau_{end}-\tau_{start})}\int_{\tau_{start}}^{\tau_{end}} C(t)dt$$

is less than or equal to $C_T$ in step 2619. If $$\frac{1}{(\tau_{end}-\tau_{start})}\int_{\tau_{start}}^{\tau_{end}} C(t)dt$$

is less than or equal to $C_T$, the server detects the number of all cooling/heating schedules in which a cooling/heating operation may be on/off on a basis of $\Delta\tau$ for each of all ventilating schedules for which $$\frac{1}{(\tau_{end}-\tau_{start})}\int_{\tau_{start}}^{\tau_{end}} C(t)dt$$

is less than or equal to $C_T$ in step 2621.

The server predicts an indoor temperature change for each of all cooling/heating schedules in step 2623. The server determines whether a criterion $T_{min}<T(t)<T_{max}$ & PPD<10% is satisfied in step 2625. In this case, $T_{min}$ denotes a minimal permitted indoor temperature, $T_{max}$ denotes a maximum permitted indoor temperature, and a PPD denotes a percentage of dissatisfied. If the criterion $T_{min}<T(t)<T_{max}$ & PPD<10% is not satisfied, the method returns to step 2623.

Steps 2621 to 2625 are performed for each schedule.

If the criterion $T_{min}<T(t)<T_{max}$ & PPD<10% is satisfied in step 2625, the server predicts consumption of ventilation-cooling/heating energy to select a ventilating schedule and a cooling/heating schedule of which the ventilation-cooling/heating energy is minimal in step 2627. Here, the server may consider a ventilating schedule, a cooling/heating schedule, cooling/heating load, and the indoor temperature and indoor humidity of the compound control zone upon selecting the ventilating schedule and the cooling/heating schedule of which the ventilation-cooling/heating energy is minimal by predicting the consumption of ventilation-cooling/heating energy 2628.

The server controls the ventilating operation and the cooling/heating operation based on the selected ventilating schedule and cooling/heating schedule in step 2629. That is, the server transmits, to the ventilating apparatus, a compound control command which corresponds to the selected ventilating schedule and cooling/heating schedule thereby the ventilating apparatus performs a ventilating operation corresponding to the compound control command.

Although FIGS. 26A and 26B illustrate an example of a method of performing a compound control operation in a server in an air conditioning system according to an embodiment of the disclosure, various changes could be made to FIGS. 26A and 26B. For example, although shown as a series of operations, various operations in FIGS. 26A and 26B could overlap, occur in parallel, occur in a different order, or occur multiple times.

Figure 27A:
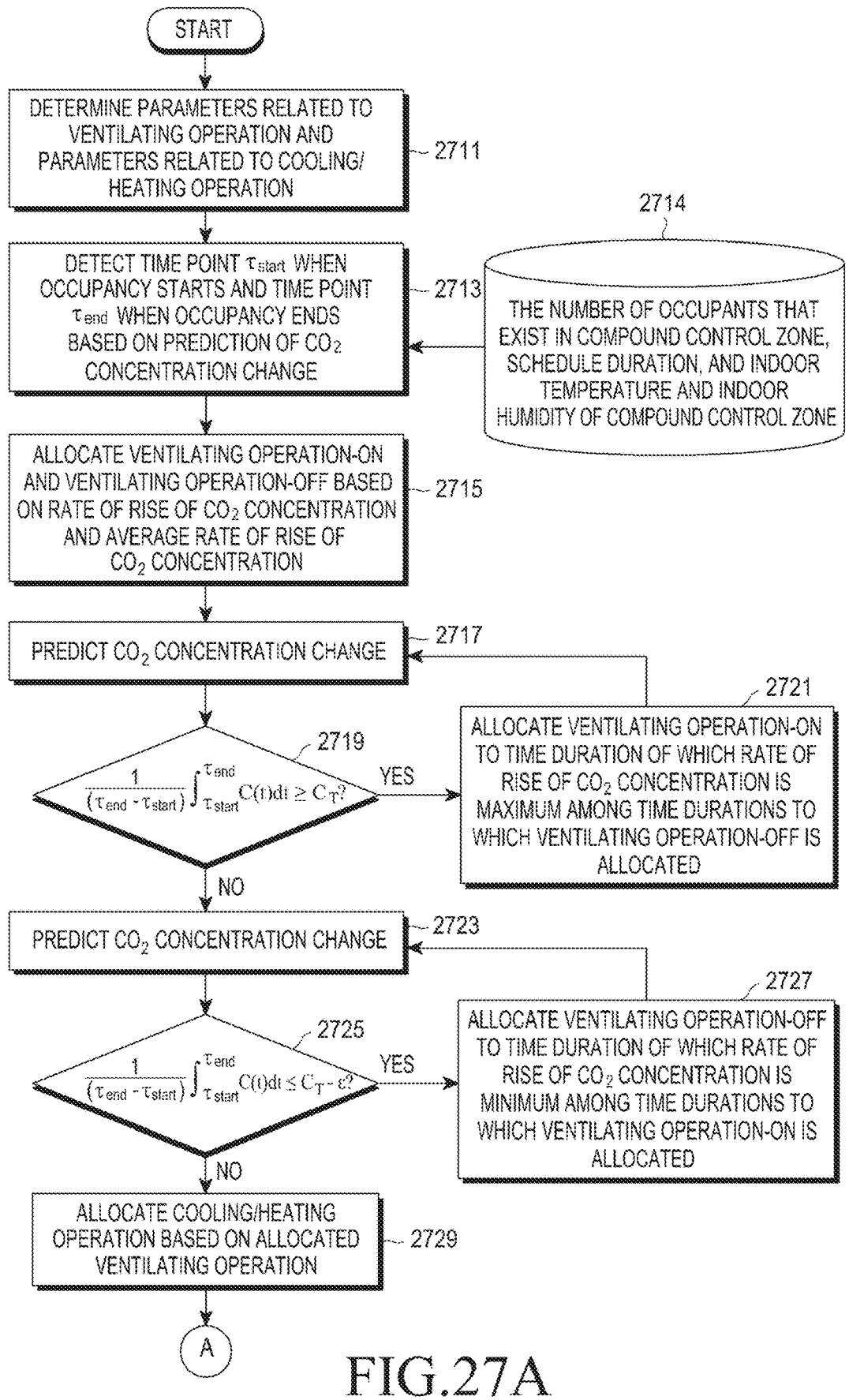
FIGS. 27A and 27B are flowcharts illustrating a method of performing a compound control operation in a server in an air conditioning system according to an embodiment of the disclosure.
Figure 27B:
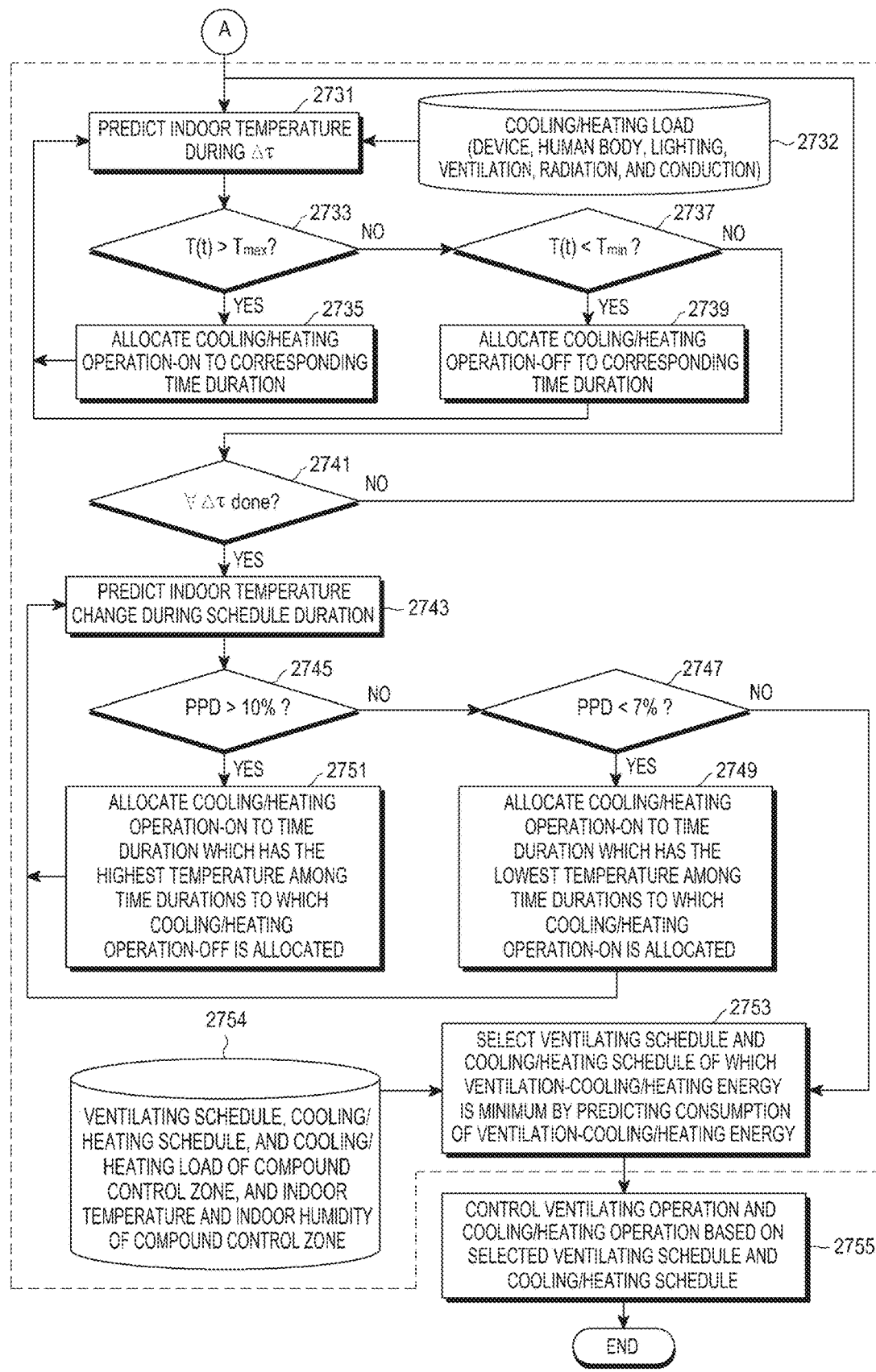

FIGS. 27A and 27B are flowcharts of a method of performing a compound control operation in a server in an air conditioning system according to an embodiment of the disclosure.

Referring to FIGS. 27A and 27B, a server determines parameters related to a ventilating operation and parameters related to a cooling/heating operation in step 2711. The parameters related to the ventilating operation may include $\Delta\tau$, $F_v$, etc., and the parameters related to the cooling/heating operation may include $T_s$, $T_{max}$, $F_s$, etc. In FIGS. 27A and 27B, the number of compound control zones is one, the number of ventilating apparatuses is one, and the number of air conditioning apparatuses is one.

The server detects a time point $\tau_{start}$ when occupancy starts and a time point $\tau_{end}$ when occupancy ends based on prediction of a $CO_2$ concentration change in step 2713. In this case, the server may consider the number of occupants who are in a compound control zone, schedule duration, and the indoor temperature and indoor humidity of the compound control zone upon detecting the time point $\tau_{start}$ and the time point $\tau_{end}$. The server allocates ventilating operation-on to a time duration during which the rate of rise of $CO_2$ concentration detected in the $CO_2$ concentration prediction model is greater than an average rate of rise of $CO_2$ concentration, and allocates ventilating operation-off to a time duration for which the rate of rise of $CO_2$ concentration detected in the $CO_2$ concentration prediction model is less than or equal to the average rate of rise of $CO_2$ concentration in step 2715. The server may allocate ventilating operation-on and ventilating operation-off alternately to time durations except for the time duration for which the rate of rise of $CO_2$ concentration is greater than the average rate of rise of $CO_2$ concentration and the time duration for which the rate of rise of $CO_2$ concentration is less than or equal to the average rate of rise of $CO_2$ concentration.

The server predicts a $CO_2$ concentration change of the compound control zone in step 2717. The $CO_2$ concentration change may be predicted based on an artificial intelligence based-prediction model, etc. The server determines whether $$\frac{1}{(\tau_{end} - \tau_{start})} \int_{\tau_{start}}^{\tau_{end}} C(t)dt$$

is greater than or equal to $C_T$ in step 2719. If the $$\frac{1}{(\tau_{end} - \tau_{start})} \int_{\tau_{start}}^{\tau_{end}} C(t)dt$$

is greater than or equal to $C_T$, which indicates that ventilation is insufficient, the server allocates ventilating operation-on to a time duration during which the rate of rise of $CO_2$ concentration is maximum among all time durations to which ventilating operation-off is allocated in step 2721. If $$\frac{1}{(\tau_{end} - \tau_{start})} \int_{\tau_{start}}^{\tau_{end}} C(t)dt$$

is greater than or equal to $C_T$ in step 2719, i.e., if $$\frac{1}{(\tau_{end} - \tau_{start})} \int_{\tau_{start}}^{\tau_{end}} C(t)dt$$

is less than $C_T$, the server predicts a $CO_2$ concentration change of the compound control zone in step 2723. The $CO_2$ concentration change may be predicted based on an artificial intelligence based-prediction model, etc. The server determines whether $$\frac{1}{(\tau_{end} - \tau_{start})} \int_{\tau_{start}}^{\tau_{end}} C(t)dt$$

is less than or equal to $C_T - \varepsilon$ $$\left(\frac{1}{(\tau_{end} - \tau_{start})} \int_{\tau_{start}}^{\tau_{end}} C(t)dt \leq C_T - \varepsilon\right)$$

in step 2725. If $$\frac{1}{(\tau_{end} - \tau_{start})} \int_{\tau_{start}}^{\tau_{end}} C(t)dt$$

is less than or equal to $C_T - \varepsilon$, which indicates that ventilation is excessively performed, the server allocates ventilating operation-off to a time duration during which the rate of rise of $CO_2$ concentration is minimal among all time durations to which ventilating operation-on is allocated in step 2727. If $$\frac{1}{(\tau_{end} - \tau_{start})} \int_{\tau_{start}}^{\tau_{end}} C(t)dt$$

is not less than or equal to $C_T - \varepsilon$ in step 2725, i.e., if $$\frac{1}{(\tau_{end} - \tau_{start})} \int_{\tau_{start}}^{\tau_{end}} C(t)dt$$

is greater than $C_T - \varepsilon$, the server allocates a cooling/heating operation based on the ventilating operation allocated to each time duration in step 2729. That is, the server allocates cooling/heating operation-off to a time duration to which ventilating operation-on is allocated, and allocates cooling/heating operation-on to a time duration to which ventilating operation-off is allocated.

The server predicts the indoor temperature during $\Delta\tau$ in step 2731. The server may consider cooling/heating load, e.g., cooling/heating load due to a device, a human body, lighting, ventilation, radiation, conduction, etc., upon predicting the indoor temperature during $\Delta\tau$. The server determines whether $T(t)$ is greater than $T_{max}$ in step 2733. If the $T(t)$ is greater than $T_{max}$, the server allocates cooling/heating operation-on to a corresponding time duration in step 2735. In this case, the server may set $T_s$ to, e.g., a higher temperature if necessary in a case in which the indoor temperature does not satisfy a target indoor temperature even though the server allocates the cooling/heating operation-on to the corresponding time duration.

If T(t) is not greater than $T_{max}$ in step 2733, the server determines whether T(t) is less than $T_{min}$ in step 2737. If the T(t) is less than $T_{min}$, the server allocates cooling/heating operation-off to a corresponding time duration in step 2739. In this case, the server may set $T_s$ to, e.g., a lower temperature if necessary in a case in which the indoor temperature does not satisfy a target indoor temperature even though the server allocates the cooling/heating operation-off to the corresponding time duration.

If the T(t) is not less than $T_{min}$ in step 2737, the server determines whether the operations have been performed for all Δτ in step 2741. If the operations have been performed for all Δτ, the server predicts an indoor temperature change during a schedule duration in step 2743. The server determines whether a PPD during the schedule duration is greater than 10% in step 2745. If the PPD is greater than 10%, it indicates cooling/heating is insufficient. Further, 10% is just an example, and may be changed according to a situation of the air conditioning system.

If the PPD is not greater than 10%, the server determines whether the PPD during the schedule duration is less than 7% in step 2747. If the PPD is less than 7%, it indicates cooling/heating is excessively performed. Further, 7% is just an example, and may be changed according to a situation of the air conditioning system.

If the PPD is less than 7%, the server allocates cooling/heating operation-off to a time duration which has the lowest temperature among all time durations to which cooling/heating operation-on is allocated during the schedule duration in step 2749.

If the PPD is greater than 10%, the server proceeds to step 2751. The server allocates cooling/heating operation-on to a time duration which has the highest temperature among all time durations to which cooling/heating operation-off is allocated during the schedule duration in step 2751.

If the PPD during the schedule duration is not less than 7% in step 2747, the server selects a ventilating schedule and a cooling/heating schedule of which the ventilation-cooling/heating energy is minimal by predicting consumption of ventilation-cooling/heating energy in step 2753. In this case, the server may consider a ventilating schedule, a cooling/heating schedule, and cooling/heating load of a compound control zone, and the indoor temperature and indoor humidity of the compound control zone upon selecting the a ventilating schedule and the cooling/heating schedule of which the ventilation-cooling/heating energy is minimal by predicting the consumption of ventilation-cooling/heating energy. Steps 2731 to 2753 are performed on all schedules.

The server controls the ventilating operation and the cooling/heating operation based on the selected ventilating schedule and cooling/heating schedule in step 2755. That is, the server transmits, to the ventilating apparatus, a compound control command which corresponds to the selected ventilating schedule and cooling/heating schedule thereby the ventilating apparatus performs a ventilating operation corresponding to the compound control command.

Although FIGS. 27A and 27B illustrates an example of a method of performing a compound control operation in a server in an air conditioning system according to an embodiment of the disclosure, various changes could be made to FIGS. 27A and 27B. For example, although shown as a series of operations, various operations in FIGS. 27A and 27B could overlap, occur in parallel, occur in a different order, or occur multiple times.

Figure 28A:
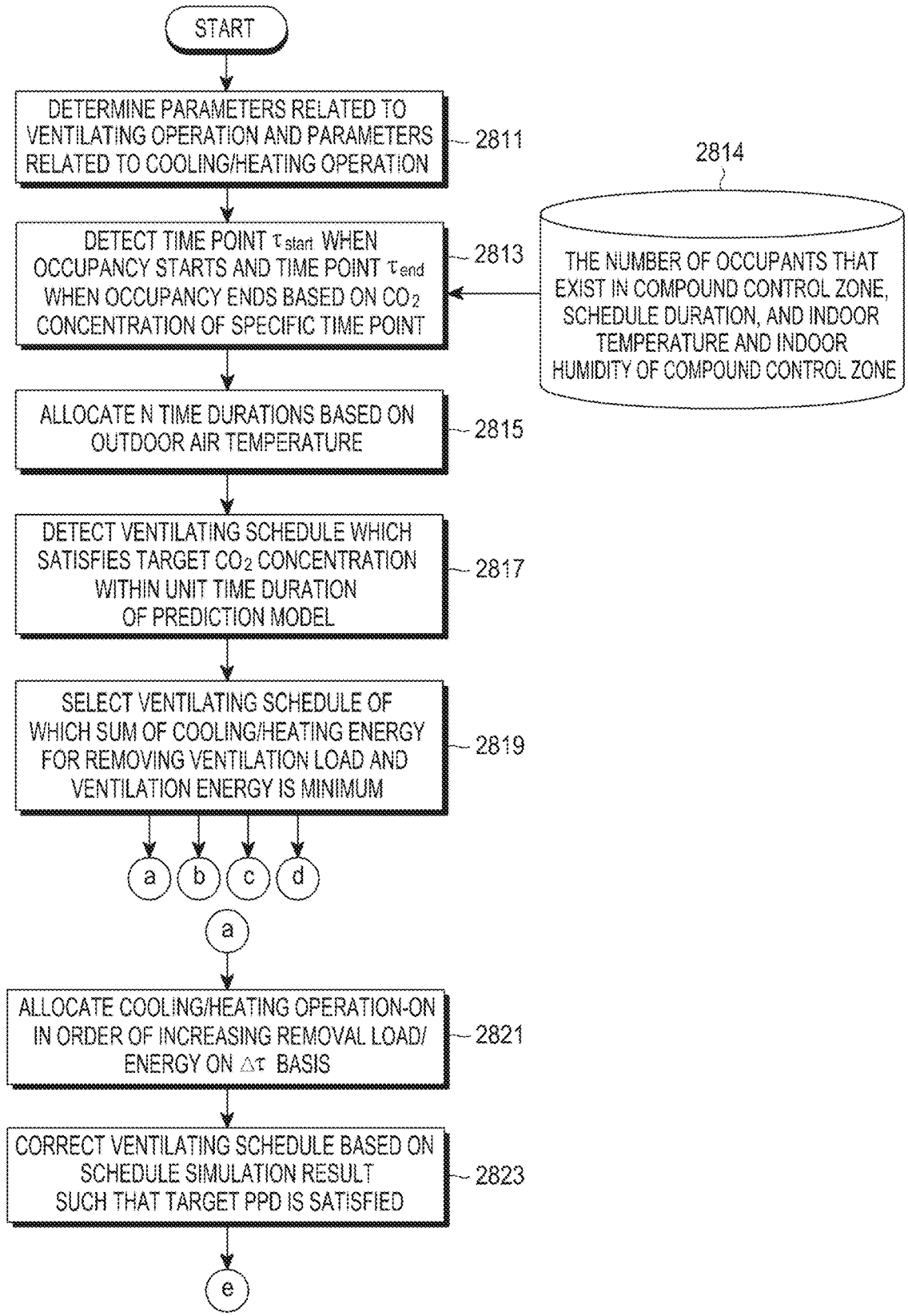
FIGS. 28A and 28B are flowcharts illustrating a method of performing a compound control operation in a server in an air conditioning system according to an embodiment of the disclosure.
Figure 28B:
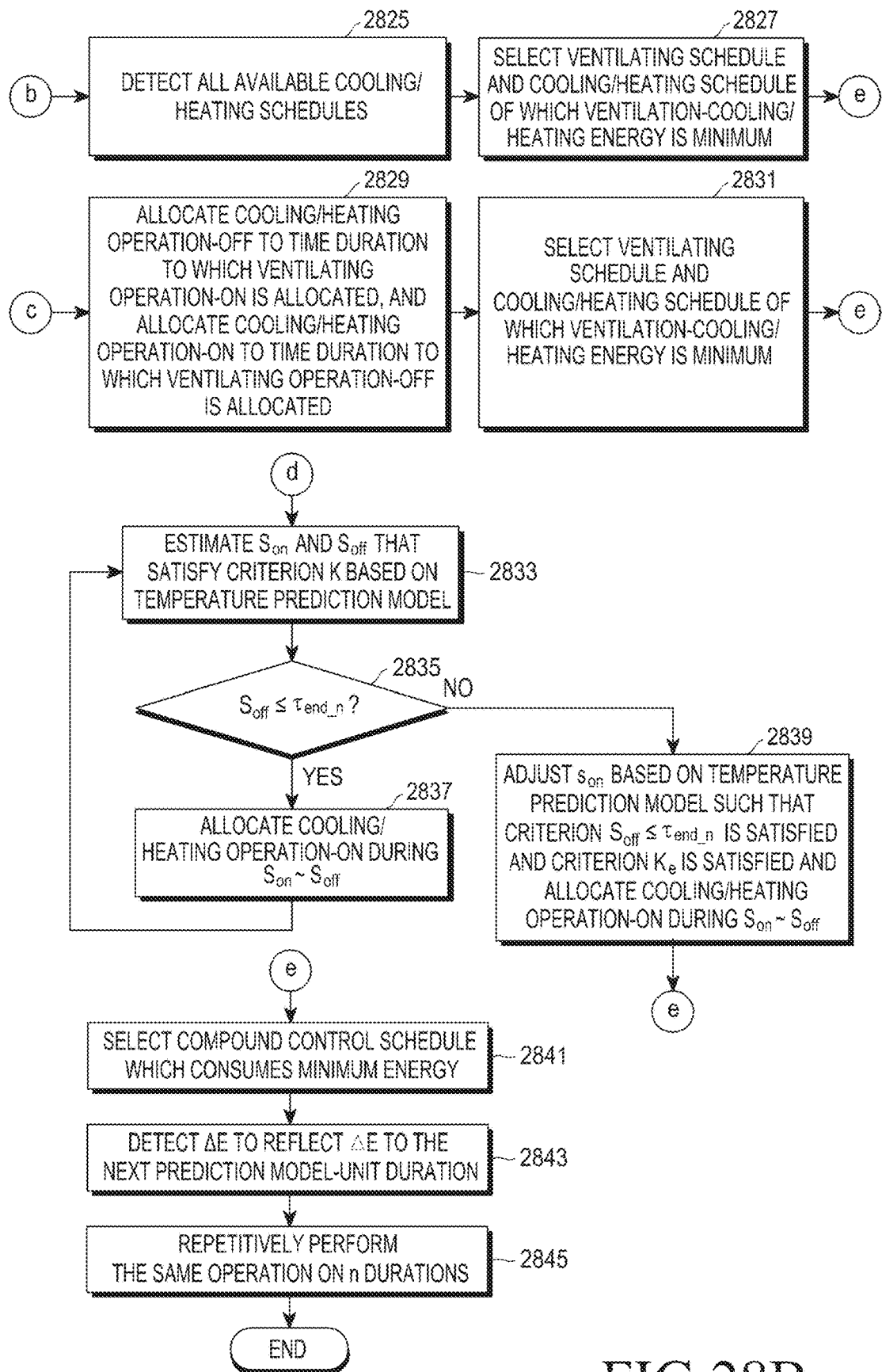

FIGS. 28A and 28B are flowcharts of a method of performing a compound control operation in a server in an air conditioning system according to an embodiment of the disclosure.

Referring to FIGS. 28A and 28B, a server determines parameters related to a ventilating operation and parameters related to a cooling/heating operation in step 2811. The parameters related to the ventilating operation may include Δτ, $F_v$, etc., and the parameters related to the cooling/heating operation may include $τ_s$, $T_{max}$, $F_s$, etc. In FIGS. 28A and 28B, the number of compound control zones is one, the number of ventilating apparatuses is one, and the number of air conditioning apparatuses is one.

The server detects a time point $τ_{start}$ when occupancy starts and a time point $τ_{end}$ when occupancy ends based on $CO_2$ concentration at a certain time point, e.g., the most recently measured $CO_2$ concentration in step 2813. The server may consider the number of occupants who are in a compound control zone, schedule duration, and the indoor temperature and indoor humidity of the compound control zone upon detecting the time point $τ_{start}$ and the time point $τ_{end}$. The server allocates n time durations to the schedule duration based on the outdoor air temperature in step 2815. The server detects a ventilating schedule which satisfies target $CO_2$ concentration within a unit time duration of a prediction model in step 2817. The server selects a ventilating schedule of which the sum of cooling/heating energy for removing the ventilation load and ventilation energy is minimal in step 2819. Thereafter, the method proceeds to one of steps 2821, 2825, 2829, and 2833.

The server allocates cooling/heating operation-on in order of increasing removal load/energy on Δτ basis in step 2821. The server corrects a ventilating schedule based on a schedule simulation result such that a target PPD is satisfied in step 2823. That is, the server may correct the schedules by considering a ventilation load change such that a target PPD may be satisfied after simulating the schedules.

The server detects all available cooling/heating schedules in step 2825. The server selects a ventilating schedule and a cooling/heating schedule of which the ventilation-cooling/heating energy is minimal in step 2827. In this case, the server may select the ventilating schedule and the cooling/heating schedule of which the ventilation-cooling/heating energy is minimal based on a scheme as illustrated in FIGS. 26A and 26B in step 2827.

The server allocates cooling/heating operation-off to a time duration to which ventilating operation-on is allocated, and allocates cooling/heating operation-on to a time duration to which ventilating operation-off is allocated in step 2829. The server selects a ventilating schedule and a cooling/heating schedule of which the ventilation-cooling/heating energy is minimal in step 2831. In this case, the server may select the ventilating schedule and the cooling/heating schedule of which the ventilation-cooling/heating energy is minimal based on a scheme as illustrated in FIGS. 27A and 27B in step 2831.

The server estimates $S_{on}$ and $S_{off}$ which satisfy a criterion K based on a temperature prediction model in step 2833. In this case, the criterion K may be expressed as Equation (3) below.

$$K: T^-_{PPD_n} \leq \frac{1}{(s_{off} - τ_{start\_n})} \int_{τ_{start\_n}}^{s_{off}} T(t)dt \leq T^+_{PPD_n} \qquad (3)$$

In Equation (3) above, $\tau_{start\_n}$ denotes a start time point of a time duration n, $\tau_{end\_n}$ denotes an end time point of the time duration n, $S_{on}$ denotes a time point at which the next cooling/heating operation starts, $S_{off}$ denotes a time point at which the next cooling/heating operation ends, and $\tau_{PPDn}^-$ to $\tau_{PPDn}^+$ denotes a temperature range in which a target PPD is satisfied during the time duration n.

The server determines whether a criterion $S_{off} \le \tau_{end\_n}$ is satisfied in step 2835. If the criterion $s_{off} \le \tau_{end\_n}$ is satisfied, the server allocates cooling/heating operation-on during $S_{on}$ to $S_{off}$ in step 2837.

If the criterion $s_{off} \le \tau_{end\_n}$ is not satisfied in step 2835, the server adjusts $S_{on}$ based on the temperature prediction model such that the criterion $s_{off} \le \tau_{end\_n}$ is satisfied and a criterion $K_e$ is satisfied and allocates cooling/heating operation-on during $S_{on}$ to $S_{off}$ in step 2839. The criterion $K_e$ may be expressed as shown in Equation (4).

$$K_e: T_{PPD}^- \le \frac{1}{(\tau_{end\_n} - \tau_{start\_n})} \int_{\tau_{start\_n}}^{\tau_{end\_n}} T(t)dt \le T_{PPD}^+ \qquad (4)$$

The server selects a compound control schedule which consumes minimum energy in step 2841. The server detects ΔE to reflect ΔE to the next prediction model-unit duration in step 2843. The server repetitively performs the same operation on n durations in step 2845.

Although FIGS. 28A and 28B illustrates an example of a method of performing a compound control operation in a server in an air conditioning system according to an embodiment of the disclosure, various changes could be made to FIGS. 28A and 28B. For example, although shown as a series of operations, various operations in FIGS. 28A and 28B could overlap, occur in parallel, occur in a different order, or occur multiple times.

Figure 29:
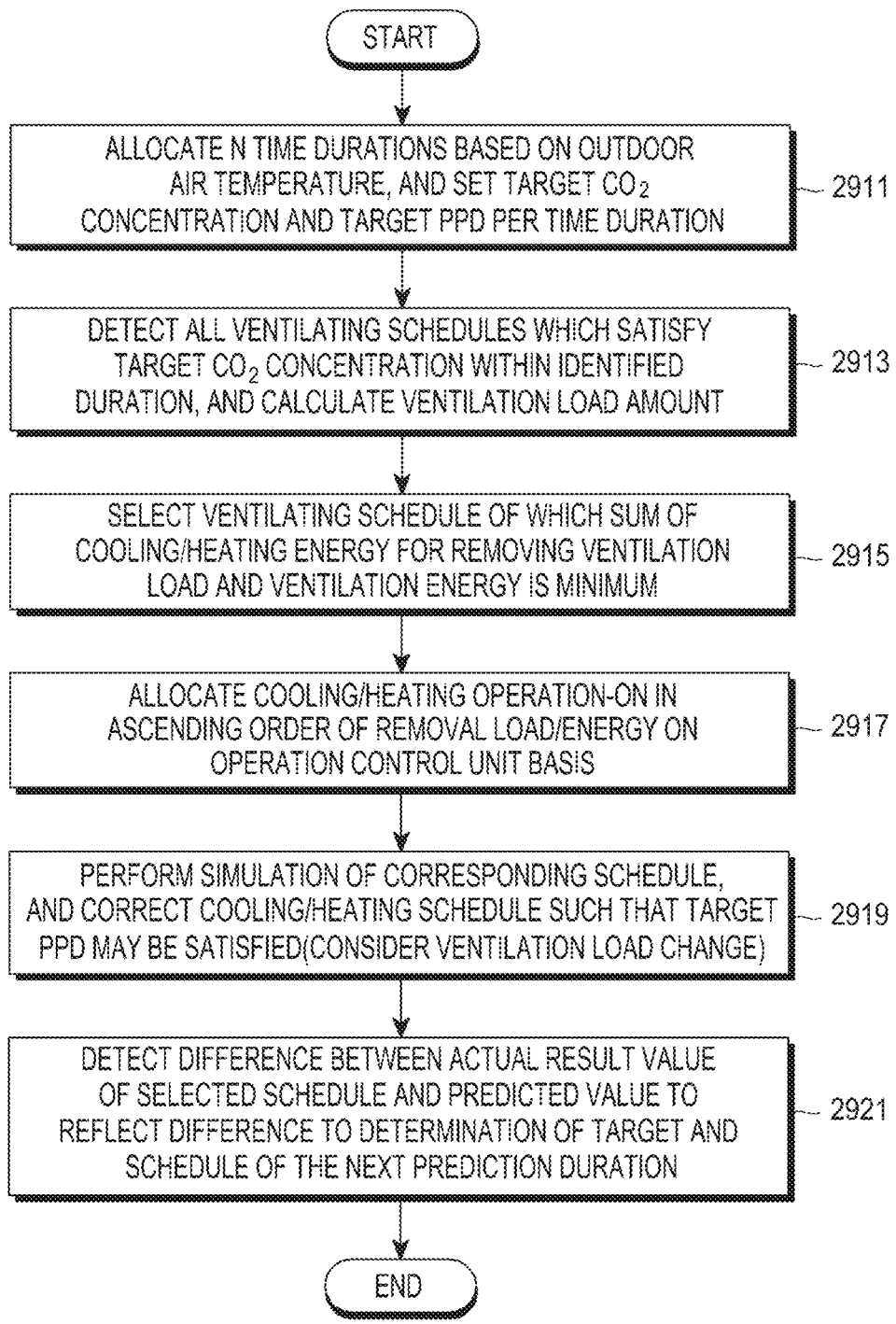
FIG. 29 is a flowchart illustrating a method of performing a compound control operation in a server in an air conditioning system according to an embodiment of the disclosure.

FIG. 29 is a flowchart of a method of performing a compound control operation in a server in an air conditioning system according to an embodiment of the disclosure.

Referring to FIG. 29, a server allocates n time durations to a schedule duration based on the outdoor air temperature, and sets target $CO_2$ concentration and a target PPD per time duration in step 2911. The server detects all ventilating schedules which satisfy target $CO_2$ concentration within an identified duration, and calculates ventilation load amount of all ventilating schedules in step 2913. The server selects a ventilating schedule of which the sum of cooling/heating energy for removing the ventilation load and ventilation energy is minimal from among all ventilating schedules in step 2915.

The server allocates cooling/heating operation-on in ascending order of removal load/energy on an operation control unit basis in step 2917. The server performs a simulation for a ventilating apparatus and an air conditioning apparatus based on the determined ventilating schedule and cooling/heating schedule, and corrects the cooling/heating schedule such that the target PPD may be satisfied in step 2919. In this case, the server may correct the cooling/heating schedule by considering a change in ventilation load.

The server detects the difference between a result value which is generated by actually applying the determined ventilating schedule and cooling/heating schedule and a predicted value of the determined ventilating schedule and cooling/heating schedule in step 2921, and the server may reflect the detected difference upon determining target $CO_2$ concentration and a target PPD for the next prediction duration and determining the ventilating schedule and cooling/heating schedule.

Although FIG. 29 illustrates an example of a process of performing a compound control operation in a server in an air conditioning system according to an embodiment, various changes could be made to FIG. 29. For example, although shown as a series of operations, various operations in FIG. 29 could overlap, occur in parallel, occur in a different order, or occur multiple times.

Figure 30:
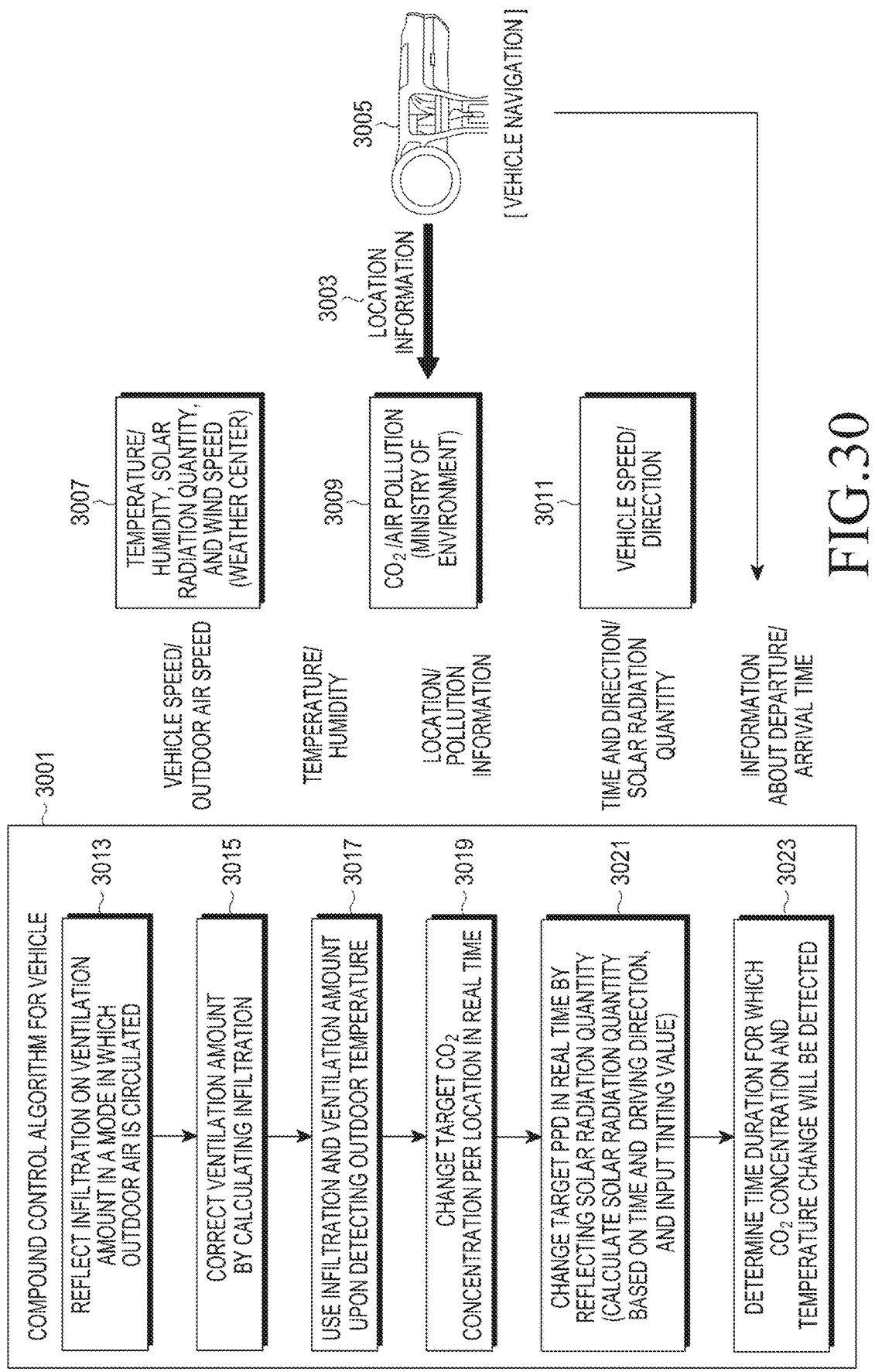
FIG. 30 is a flowchart illustrating a compound control operation for a vehicle to which a compound control operation may be applied according to an embodiment of the disclosure.

FIG. 30 is an illustration of an example of a compound control operation for a vehicle to which a compound control operation may be applied according to an embodiment of the disclosure.

Referring to FIG. 30, a controller 3001 for controlling the compound control operation for the vehicle may detect location information 3003 of the vehicle from a navigation device 3005, and may obtain various parameters such as a temperature, humidity, solar radiation quantity, a wind speed 3007; $CO_2$ concentration 3009; a speed of the vehicle, a direction of the vehicle 3011, etc., based on the location information 3003.

The controller reflects infiltration on the ventilation amount in a mode in which outdoor air is circulated 3013. Thus, the controller 3001 may correct the ventilation amount by calculating the infiltration 3015.

The controller may use the infiltration and the ventilation amount upon detecting the outdoor temperature 3017, change target $CO_2$ concentration per location in real time 3019, and change a target PPD in real time by reflecting solar radiation quantity 3021. For example, the controller may calculate solar radiation quantity within the vehicle based on time, a driving direction, etc., and input a tinting value, thus, the controller may change a target PPD and a target indoor temperature based on these various parameters in real time.

The controller may determine a time duration for which $CO_2$ concentration and a temperature change will be detected based on the various parameters 3023.

Figure 31:
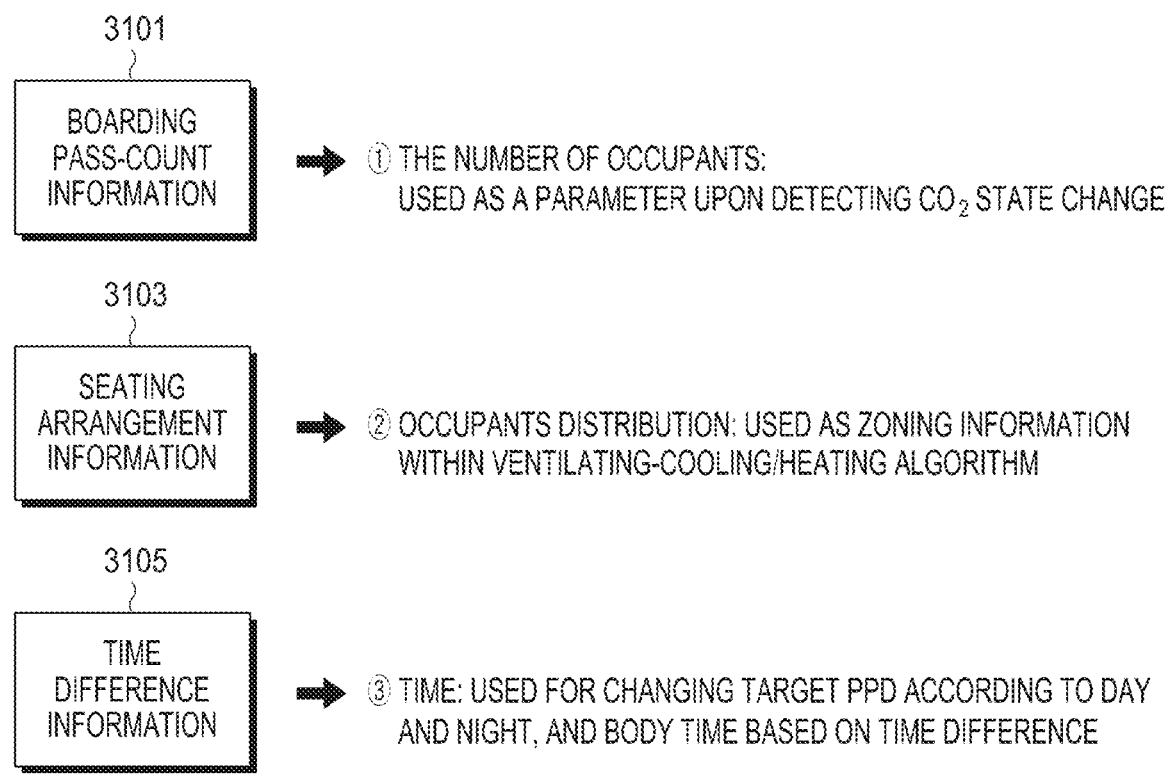
FIG. 31 is an illustration of a compound control operation for an aircraft to which a compound control operation may be applied according to an embodiment of the disclosure.

FIG. 31 is an illustration of an example of a compound control operation for an aircraft to which a compound control operation may be applied according to an embodiment of the disclosure.

Referring to FIG. 31, a controller for controlling a compound control operation for the aircraft may detect the number of occupants who are in a compound control zone, i.e., the aircraft from boarding pass-count information 3101. Thus, the controller may detect a $CO_2$ state change based on the number of occupants.

Further, the controller may detect distribution of occupants based on seating arrangement information 3103, thus, the controller may set a compound control zone where a compound control operation will be performed based on the distribution of occupants.

Further, the controller may change a target PPD according to day and night, and body time based on time difference information 3105.

Figure 32:
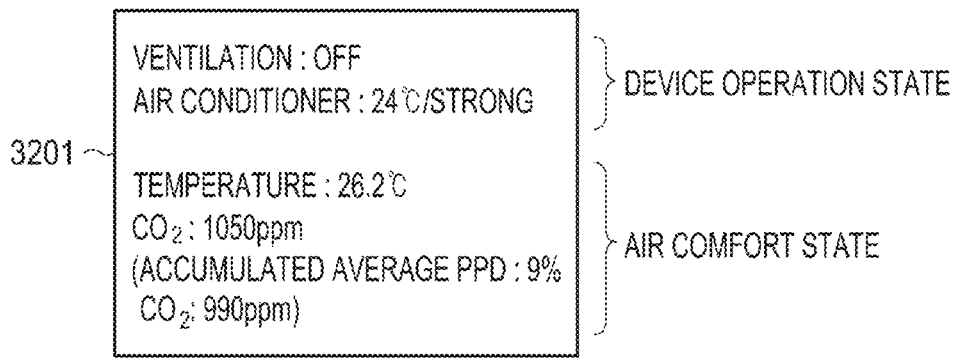
FIG. 32 is an illustration of a user interface (UI) which may be implemented in a remote controller in an air conditioning system according to an embodiment of the disclosure.
Figure 33:
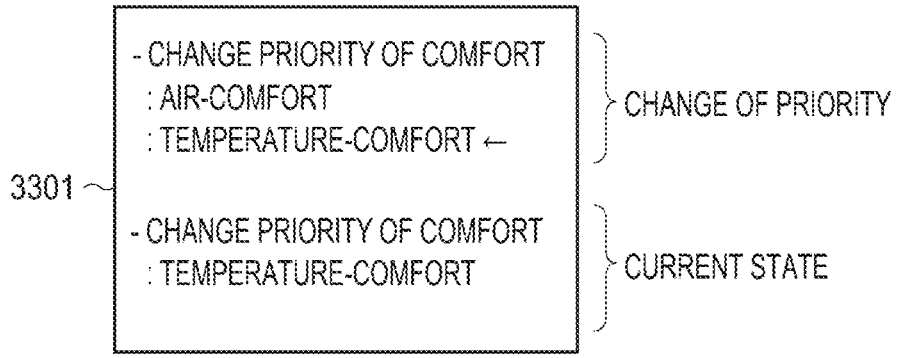
FIG. 33 is an illustration of a UI which may be implemented in a remote controller in an air conditioning system according to an embodiment of the disclosure.
Figure 34:
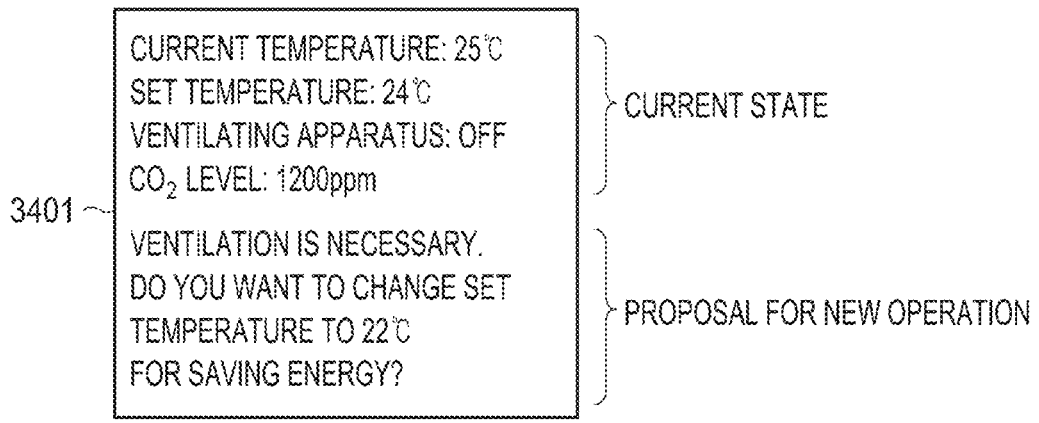
FIG. 34 is an illustration of a UI which may be implemented in a remote controller in an air conditioning system according to an embodiment of the disclosure.

FIG. 32 shows an operational state and a comfort state 3201, FIG. 33 shows concepts related to a change in a priority between an air comfort-degree and a temperature comfort-degree 3301, and FIG. 34 shows concepts related to a situation proposing an optimal operational state optimized for a user who exists in a compound control zone 3401.

Embodiments of the disclosure perform a compound control operation in an air conditioning system.

Embodiments of the disclosure control a ventilating apparatus and an air conditioning apparatus based on operational states of both of the ventilating apparatus and the air conditioning apparatus in an air conditioning system.

Embodiments of the disclosure control a ventilating apparatus and an air conditioning apparatus based on an air state change and a temperature change in an air conditioning system.

Embodiments of the disclosure control a ventilating apparatus and an air conditioning apparatus thereby decreasing ventilating load in an air conditioning system.

Embodiments of the disclosure control a ventilating apparatus and an air conditioning apparatus thereby decreasing consumption of cooling/heating energy in an air conditioning system.

Embodiments of the disclosure control a ventilating apparatus and an air conditioning apparatus thereby decreasing the sum of cooling/heating energy for removing the ventilating load and ventilating energy in an air conditioning system.

Certain aspects of the disclosure may also be embodied as computer readable code on a non-transitory computer readable recording medium. A non-transitory computer readable recording medium is any data storage device that can store data, which can be thereafter read by a computer system. Examples of the non-transitory computer readable recording medium include read only memory (ROM), random access memory (RAM), compact disc ROMs (CD-ROMs), magnetic tapes, floppy disks, optical data storage devices, and carrier waves (such as data transmission through the Internet). The non-transitory computer readable recording medium can also be distributed over network coupled computer systems thus that the computer readable code is stored and executed in a distributed fashion. In addition, functional programs, code, and code segments for accomplishing the disclosure can be easily construed by programmers skilled in the art to which the disclosure pertains.

A method and apparatus according to an embodiment of the disclosure may be implemented by hardware, software and/or a combination thereof. The software may be stored in a non-volatile storage, for example, an erasable or rewritable ROM, a memory, for example, a RAM, a memory integrated circuit (IC) or chip, or a memory device, or an optically or magnetically recordable non-transitory machine-readable (e.g., computer-readable) storage medium (e.g., a CD, a digital video disc (DVD), a magnetic disk, a magnetic tape, etc.). A method and apparatus according to an embodiment of the disclosure may be implemented by a computer or a mobile terminal that includes a controller and a memory, and the memory may be an example of a non-transitory machine-readable (e.g., computer-readable) storage medium suitable to store a program or programs including instructions for implementing embodiments of the disclosure.

The disclosure may include a program including code for implementing the apparatus and method as defined by the appended claims and their equivalents, and a non-transitory machine-readable (e.g., computer-readable) storage medium storing the program. The program may be electronically transferred via any media, such as communication signals, which are transmitted through wired and/or wireless connections, and the disclosure may include their equivalents.

An apparatus according to an embodiment of the disclosure may receive the program from a program providing device which is connected to the apparatus via a wire or a wireless and store the program. The program providing device may include a memory for storing instructions which instruct to perform a content protection method which has already been installed, information necessary for the content protection method, and the like, a communication unit for performing a wired or a wireless communication with a graphics processing device, and a controller for transmitting a related program to a transmitting/receiving device based on a request of the graphics processing device or automatically transmitting the related program to the transmitting/receiving device.

While the disclosure has been shown and described with reference to embodiments thereof, it will be understood by those skilled in the art that various changes in form and details may be made therein without departing from the spirit and scope of the disclosure as defined by the appended claims and their equivalents.

What is claimed is:

1. A method of a server in an air conditioning system, the method comprising:
   determining a schedule duration for a compound control zone in which a compound control operation for controlling a ventilating operation of a ventilating apparatus and a cooling/heating operation of an air conditioning apparatus will be performed;
   determining a ventilating schedule based on an air state change; and
   determining a cooling/heating schedule,
   wherein determining the ventilating schedule based on the air state change comprises;
      predicting a carbon dioxide ($CO_2$)concentration during the schedule duration;
      predicting a difference between an indoor temperature and an outdoor temperature of the compound control zone; and
      determining to turn on the ventilating apparatus during a time duration for which the $CO_2$ concentration is greater than a threshold $CO_2$ concentration and the difference is less than a threshold difference.

2. The method of claim 1, further comprising:
   modifying the determined ventilating schedule and the determined cooling/heating schedule based on cooling/heating energy for removing ventilating load occurring due to the determined ventilating schedule and ventilating energy due to the determined ventilating schedule.

3. The method of claim 1, wherein determining the ventilating schedule based on the air state change comprises:
   detecting a plurality of ventilating schedules by predicting a $CO_2$ concentration change during the schedule duration, if the air state change is detected based on the $CO_2$ concentration; and
   determining a ventilating schedule which causes a minimal ventilating load amount among the plurality of ventilating schedules as the ventilating schedule.

4. The method of claim 1, wherein determining the cooling/heating schedule comprises determining the cooling/heating schedule based on a temperature change, and
   wherein determining the cooling/heating schedule based on the temperature change comprises:
      determining a plurality of cooling/heating schedules which satisfy a target temperature comfort-degree by predicting a temperature change during the schedule duration; and
      determining a cooling/heating schedule of which cooling/heating energy consumption is minimal among the plurality of cooling/heating schedules as the cooling/heating schedule.

5. The method of claim 1, wherein the schedule duration is determined based on a time point at which occupancy starts and a time point at which the occupancy ends for the compound control zone, and
wherein the time point at which the occupancy starts and the time point at which the occupancy ends are determined based on the air state change.

6. A method of a server in an air conditioning system, the method comprising:
determining a schedule duration for a compound control zone in which a compound control operation for controlling a ventilating operation of a ventilating apparatus and a cooling/heating operation of an air conditioning apparatus will be performed;
determining a cooling/heating schedule based on a temperature change; and
determining a ventilating schedule,
wherein determining the ventilating schedule comprises;
predicting a carbon dioxide ($CO_2$)concentration during the schedule duration;
predicting a difference between an indoor temperature and an outdoor temperature of the compound control zone; and
determining to turn on the ventilating apparatus during a time duration for which the $CO_2$ concentration is greater than a threshold $CO_2$ concentration and the difference is less than a threshold difference.

7. The method of claim 6, further comprising:
modifying the determined ventilating schedule and the determined cooling/heating schedule based on cooling/heating energy consumed due to the determined cooling/heating schedule and cooling/heating energy for removing ventilating load due to the determined ventilating schedule.

8. The method of claim 6, wherein determining the cooling/heating schedule based on the temperature change comprises:
detecting a plurality of cooling/heating schedules by predicting a temperature change during the schedule duration; and
determining a cooling/heating schedule of which energy consumption is minimal among the plurality of cooling/heating schedules as the cooling/heating schedule.

9. The method of claim 6, wherein determining the ventilating schedule comprises determining the ventilating schedule based on an air state change, and
wherein determining the ventilating schedule based on the air state change comprises:
detecting a plurality of ventilating schedules by predicting a $CO_2$ concentration change during the schedule duration if the air state change is detected based on the $CO_2$ concentration; and
determining a ventilating schedule which causes minimal ventilating load amount among the plurality of ventilating schedules as the ventilating schedule.

10. The method of claim 6, wherein the schedule duration is determined based on a time point at which occupancy starts and a time point at which the occupancy ends for the compound control zone, and
wherein the time point at which the occupancy starts and the time point at which the occupancy ends are determined based on an air state change.

11. A server in an air conditioning system, the server comprising:
a controller configured to:
determine a schedule duration for a compound control zone in which a compound control operation for controlling a ventilating operation of a ventilating apparatus and a cooling/heating operation of an air conditioning apparatus will be performed,
determine a ventilating schedule based on an air state change, and
determine a cooling/heating schedule; and
a communication unit configured to:
transmit information which is based on the ventilating schedule to the ventilating apparatus, and
transmit information which is based on the cooling/heating schedule to the air conditioning apparatus,
wherein the controller is further configured to;
predict a carbon dioxide ($CO_2$)concentration during the schedule duration,
predict a difference between an indoor temperature and an outdoor temperature of the compound control zone, and
determine to turn on the ventilating apparatus during a time duration for which the $CO_2$ concentration is greater than a threshold $CO_2$ concentration and the difference is less than a threshold difference.

12. The server of claim 11, wherein the controller is further configured to modify the determined ventilating schedule and the determined cooling/heating schedule based on cooling/heating energy for removing ventilating load occurring due to the determined ventilating schedule and ventilating energy due to the determined ventilating schedule.

13. The server of claim 11, wherein the controller is further configured to:
detect a plurality of ventilating schedules by predicting a $CO_2$ concentration change during the schedule duration, if the air state change is detected based on the $CO_2$ concentration, and
determine a ventilating schedule which causes minimal ventilating load amount among the plurality of ventilating schedules as the ventilating schedule.

14. The server of claim 11, wherein the controller is further configured to:
determine a plurality of cooling/heating schedules which satisfy a target temperature comfort-degree by predicting a temperature change during the schedule duration, and
determine a cooling/heating schedule of which cooling/heating energy consumption is minimal among the plurality of cooling/heating schedules as the cooling/heating schedule.

15. The server of claim 11, wherein the schedule duration is determined based on a time point at which occupancy starts and a time point at which the occupancy ends for the compound control zone, and wherein the time point at which the occupancy starts and the time point at which the occupancy ends are determined based on the air state change.

16. A server in an air conditioning system, the server comprising:
a controller configured to:
determine a schedule duration for a compound control zone in which a compound control operation for controlling a ventilating operation of a ventilating apparatus and a cooling/heating operation of an air conditioning apparatus will be performed,
determine a cooling/heating schedule based on a temperature change, and
determine a ventilating schedule; and
a communication unit configured to:
transmit information which is based on the ventilating schedule to ventilating apparatus, and transmit information which is based on the cooling/heating schedule to the air conditioning apparatus, wherein the controller is further configured to:

predict a carbon dioxide ($CO_2$) concentration during the schedule duration, predict a difference between an indoor temperature and an outdoor temperature of the compound control zone, and determine to turn on the ventilating apparatus during a time duration for which the $CO_2$ concentration is greater than a threshold $CO_2$ concentration and the difference is less than a threshold difference.

17. The server of claim 16, wherein the controller is further configured to modify the determined ventilating schedule and the determined cooling/heating schedule based on cooling/heating energy consumed due to the determined cooling/heating schedule and cooling/heating energy for removing ventilating load due to the determined ventilating schedule.

18. The server of claim 16, wherein the controller is further configured to:

detect a plurality of cooling/heating schedules by predicting a temperature change during the schedule duration, and determine a cooling/heating schedule of which energy consumption is minimal among the plurality of cooling/heating schedules as the cooling/heating schedule.

19. The server of claim 16, wherein the controller is further configured to:

detect a plurality of ventilating schedules by predicting a $CO_2$ concentration change during the schedule duration, if the air state change is detected based on $CO_2$ concentration, and determine a ventilating schedule which causes minimal ventilating load amount among the plurality of ventilating schedules as the ventilating schedule.

20. The server of claim 16, wherein the schedule duration is determined based on a time point at which occupancy starts and a time point at which the occupancy ends for the compound control zone, and wherein the time point at which the occupancy starts and the time point at which the occupancy ends are determined based on an air state change.

* * * * *